United States Patent
Zhu et al.

(10) Patent No.: US 12,501,508 B2
(45) Date of Patent: Dec. 16, 2025

(54) COMMUNICATION METHOD APPLIED TO INTEGRATED ACCESS AND BACKHAUL IAB SYSTEM AND COMMUNICATION APPARATUS

(71) Applicant: HUAWEI TECHNOLOGIES CO., LTD., Guangdong (CN)

(72) Inventors: Yuanping Zhu, Shanghai (CN); Yulong Shi, Beijing (CN); Jing Liu, Shenzhen (CN); Yibin Zhuo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 254 days.

(21) Appl. No.: 18/352,423

(22) Filed: Jul. 14, 2023

(65) Prior Publication Data

US 2023/0371110 A1 Nov. 16, 2023

Related U.S. Application Data

(63) Continuation of application No. PCT/CN2021/072277, filed on Jan. 15, 2021.

(51) Int. Cl.
*H04W 76/20* (2018.01)
*H04W 36/08* (2009.01)

(52) U.S. Cl.
CPC .......... *H04W 76/20* (2018.02); *H04W 36/08* (2013.01)

(58) Field of Classification Search
CPC ... H04W 76/20; H04W 36/08; H04W 36/087; H04W 88/085; H04W 36/0009
See application file for complete search history.

(56) References Cited

U.S. PATENT DOCUMENTS

2015/0131618 A1\* 5/2015 Chen .................. H04W 84/005
370/332
2022/0217598 A1\* 7/2022 Ishii .................. H04W 36/0058
(Continued)

FOREIGN PATENT DOCUMENTS

| CN | 112088544 A | 12/2020 |
| CN | 112088544 B | \* 7/2023 |
| WO | WO 2022233317 A1 | \* 11/2022 |

OTHER PUBLICATIONS

Load-Stress Test of Massive Handovers for LTE Two-Hop Architecture in High-Speed Trains â 2017 (Year: 2017).\*

(Continued)

*Primary Examiner* — Nizar N Sivji
(74) *Attorney, Agent, or Firm* — Rimon PC

(57) ABSTRACT

This application provides a communication method. In the method, a first node receives a first radio resource control (RRC) reconfiguration message from a first donor node through a second node. After the first node receives the first RRC reconfiguration message from the second node, the first node receives first indication information from the second node. When the first node determines, based on the first indication information, that the first RRC reconfiguration message becomes effective, the first node establishes an RRC connection to a second donor node based on the first RRC reconfiguration message. In the method, the first node and the second node are nodes in a group that performs group handover, the group handover is a cross-donor node group handover, the second node is a head node or the second node is connected to a head node, and the second node is a parent node of the first node.

20 Claims, 13 Drawing Sheets

(56) References Cited

U.S. PATENT DOCUMENTS

2023/0118291 A1* 4/2023 Wang .................... H04W 76/11
                                                    370/331
2023/0269630 A1* 8/2023 Teyeb ............... H04W 36/0033
                                                    370/331

OTHER PUBLICATIONS

3GPP TSG-RAN WG2 Meeting #112-e R2-2009652 Title: Consideration of topology adaptation enhancement for R17-IAB Dated Nov. 2-13, 2020 (Year: 2020).*
3GPP TSG-RAN WG3 #110-e R3-207165 Title: Summary of Offline Discussion on Reduction of Service Interruption reduction Dated Nov. 2-12, 2020 (Year: 2020).*
Huawei, HiSilicon, "Consideration of topology adaptation enhancement for R17-IAB," 3GPP TSG-RAN WG2 Meeting #112-e, Online, Nov. 2-13, 2020, R2-2009652; 11 pages.
Nokia (moderator), "Summary of Offline Discussion on Reduction of Service Interruption reduction," 3GPP TSG-RAN WG3 #110-e, Online, Nov. 2-12, 2020, R3-207165; 30 pages.

* cited by examiner

COMMUNICATION METHOD APPLIED TO INTEGRATED ACCESS AND BACKHAUL IAB SYSTEM AND COMMUNICATION APPARATUS

CROSS-REFERENCE TO RELATED APPLICATION

This application is a continuation of International Application No. PCT/CN2021/072277, filed on Jan. 15, 2021, the disclosure of which is hereby incorporated by reference in its entirety.

TECHNICAL FIELD

This application generally relates to the field of wireless communication technologies, and in particular, to a communication method applied to an integrated access and backhaul (IAB) system and a communication apparatus.

BACKGROUND

Compared with a fourth generation (4G) mobile communication system, a fifth generation (5G) mobile communication system comprehensively imposes stricter requirements on various network performance indicators. For example, 5G imposes an increase in a capacity indicator by 1000 times, wider coverage, and ultra-high reliability and an ultra-low latency. An integrated access and backhaul (IAB) system has emerged to provide a flexible and convenient access and backhaul service for a terminal through a large quantity of densely deployed nodes, to expand coverage and to satisfy a stricter performance indicator required by 5G.

In relay systems such as the IAB system, a relay node may be handed over due to link quality or the like. The handover of the relay node may affect another node or a terminal in the IAB system, which causes service transmission interruption. Consequently, a user's experience is greatly reduced.

SUMMARY

Embodiments of this application provide a communication method applied to an integrated access and backhaul (IAB) system, a communication apparatus, and a communication system. In these embodiments, in a group handover process, a descendant node of a group is handed over along with a head node, to avoid service transmission interruption of a terminal caused by an interruption of a connection between a descendant node and a parent node. This facilitates for improved service transmission continuity of the terminal.

With reference to a first aspect to an eleventh aspect, the following describes the solutions provided in embodiments of this application. It should be noted that the first aspect to the eleventh aspect describe the solutions from perspectives of different network elements, and content of the solutions may be mutually referenced and cited.

A first aspect of this application provides a communication method applied to an IAB system. The method may be performed by a first node or a chip in the first node. The following aspect uses an example in which the first node performs the method for description. The method in the first aspect may be used for a cross-donor node handover.

In the method, the first node receives a first radio resource control (RRC) reconfiguration message from a first donor node through a second node. After the first node receives the first RRC reconfiguration message from the second node, the first node receives first indication information from the second node, where the first indication information is used to determine that the first RRC reconfiguration message becomes effective. When the first node determines, based on the first indication information, that the first RRC reconfiguration message becomes effective, the first node establishes an RRC connection to a second donor node based on the first RRC reconfiguration message.

The first node and the second node are nodes in a group that performs group handover, the group handover includes handover of a head node in the group from a source parent node to a target parent node, the source parent node is connected to the first donor node, the target parent node is connected to the second donor node, the second node is the head node or the second node is connected to the head node, the second node is a parent node of the first node, the second node is an IAB node, and the first node is an IAB node or a terminal.

The parent node in the group that performs the group handover sends the first indication information to a child node, so that the child node may determine, based on the first indication information, that the first RRC reconfiguration message becomes effective. Therefore, the child node may establish an RRC connection to the second donor node based on the first RRC reconfiguration message to ensure that the child node is handed over along with the parent node. This results in avoiding an interruption of service transmission of a terminal and improves service transmission continuity of the terminal.

In a possible implementation, the first RRC reconfiguration message includes the first indication information.

In a possible implementation, the second node is the head node, and the first indication information includes one or more of the following: a group identifier of the group, an identifier of the group handover, an identifier of a candidate target cell of the second node, an identifier of a candidate target cell of the first node, or an identifier of the second donor node.

In a possible implementation, the second node is connected to the head node, and the first indication information includes one or more of the following: a group identifier of the group, an identifier of the group handover, an identifier of a candidate target cell of the second node, an identifier of a candidate target cell of the first node, an identifier of a candidate target cell of the head node, or an identifier of the second donor node.

In a possible implementation, the method further includes that the first node receives second indication information from the second node, where the second indication information indicates that the group handover is a cross-donor node group handover.

In a possible implementation, the first RRC reconfiguration message includes second indication information, and the second indication information indicates that the group handover is a cross-donor node group handover.

Optionally, the second indication information includes one or more of the following: the identifier of the candidate target cell of the first node, a backhaul adaptation protocol (BAP) address of the first node, or the identifier of the second donor node.

In a possible implementation, the method further includes that a distributed unit (DU) of the first node establishes an F1 connection to the second donor node based on the second indication information.

In a possible implementation, the group further includes a third node, the third node is a child node of the first node. The method further includes that the first node receives a second RRC reconfiguration message from the first donor node through the second node. The first node sends the second RRC reconfiguration message to the third node. When the first node determines, based on the first indication information, that the first RRC reconfiguration message becomes effective, the first node sends third indication information to the third node, where the third indication information indicates that the second RRC reconfiguration message becomes effective.

In a possible implementation, the second RRC reconfiguration message and the first RRC reconfiguration message correspond to the group handover.

In a possible implementation, the second RRC reconfiguration message and the first RRC reconfiguration message include the third indication information.

Optionally, the third indication information includes one or more of the following: the group identifier of the group, the identifier of the group handover, an identifier of a candidate target cell of the third node, the identifier of the candidate target cell of the first node, the identifier of the candidate target cell of the head node, or the identifier of the second donor node.

In a possible implementation, the first RRC reconfiguration message includes an identifier of one or more child nodes of the first node in the group, the one or more child nodes include the third node, and the method further includes that the first node sends the third indication information to the third node based on an identifier of the third node.

In a possible implementation, the first indication information includes identification information of one or more descendant nodes of the first node in the group, the one or more descendant nodes include the third node, and the method further includes that the first node sends the third indication information to the third node based on identification information of the third node.

A second aspect of this application provides a communication method applied to an IAB system. The method may be performed by a second node or a chip in the second node. The following aspect uses an example in which the second node performs the method for description. Mutual references may be made to the method in the second aspect and to the method in the first aspect. The method in the second aspect may be used for a cross-donor node handover.

In the method, the second node forwards, to a first node, a first RRC reconfiguration message received from a first donor node. The second node receives a second RRC reconfiguration message from the first donor node. When the second node determines that the second RRC reconfiguration message becomes effective, the second node sends first indication information to the first node, where the first indication information is used to determine that the first RRC reconfiguration message becomes effective.

The first node and the second node are nodes in a group that performs group handover, the group handover includes handover of a head node in the group from a source parent node to a target parent node, the source parent node is connected to the first donor node, the target parent node is connected to a second donor node, the second node is the head node or the second node is connected to the head node, the second node is a parent node of the first node, the second node is an IAB node, and the first node is an IAB node or a terminal.

In a possible implementation, the method further includes that when the second node determines that the second RRC reconfiguration message becomes effective, the second node establishes an RRC connection to the second donor node based on the second RRC reconfiguration message.

In a possible implementation, the first RRC reconfiguration message and the second RRC reconfiguration message include the first indication information.

In a possible implementation, the second node is the head node, and the first indication information includes one or more of the following: a group identifier of the group, an identifier of the group handover, an identifier of a candidate target cell of the second node, an identifier of a candidate target cell of the first node, or an identifier of the second donor node.

In a possible implementation, the second node is connected to the head node, and the first indication information includes one or more of the following: a group identifier of the group, an identifier of the group handover, an identifier of a candidate target cell of the second node, an identifier of a candidate target cell of the first node, an identifier of a candidate target cell of the head node, or an identifier of the second donor node.

In a possible implementation, the method further includes that the second node sends second indication information to the first node, where the second indication information indicates that the group handover is a cross-donor node group handover.

In a possible implementation, the first RRC reconfiguration message includes second indication information, and the second indication information indicates that the group handover is a cross-donor node group handover.

Optionally, the second indication information includes one or more of the following: the identifier of the candidate target cell of the first node, a BAP address of the first node, or the identifier of the second donor node.

In a possible implementation, the second node is the head node, and the method further includes that the second node receives an effective condition of the second RRC reconfiguration message. That the second node determines that the second RRC reconfiguration message becomes effective includes that when the effective condition is met, the second node determines that the second RRC reconfiguration message becomes effective.

In a possible implementation, the second node is connected to the head node through a third node, the third node is a parent node of the second node, the group further includes the third node. The method further includes that the second node receives third indication information from the third node, where the third indication information is used to determine that the second RRC reconfiguration message becomes effective. That the second node determines that the second RRC reconfiguration message becomes effective includes that the second node determines, based on the third indication information, that the second RRC reconfiguration message becomes effective.

In a possible implementation, the second RRC reconfiguration message includes an identifier of one or more child nodes of the second node in the group, the one or more child nodes include the first node, and the method further includes that the second node sends the first indication information to the first node based on identification information of the first node.

In a possible implementation, the second node is the head node, the second RRC reconfiguration message includes identification information of one or more descendant nodes of the second node in the group, the one or more descendant nodes of the second node include the first node, and the method further includes that the second node sends the first indication information to the first node based on identification information of the first node.

In a possible implementation, the third indication information includes identification information of one or more descendant nodes of the second node in the group, the one or more descendant nodes of the second node include the first node, and the method further includes that the second node sends the first indication information to the first node based on identification information of the first node.

Optionally, the one or more descendant nodes of the second node further include one or more descendant nodes of the first node, and the first indication information includes identification information of the one or more descendant nodes of the first node in the group.

A third aspect of this application provides a communication method applied to an IAB system. The method may be performed by a first node or a chip in the first node. The following aspect uses an example in which the first node performs the method for description. The method in the third aspect may be used for an intra-donor node handover.

The method includes that the first node receives a first RRC reconfiguration message from a first donor node through a second node. After the first node receives the first RRC reconfiguration message from the second node, the first node receives first indication information from the second node, where the first indication information is used to determine that the first RRC reconfiguration message becomes effective. When the first node determines, based on the first indication information, that the first RRC reconfiguration message becomes effective, the first node updates an RRC connection to the first donor node based on the first RRC reconfiguration message.

The first node and the second node are nodes in a group that performs group handover, the group handover includes handover of a head node in the group from a source parent node to a target parent node, the source parent node and the target parent node are connected to the first donor node, the second node is the head node or the second node is connected to the head node, the second node is a parent node of the first node, the second node is an IAB node, and the first node is an IAB node or a terminal.

In a possible implementation, the first RRC reconfiguration message includes the first indication information.

In a possible implementation, the second node is the head node, and the first indication information includes one or more of the following: a group identifier of the group, an identifier of the group handover, an identifier of a candidate target cell of the second node, an identifier of a candidate target cell of the first node, or an identifier of the first donor node.

In a possible implementation, the second node is connected to the head node, and the first indication information includes one or more of the following: a group identifier of the group, an identifier of the group handover, an identifier of a candidate target cell of the second node, an identifier of a candidate target cell of the first node, an identifier of a candidate target cell of the head node, or an identifier of the first donor node.

In a possible implementation, the method further includes that the first node receives second indication information from the second node, where the second indication information indicates that the group handover is an intra-donor node group handover.

In a possible implementation, the first RRC reconfiguration message includes second indication information, and the second indication information indicates that the group handover is an intra-donor node group handover.

Optionally, the second indication information includes one or more of the following: the identifier of the candidate target cell of the first node, a BAP address of the first node, or the identifier of the first donor node.

In a possible implementation, the group further includes a third node, the third node is a child node of the first node, and the method further includes that the first node receives a second RRC reconfiguration message from the first donor node through the second node. The first node sends the second RRC reconfiguration message to the third node. When the first node determines, based on the first indication information, that the first RRC reconfiguration message becomes effective, the first node sends third indication information to the third node, where the third indication information indicates that the second RRC reconfiguration message becomes effective. For content of the first RRC reconfiguration message, the second RRC reconfiguration message, and the third indication information, refer to the first aspect. Details are not described herein again.

A fourth aspect of this application provides a communication method applied to an IAB system. The method may be performed by a second node or a chip in the second node. The following aspect uses an example in which the second node performs the method for description. The method in the fourth aspect may be used for an intra-donor node handover.

The method includes that the second node forwards, to a first node, a first RRC reconfiguration message received from a first donor node. The second node receives a second RRC reconfiguration message from the first donor node. When the second node determines that the second RRC reconfiguration message becomes effective, the second node sends first indication information to the first node, where the first indication information is used to determine that the first RRC reconfiguration message becomes effective.

The first node and the second node are nodes in a group that performs group handover, the group handover includes handover of a head node in the group from a source parent node to a target parent node, the source parent node and the target parent node are connected to the first donor node, the second node is the head node or the second node is connected to the head node, the second node is a parent node of the first node, the second node is an IAB node, and the first node is an IAB node or a terminal.

In a possible implementation, the method further includes that when the second node determines that the second RRC reconfiguration message becomes effective, the second node updates an RRC connection to the first donor node based on the second RRC reconfiguration message.

In a possible implementation, the first RRC reconfiguration message and the second RRC reconfiguration message include the first indication information.

In a possible implementation, the second node is the head node, and the first indication information includes one or more of the following: a group identifier of the group, an identifier of the group handover, an identifier of a candidate target cell of the second node, an identifier of a candidate target cell of the first node, or an identifier of the first donor node.

In a possible implementation, the second node is connected to the head node, and the first indication information includes one or more of the following: a group identifier of the group, an identifier of the group handover, an identifier of a candidate target cell of the second node, an identifier of a candidate target cell of the first node, an identifier of a candidate target cell of the head node, or an identifier of the first donor node.

In a possible implementation, the method further includes that the second node sends second indication information to the first node, where the second indication information indicates that the group handover is an intra-donor node group handover.

In a possible implementation, the first RRC reconfiguration message includes second indication information, and the second indication information indicates that the group handover is an intra-donor node group handover.

Optionally, the second indication information includes one or more of the following: the identifier of the candidate target cell of the first node, a BAP address of the first node, or the identifier of the first donor node.

In a possible implementation, the second node is the head node, and the method further includes that the second node receives an effective condition of the second RRC reconfiguration message. That the second node determines that the second RRC reconfiguration message becomes effective includes that when the effective condition is met, the second node determines that the second RRC reconfiguration message becomes effective.

In a possible implementation, the second node is connected to the head node through a third node, the third node is a parent node of the second node, the group further includes the third node, and the method further includes that the second node receives third indication information from the third node, where the third indication information is used to determine that the second RRC reconfiguration message becomes effective. That the second node determines that the second RRC reconfiguration message becomes effective includes that the second node determines, based on the third indication information, that the second RRC reconfiguration message becomes effective.

In a possible implementation, the second RRC reconfiguration message includes an identifier of one or more child nodes of the second node in the group, the one or more child nodes include the first node, and the method further includes that the second node sends the first indication information to the first node based on identification information of the first node.

In a possible implementation, the second node is the head node, the second RRC reconfiguration message includes identification information of one or more descendant nodes of the second node in the group, the one or more descendant nodes of the second node include the first node, and the method further includes that the second node sends the first indication information to the first node based on identification information of the first node.

In a possible implementation, the third indication information includes identification information of one or more descendant nodes of the second node in the group, the one or more descendant nodes of the second node include the first node, and the method further includes that the second node sends the first indication information to the first node based on identification information of the first node.

Optionally, the one or more descendant nodes of the second node further include one or more descendant nodes of the first node, and the first indication information includes identification information of the one or more descendant nodes of the first node in the group.

A fifth aspect of this application provides a communication method applied to an IAB system. The method may be performed by a donor node or a chip in the donor node. The following aspect uses an example in which the donor node performs the method for description. The method in the fifth aspect may be applied to a cross-donor node group handover scenario.

The method includes that a source donor node obtains a first RRC reconfiguration message in a handover process of a group including a first node. The source donor node sends the first RRC reconfiguration message to the first node.

The first RRC reconfiguration message includes first indication information.

When the first node is a head node of the group, the first indication information includes a group identifier of the group, an identifier of the group handover, an identifier of a candidate target cell of the second node, an identifier of a candidate target cell of the first node, or an identifier of the second donor node.

When the first node is connected to the head node, the first indication information includes a group identifier of the group, an identifier of the group handover, an identifier of a candidate target cell of the second node, an identifier of a candidate target cell of the first node, an identifier of a candidate target cell of the head node, or an identifier of the first donor node.

In a possible implementation, the first RRC reconfiguration message includes an identifier of one or more child nodes of the first node in the group, or the first RRC reconfiguration message includes an identifier of one or more descendant nodes of the first node in the group.

In a possible implementation, the method includes that the source donor node receives first configuration information from a target donor node, where the first RRC reconfiguration message includes the first configuration information.

Optionally, the first RRC reconfiguration message includes the first configuration information and the first indication information. Alternatively, the first RRC reconfiguration message includes the first configuration information, and the first configuration information includes the first indication information.

In a possible implementation, the method includes that the source donor node sends a handover request message to the target donor node, where the handover request message includes an identifier of the group or topology information of the group.

In a possible implementation, the method includes that the source donor node sends a handover request message to the target donor node, where the handover request message includes topology information of the group. The target donor node generates an identifier of the group based on the topology information of the group, where the source donor node receives the identifier of the group from the target donor node.

One or more of the methods in the first aspect to the fifth aspect may be combined with each other. In addition, in the method in each aspect, one or more of a plurality of possible implementations may be combined with each other.

A sixth aspect of embodiments of this application provides a communication apparatus. The communication apparatus may be a first node or a chip in the first node, or the communication apparatus may be a second node or a chip in the second node, or the communication apparatus may be a first donor node or a chip in the first donor node, or the communication apparatus may be a second donor node or a chip in the second donor node. When the first donor node uses a central unit-distributed unit (CU-DU) separation architecture, the communication apparatus may be a central unit (CU) of the first donor node or a chip of the CU. When the second donor node uses a CU-DU separation architecture, the communication apparatus may be a CU of the second donor node or a chip of the CU.

The communication apparatus includes a processor, where the processor is configured to execute a computer program or instructions, to enable the communication apparatus to perform any of the methods according to the first aspect to the fifth aspect.

Optionally, the communication apparatus further includes a memory. The processor is coupled to the memory, the memory is configured to store the computer program or the instructions, and the processor is configured to execute the computer program or the instructions in the memory.

Optionally, the communication apparatus may further include a communication unit (e.g., communication circuit). The communication unit is configured to communicate with another device or another component in the communication apparatus. For example, the (first) communication apparatus may operate as a first node or a second node, and the (second) communication unit may operate as a transceiver. For example, the communication apparatus is a donor node, and the communication unit may include an interface between a transceiver and the donor node. The transceiver is configured to communicate with a child node of the donor node, and the interface is used for communication between the donor node and another donor node. For example, the communication apparatus is a CU, and the communication unit is an interface between the CU and a distributed unit (DU) and an interface between the CU and another access network device. For example, the communication apparatus is a DU, and the communication unit is an interface between a CU and the DU and a transceiver of the DU.

For example, the communication apparatus is a chip, and the communication unit is an input/output circuit or an interface of the chip.

A seventh aspect of embodiments of this application provides a communication apparatus. The communication apparatus has a function of implementing behaviors of the first node, the second node, the first donor node, and the second donor node in the foregoing method aspects. The communication apparatus includes components (e.g., the means) corresponding to the steps or functions described in the method aspects according to any of the first aspect to the fifth aspect. The steps or the functions may be implemented by software, hardware, or a combination of hardware and software.

An eighth aspect of embodiments of this application provides a chip. The chip includes a processor and an interface circuit, where the interface circuit is coupled to the processor, the processor is configured to run a computer program or instructions, to implement the method according to any one of the first aspect to the fifth aspect, and the interface circuit is configured to communicate with a module other than the chip.

A ninth aspect of embodiments of this application provides a computer storage medium. The computer storage medium stores a program for implementing the method according to any one of the first aspect to the fifth aspect. When the program is run in a wireless communication apparatus, the wireless communication apparatus is enabled to perform the method according to any one of the first aspect to the fifth aspect.

A tenth aspect of embodiments of this application provides a computer program product. The program product includes a program. When the program is run, the method according to any one of the first aspect to the fifth aspect is performed.

An eleventh aspect of embodiments of this application provides a communication system, including one or more of the first node, the second node, the first donor node, and the second donor node in the methods according to any of the first aspect to the fifth aspect.

BRIEF DESCRIPTION OF DRAWINGS

To describe the technical solutions in embodiments of this application or in the background more clearly, the following briefly describes the accompanying drawings for describing embodiments of this application or the background.

DESCRIPTION OF EMBODIMENTS

Figure 1:
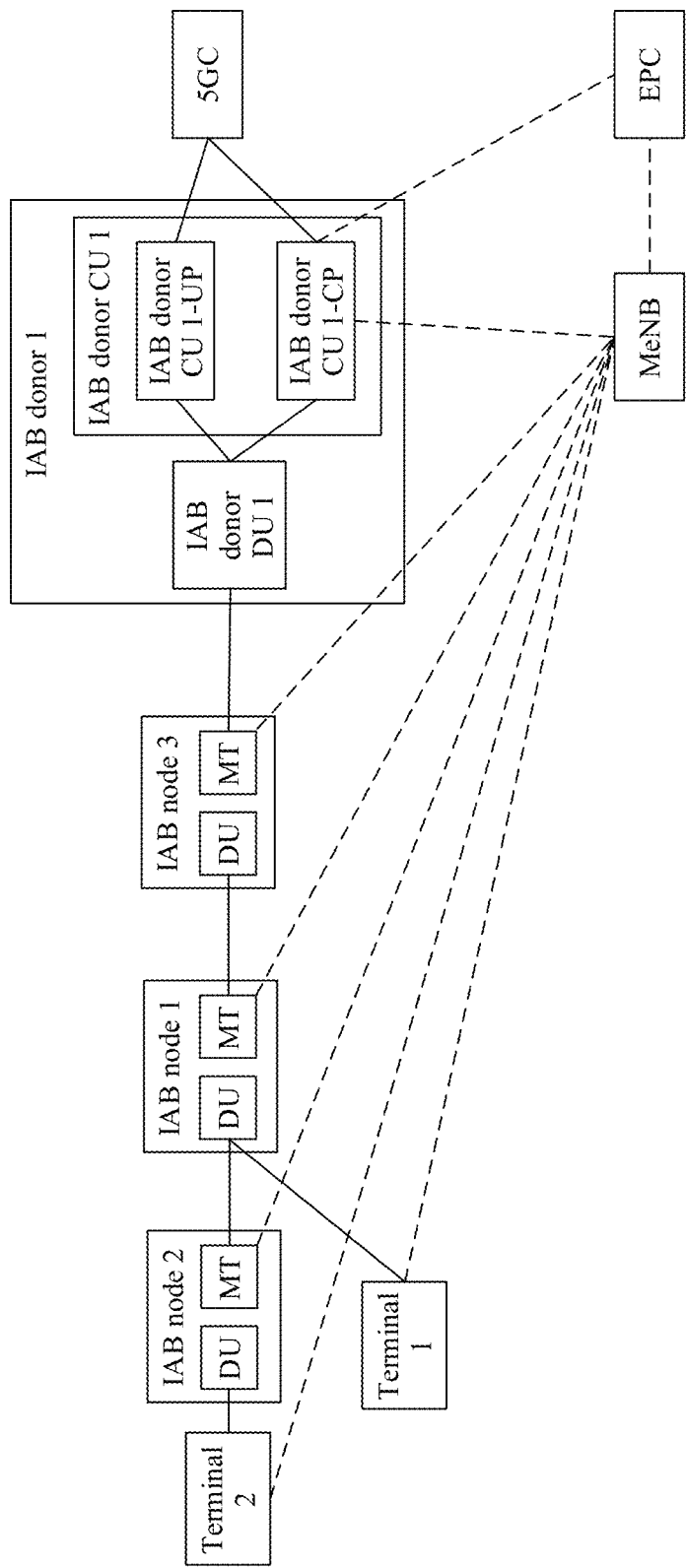
FIG. 1 is a schematic diagram of an integrated access and backhaul (IAB) network according to an embodiment of this application.

The following describes embodiments of this application with reference to the accompanying drawings in embodiments of this application.

An embodiment of this application provides a communication system. The communication system includes at least one terminal, at least one relay node (RN), at least one access network device, and at least one core network device. The terminal may be connected to the at least one access network device, or the terminal may be connected to the at least one access network device through the at least one relay node, and the at least one access network device is connected to the at least one core network device. Each relay node in the at least one relay node may be connected to another relay node.

The communication system provided in this application may be, for example, a cellular system related to a 3rd generation partnership project (3GPP), for example, a long term evolution (LTE) system supporting a fourth generation (4G) access technology, a new radio (NR) system of a fifth generation (5G) access technology, a radio access technology (RAT) system, or another future-oriented communication technology.

The terminal in this application is a device with a wireless transceiver function, and may be deployed on land, for example, an indoor or outdoor device. The terminal may also be deployed on a water surface (for example, on a ship). The terminal may also be deployed in the air (for example, on a drone, an airplane, a balloons, or satellite). The terminal device may be fixed in place or mobile. The terminal may be a mobile phone, a tablet computer (e.g., Pad), or a computer with a wireless transceiver function. Alternatively, the terminal in embodiments of this application may be a wireless terminal utilized in virtual reality (VR), augmented reality (AR), industrial control, self driving (e.g., autonomous vehicles), telemedicine (e.g., remote medical), smart grid, transportation safety, smart city, smart home, and the like. An application scenario is not limited in embodiments of this application.

The terminal may be referred to as a terminal device, user equipment (UE), an access terminal device, a station, a UE unit, a UE station, a mobile station, a mobile, a remote station, a remote terminal device, a mobile device, a UE terminal device, a wireless communication device, a UE agent, a UE apparatus, or another appropriate term.

The access network device may be a device configured to support the terminal in accessing the communication system on an access network side. The access network device may be referred to as a base station (BS), for example, an evolved NodeB (eNB) in a 4G access technology communication system, a next generation NodeB (gNB) in a 5G access technology communication system, a transmission reception point (TRP), an access point (AP), an access node in a Wi-Fi system, a wireless backhaul node, or the like. Alternatively, the access network device may be referred to as a donor node, an IAB donor, a donor IAB, a donor, a donor gNB (DgNB), or the like. An IAB donor may be referred to as a donor node, a DgNB, or another appropriate name. This is not limited in this application.

The base station may be a macro base station, a micro base station, a picocell base station, a small cell, a relay station, or the like. A plurality of base stations may support a plurality of networks using a same technology mentioned above, or may support the plurality of networks using different technologies mentioned above. The base station may include one or more co-site or non-co-site transmission reception points (TRP). The access network device may alternatively be a radio controller, a central unit (CU), and/or a distributed unit (DU) in a cloud radio access network (CRAN) scenario. The access network device may alternatively be a server, a wearable device, a vehicle-mounted device, or the like. The following disclosure provides descriptions by using an example in which the access network device is a base station. A plurality of access network devices in the communication system may be base stations of a same type, or may be base stations of different types. The base station may communicate with the terminal, or may communicate with the terminal device through a relay station. The terminal may communicate with a plurality of base stations using different technologies. For example, the terminal may communicate with a base station supporting a long term evolution (LTE) network, or may communicate with a base station supporting a 5G network, or may support dual connections to a base station in an LTE network and a base station in a 5G network.

The relay node may be a node that provides a wireless access service and/or a wireless backhaul service. The wireless access service is a data and/or signaling access service provided through a wireless access link, and the wireless backhaul service is a data and/or signaling backhaul service provided through a wireless backhaul link. The relay node is configured to forward data and/or signaling between the terminal and the access network device. In one aspect, the relay node provides the wireless access service for the terminal through an access link (AL). In another aspect, the relay node is connected to the access network device through a one-hop or multi-hop backhaul link (BL).

The relay node may have different names in different communication systems. For example, the relay node may be referred to as a wireless backhaul node or a wireless backhaul device. For example, in a 5G system, the relay node may be referred to as an integrated access and backhaul node (IAB node). Certainly, in a future communication system, the relay node may further have different names. This is not limited herein.

Optionally, the relay node may also be conducted by a terminal device. Alternatively, the relay node may also be a customer premises equipment (CPE) in a home access scenario. For example, the IAB node may be a device like CPE or a residential gateway (RG). In this case, the method provided in embodiments of this application may further be applied to a home access scenario.

FIG. 1 is a schematic diagram of an IAB network. The following describes the foregoing communication system with reference to FIG. 1. In FIG. 1, the at least one terminal in the communication system includes a terminal 1 and a terminal 2, the at least one relay node includes an IAB node 2, an IAB node 1, and an IAB node 3, and the at least one access network device includes an IAB donor 1 and a master eNB (MeNB). A core network including the at least one core network device may include a 5G core network (5GC) and an evolved packet core (EPC).

In FIG. 1, the terminal 1 is connected to the IAB node 1, the terminal 2 is connected to the IAB node 2, the IAB node 1 is connected to the IAB node 2, the IAB node 1 is connected to the IAB node 3, and the IAB node 3 is connected to the IAB donor 1.

In the IAB network, for the IAB node, when serving as a parent node, the IAB node may play a role similar to the access network device, to provide an access service for a child node of the IAB node. For example, the IAB node may allocate, to the child node of the IAB node through scheduling, an uplink resource for uplink data transmission. When the IAB node serves as a child node, for a parent node serving the IAB node, the IAB node may play a role of the terminal device. For example, the IAB node may establish a connection to the parent node through operations such as cell selection and random access, and obtain an uplink resource that is for uplink data transmission and that is scheduled by the parent node for the IAB node.

By way of example and not limitation, in embodiments of this application, a functional unit that is in the IAB node and that supports the IAB node in implementing the role of the terminal device is referred to as a mobile terminal (MT) functional unit of the IAB node, which is referred to as an IAB-MT or IAB-UE for short, and a functional unit that is in the IAB node and that supports the IAB node in implementing the role of the access network device is referred to as a DU functional unit of the IAB node, which is referred to as an IAB-DU for short. The IAB-MT and the IAB-DU may be logical functional units, and functions of the IAB-MT and the IAB-DU are implemented by the IAB node. Alternatively, the IAB-MT and the IAB-DU may be physical divided, and the IAB-MT and the IAB-DU may be different physical devices in the IAB node.

For example, in FIG. 1, the IAB node 1, the IAB node 2, and the IAB node 3 respectively include an MT functional unit and a DU functional unit.

In the IAB network, the IAB donor may use a central unit-distributed unit (CU-DU) separation architecture, and the IAB donor may include a central unit (CU) and a distributed unit (DU). The CU and the DU may be separated according to a protocol stack. In a possible manner, a radio resource control (RRC) layer, a service data mapping protocol (SDAP), and a packet data convergence protocol (PDCP) layer are deployed on the CU, and a radio link control (RLC) layer, a media access control (MAC) layer, and a physical (PHY) layer are deployed on the DU.

One CU may be connected to one or more DUs, to facilitate network expansion. The CU and the DU are connected through an interface (for example, an F1 interface), and the CU and the core network (for example, a 5GC) are connected through an interface (for example, an NG interface).

In an implementation, the CU includes a user plane (UP) (which is referred to as a CU-UP for short in this application) and a control plane (CP) (which is referred to as a CU-CP for short in this application).

For example, in FIG. 1, the IAB donor 1 includes an IAB donor DU 1 and an IAB donor CU 1, and the IAB donor CU 1 includes an IAB donor CU 1-CP and an IAB donor CU 1-UP. The IAB donor DU 1 is connected to the IAB donor CU 1-CP and IAB donor CU 1-UP.

The communication system shown in FIG. 1 supports a networking mode of standalone (SA) or non-standalone (NSA).

In the SA networking mode, the IAB donor CU 1-UP and the IAB donor CU 1-CP are connected to the 5GC.

In the NSA networking mode, the IAB donor 1 serves as a secondary gNB (SgNB) and a MeNB to establish dual connections for the IAB node and/or the terminal. In FIG. 1, as shown by dashed lines, the terminal 1, the terminal 2, the IAB node 2, the IAB node 1, and the IAB node 3 are separately connected to the MeNB, the IAB donor CU 1-CP is connected to the MeNB, the MeNB is connected to the EPC, and the IAB donor CU 1-CP is connected to the EPC.

It may be understood that, in the IAB network, one transmission path between the terminal and the donor node may include one or more IAB nodes. When one IAB node is a node accessed by the terminal, a link between the IAB node and a child node (namely, the terminal) may be referred to as an access link. When one IAB node is a node that provides a backhaul service for the terminal served by another IAB node, a link between the IAB node and a child node (namely, the another IAB node) may be referred to as a backhaul link. For example, in FIG. 1, the terminal 1 is connected to the IAB node 1 over a wireless access link, the IAB node 1 is connected to the IAB node 3 over a wireless backhaul link, and the IAB node 3 is connected to the IAB donor 1 over a wireless backhaul link.

To improve service transmission reliability, optionally, in the IAB network, multi-hop IAB node networking and multi-connectivity IAB node networking are both supported. There may be a plurality of transmission paths between the terminal and the IAB donor. On a path, there is a determined hierarchical relationship between IAB nodes and between the IAB nodes and a donor node serving the IAB nodes. Each IAB node or terminal considers a node that provides an access service for the IAB node or terminal as a parent node. Correspondingly, each IAB node or terminal may be considered as a child node of the parent node of the IAB node or the terminal.

In addition, in embodiments of this application, a parent node of the parent node of the IAB node is referred to as a grandparent node of the IAB node, and a child node of the child node of the IAB node is considered as a grandchild node of the IAB node.

It may be understood that a parent node and a child node are relative concepts. A node may be a child node relative to one node, and may be a parent node relative to another node. For example, in FIG. 1, the IAB node 2 is a parent node of the terminal 2, the terminal 2 is a child node of the IAB node 2, the IAB node 1 is a parent node of the terminal 1 and the IAB node 2, and the terminal 1 and the IAB node 2 are child nodes of the IAB node 1. IAB node 3 is a parent node of IAB node 1, and IAB node 1 is a child node of IAB node 3. The IAB donor 1 (which may be the IAB donor DU 1) is a parent node of the IAB node 3, and the IAB node 3 is a child node of the IAB donor 1 (which may be the IAB donor DU 1).

An uplink data packet of the terminal may be transmitted to the donor node through one or more IAB nodes, and are then sent by the donor node to the core network device, for example, a mobile gateway device (for example, a user plane function (UPF) network element in a 5G network). A downlink data packet of the terminal is received by the donor node from the core network device (namely, the mobile gateway device), and are then sent to the terminal through one or more IAB nodes.

For example, in FIG. 1, a transmission path of an uplink data packet between the terminal 1 and the IAB donor 1 is: terminal 1→IAB node 1→IAB node 3→IAB donor 1, and a transmission path of a downlink data packet between the terminal 1 and the IAB donor 1 is: IAB donor 1→IAB node 3→IAB node 1→terminal 1.

For another example, in FIG. 1, a transmission path of an uplink data packet between the terminal 2 and the IAB donor 1 is: terminal 2→IAB node 2→IAB node 1→IAB node 3→IAB donor 1, and a transmission path of a downlink data packet between the terminal 2 and the IAB donor 1 is: IAB donor 1→IAB node 3→IAB node 1→IAB node 2→terminal 2.

In the IAB network, on one transmission path, an IAB node accessed by the terminal may be referred to as an access IAB node, and another IAB node on the transmission path is referred to as an intermediate IAB node. The intermediate IAB node may provide a backhaul service for the terminal. One IAB node may be used as an access IAB node of a terminal, and may also be used as an intermediate IAB node of another terminal.

For example, in FIG. 1, on the path "terminal 1→IAB node 1→IAB node 3→IAB donor 1", the IAB node 1 is an access IAB node, and the IAB node 3 is an intermediate IAB node. On the path "terminal 2→IAB node 2→IAB node 1→IAB node 3→IAB donor 1", the IAB node 2 is an access IAB node, and the IAB node 1 and the IAB node 3 are intermediate IAB nodes.

In the IAB network, one or more IAB nodes served by the IAB node and one or more terminals may be referred to as descendant nodes of the IAB node. It may be understood that the descendant nodes may include an IAB node served by the IAB node. Alternatively, it may be understood that the descendant nodes include an IAB node connected to the IAB node over at least a one-hop link, for example, the descendant node includes a child node and a grandchild node, and a terminal that accesses these IAB nodes, for example, a terminal that includes an access child node and an access grandchild node.

For example, in FIG. 1, descendant nodes of the IAB node 3 include the IAB node 1, the terminal 1, the IAB node 2, and the terminal 2.

The foregoing IAB network is merely an example. In an IAB network with multi-hop and multi-connectivity combined, there are more other possibilities in the IAB network. For example, a donor node and an IAB node served by another donor node form dual connectivity to serve a terminal. The possibilities are not listed one by one herein.

Figure 2:
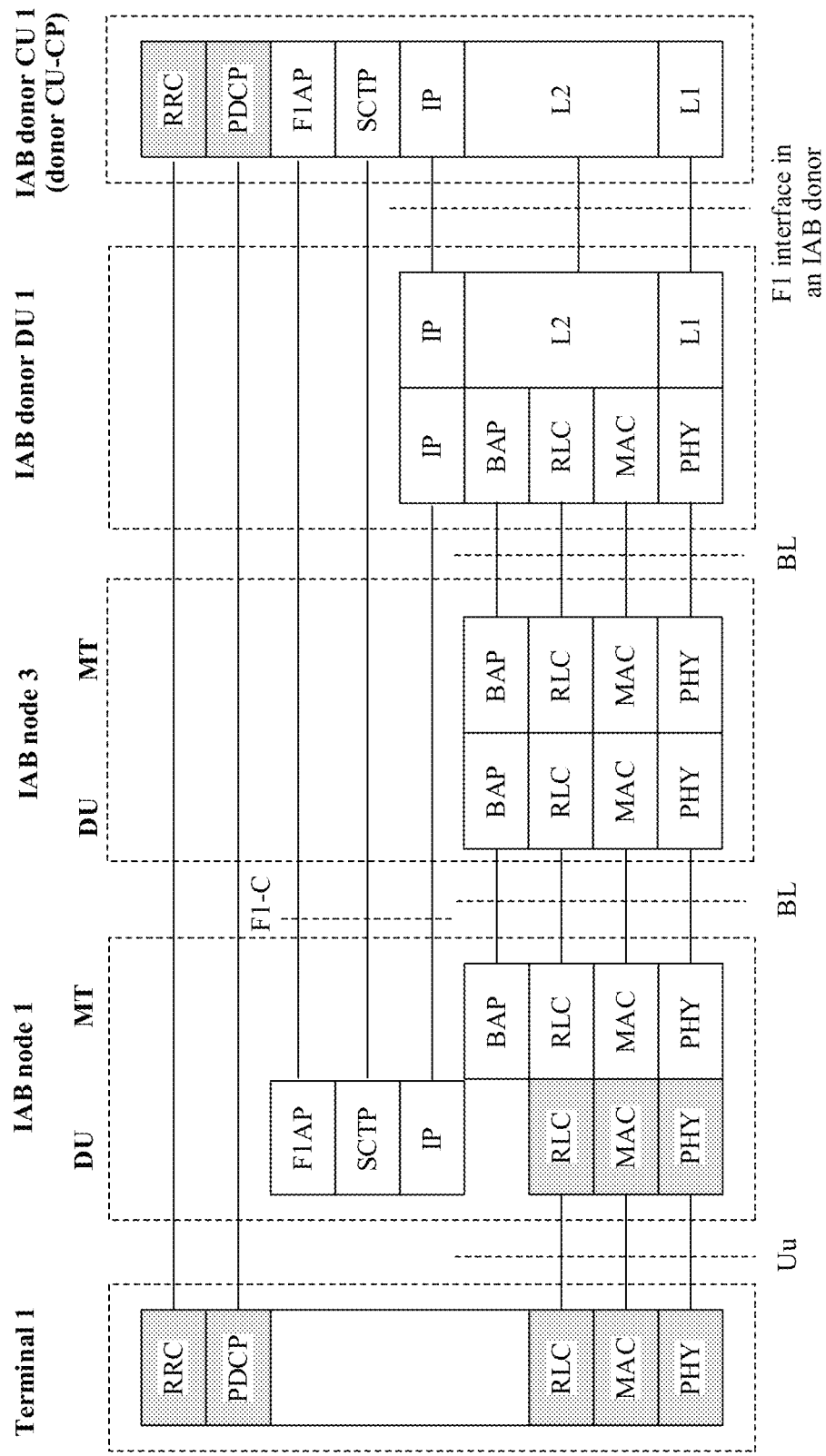
FIG. 2 is a schematic diagram of a control plane protocol stack in an IAB network according to an embodiment of this application.
Figure 3:
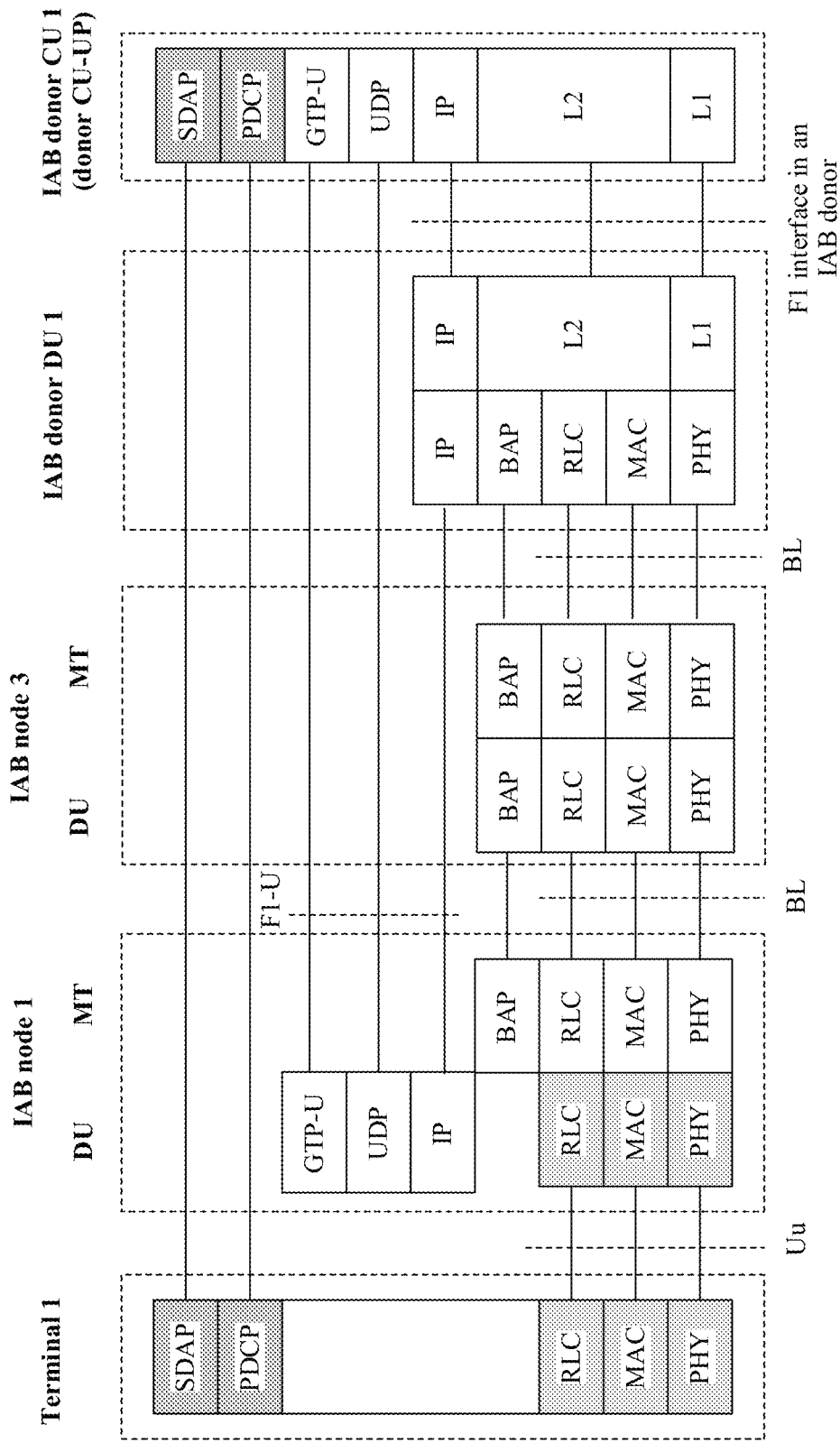
FIG. 3 is a schematic diagram of a user plane protocol stack in an IAB network according to an embodiment of this application.

FIG. 2 is a schematic diagram of a control plane protocol stack in an IAB network according to an embodiment of this application, and FIG. 3 is a schematic diagram of a user plane protocol stack in an IAB network according to an embodiment of this application. FIG. 2 and FIG. 3 are described by using the scenario in FIG. 1 as an example.

In the IAB network, peers of a PHY layer, a MAC layer, and an RLC layer that are of the terminal are located on the access IAB node, and peers of a PDCP layer, an SDAP layer, and an RRC layer that are of the UE are located on the IAB donor CU. If the IAB donor CU includes a CP and a UP, a peer of an RRC layer of the UE is located on the CP (namely, a donor-CU-CP) of the IAB donor CU, and peers of a PDCP layer and an SDAP layer that are of the UE are located on the UP (namely, a donor-CU-UP) of the IAB donor CU.

For the control plane, as shown in FIG. 2, a Uu interface is established between the terminal 1 and the DU of the IAB node 1, and peer protocol layers include an RLC layer, a MAC layer, and a PHY layer. An F1-C interface is established between the DU of the IAB node 1 and the IAB donor CU 1, and peer protocol layers include an F1AP layer, a stream control transmission protocol (SCTP) layer, and an internet protocol (IP) layer. An F1 interface in the IAB donor is established between the IAB donor DU 1 and the IAB donor CU 1, and peer protocol layers include an IP layer, a layer (L) 2, and a layer (L) 1. A BL is established between the IAB node 1 and the IAB node 3, and between the IAB node 3 and the IAB donor DU 1, and peer protocol layers include a backhaul adaptation protocol (BAP) layer, an RLC layer, a MAC layer, and a PHY layer. In addition, an equivalent RRC layer and a PDCP layer are established between the terminal 1 and the IAB donor CU 1, and an equivalent IP layer is established between the DU of the IAB node 1 and the IAB donor DU 1.

In embodiments of this application, the layer 1 is a physical layer of the International Organization for Standardization (ISO protocol), and the layer 2 is a data link layer. The L2 may further include at least one of an MAC layer, a logical link control layer (LLC), a point to point protocol layer (PPP), and a link layer of an Ethernet technology. Specific protocol layers included in L1 and L2 are not limited in embodiments of this application.

In embodiments of this application, the BAP layer has one or more of the following capabilities: adding, to a data packet, routing information that can be identified by a wireless backhaul node (e.g., an IAB node); performing route selection based on the routing information that can be identified by the wireless backhaul node; adding, to the data packet, identification information that is related to a quality of service (QoS) requirement and that can be identified by the wireless backhaul node; performing, for the data packet, QoS mapping on a plurality of links including the wireless backhaul node; adding data packet type indication information to the data packet; and sending flow control feedback information to a node that has a flow control capability. It should be noted that a protocol layer having these capabilities is not necessarily named as the BAP layer, and may also have another name. A person skilled in the art may understand that any protocol layer having these capabilities may be understood as a BAP layer in embodiments of this application.

For the user plane, as shown in FIG. 3, a Uu interface is established between the terminal 1 and the DU of the IAB node 1, and peer protocol layers include an RLC layer, a MAC layer, and a PHY layer. An F1-U interface is established between the DU of the IAB node 1 and the IAB donor CU 1, and peer protocol layers include a GTP-U layer, a UDP layer, and an IP layer. An F1 interface in the IAB donor is established between the IAB donor DU 1 and the IAB donor CU 1, and peer protocol layers include an IP layer, an L2, and an L1. ABL is established between the IAB node 1 and the IAB node 3, and between the IAB node 3 and the IAB donor DU 1, and peer protocol layers include a BAP layer, an RLC layer, a MAC layer, and a PHY layer. In addition, an equivalent SDAP layer and a PDCP layer are established between the terminal 1 and the IAB donor CU 1, and an equivalent IP layer is established between the DU of the IAB node 1 and the IAB donor DU 1.

In FIG. 2 and FIG. 3, only a protocol stack of a link between the terminal 1 and the IAB donor 1 is used as an example for description. It should be noted that one IAB node may play one or more roles. The IAB node may have one or more protocol stacks of the one or more roles. Alternatively, the IAB node may have one protocol stack, and for different roles of the IAB node, protocol layers corresponding to different roles in the protocol stacks may be used for processing. The following provides descriptions by using an example in which the IAB node has the protocol stacks of the one or more roles.

(1) Protocol Stack of a Terminal

When the IAB node initiates accessing the IAB network or after accessing the IAB network, the IAB node may act as a terminal. An MT of the IAB node has a protocol stack of the terminal, for example, a protocol stack of the terminal 1 in FIG. 2 and FIG. 3. The IAB node may transmit an uplink and/or downlink data packet (for example, an operations, administration, and maintenance (OAM) data packet) of the IAB node to the IAB donor, perform measurement at an RRC layer, and the like.

(2) Protocol Stack of an Access IAB Node

After the IAB node accesses the IAB network, the IAB node may provide an access service for a terminal, to function as an access IAB node. In this case, the IAB node has a protocol stack of the access IAB node, for example, the protocol stack of the IAB node 1 in FIG. 2 and FIG. 3.

(3) Protocol Stack of an Intermediate IAB Node

After accessing the IAB network, the IAB node may play a role of an intermediate IAB node. In this case, the IAB node has a protocol stack of the intermediate IAB node, for example, the protocol stack of the IAB node 3 in FIG. 2 and FIG. 3.

The IAB node may have a protocol stack of one or more roles of the terminal, the access IAB node, and the intermediate IAB node.

Figure 4:
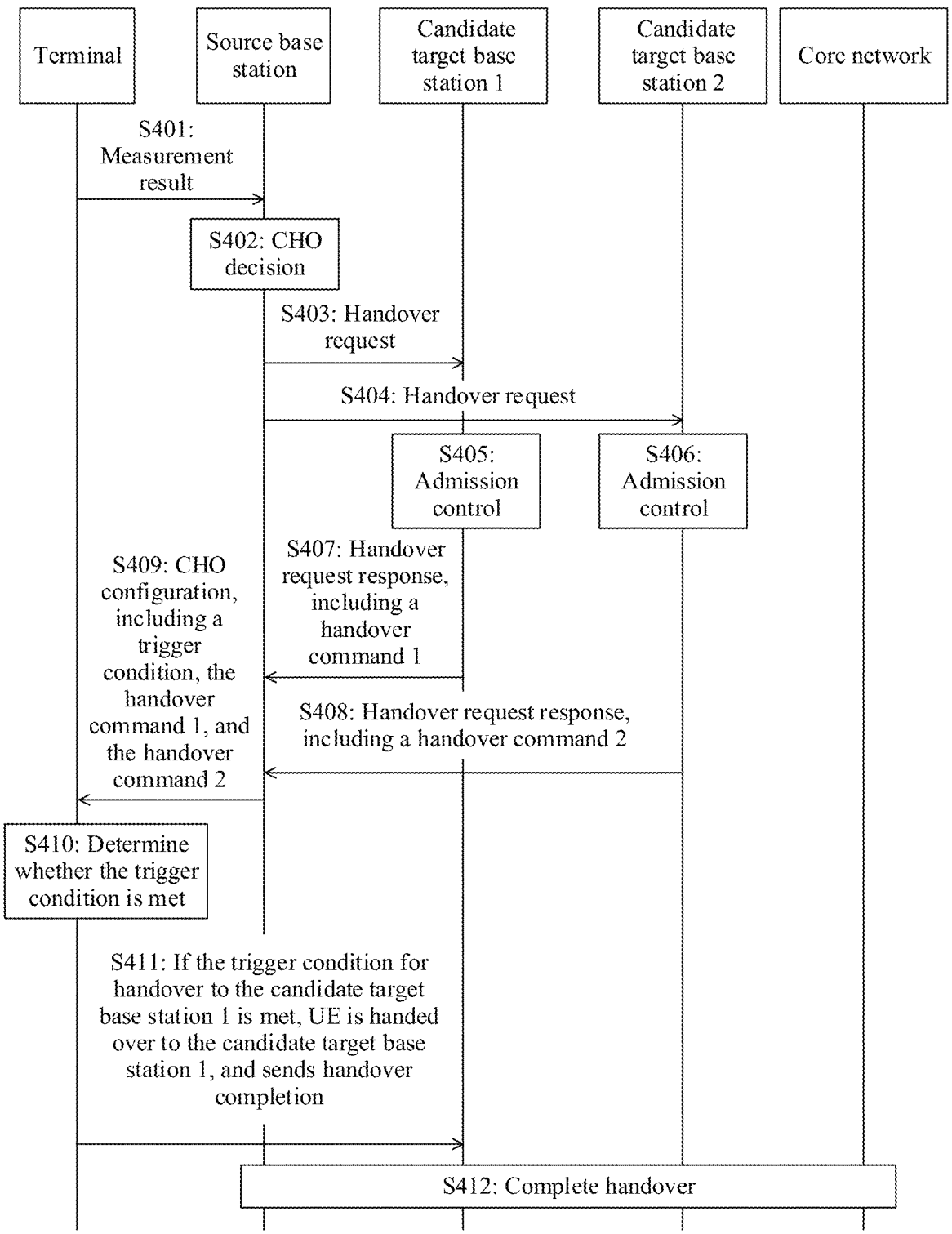
FIG. 4 is a schematic diagram of a conditional handover according to an embodiment of this application.

A conditional handover is introduced to increase a robustness of UE handovers. FIG. 4 is a schematic diagram of a conditional handover. The solution in FIG. 4 may be applied to a non-relay scenario, that is, a terminal that directly communicates with a base station through an air interface, and a relay node does not exist between the terminal and the base station.

S401: A terminal reports a measurement result to a source base station.

Before S401, the method in FIG. 4 further includes that the source base station delivers measurement control to the terminal, and then the terminal performs measurement based on the measurement control, and reports the measurement result to the source base station.

The measurement result may include information about signal quality of cells of one or more base stations.

S402: The source base station makes a conditional handover (CHO) decision.

The source base station may determine, based on the measurement result, cells of one or more candidate target base stations to which the terminal performs conditional handover. In this application, a candidate target base station 1 and a candidate target base station 2 are used as examples for description. For ease of description, a cell of the candidate target base station 1 is referred to as a candidate target cell 1, and a cell of the candidate target base station 2 is referred to as a candidate target cell 2.

S403: The source base station sends a handover request to the candidate target base station 1.

The handover request may include information about the candidate target cell 1.

S404: The source base station sends a handover request to the candidate target base station 2.

The handover request may include information about the candidate target cell 2.

S405: The candidate target base station 1 performs admission control.

The candidate target base station 1 may determine whether to accept the conditional handover of the terminal from the cell of the source base station to the candidate target cell 1, and when the handover is accepted, S407 is performed.

S406: The candidate target base station 2 performs admission control.

The candidate target base station 1 may determine whether to accept the conditional handover of the terminal from the cell of the source base station to the candidate target cell 2, and when the handover is accepted, S408 is performed.

S407: The candidate target base station 1 sends a handover request response to the source base station, where the handover request response includes a handover command 1.

The handover command 1 is a handover command generated by the candidate target base station 1 for the terminal.

S408: The candidate target base station 2 sends a handover request response to the source base station, where the handover request response includes a handover command 2.

The handover command 2 is a handover command generated by the candidate target base station 2 for the terminal.

S409: The source base station sends a CHO configuration to the terminal, where the CHO configuration includes a trigger condition, the handover command 1, and the handover command 2.

The trigger condition may include a trigger condition of the candidate target cell 1 and a trigger condition of the candidate target cell 2. It may be understood that, when the trigger condition of the candidate target cell 1 is met, the terminal is handed over to the candidate target cell 1 based on the handover command 1. When the trigger condition of the candidate target cell 2 is met, the terminal is handed over to the candidate target cell 2 based on the handover command 2.

For example, the trigger condition of the candidate target base station 1 may be that signal quality of the terminal in the candidate target cell 1 meets a threshold range, and signal quality of the terminal in a serving cell of the source base station meets another threshold range. For example, a reference signal receive power (RSRP) of the candidate target cell 1 measured by the terminal is greater than a threshold 1, and an RSRP of the terminal in the serving cell of the source base station is less than a threshold 0. Similarly, the trigger condition of the candidate target base station 2 may be that signal quality of the terminal in the candidate target cell 2 meets a threshold range, and signal quality of the terminal in the serving cell of the source base station meets another threshold range. For example, an RSRP of the candidate target cell 2 measured by the terminal is greater than a threshold 2, and the RSRP of the terminal in the serving cell of the source base station is less than the threshold 0.

The trigger condition of the candidate target cell 1 may be the same as the trigger condition of the candidate target cell 2. It may be understood that, in this case, the CHO configuration may include only one trigger condition, and the trigger condition is applicable to the candidate target cell 1 and the candidate target cell 2. For example, the trigger condition may be that the terminal is handed over to the corresponding candidate target cell when signal quality of the candidate target cell corresponding to the handover command meets a threshold range and signal quality of the serving cell of the source base station meets another threshold range.

S410: The terminal determines whether the trigger condition is met.

The terminal may separately measure the signal quality of the candidate target cell 1 and the candidate target cell 2, and then separately determine whether the trigger condition of the candidate target cell 1 and the trigger condition of the candidate target cell 2 are met.

S411: If the trigger condition for handover to the candidate target cell 1 is met, the terminal is handed over to the candidate target cell 1, and sends handover completion to the candidate target base station 1.

For example, when the terminal measures that the RSRP of the candidate target cell 1 is greater than the threshold 1, and the RSRP of the terminal in the serving cell of the source base station is less than the threshold 0, the terminal is handed over to the candidate target cell 1 (for example, the terminal performs random access to the candidate target base station 1). Then, the terminal sends the handover completion to the candidate target base station 1 in the candidate target cell 1.

S412: The source base station, the candidate target base station 1, the candidate target base station 2, and the core network complete the handover.

In the conditional handover in FIG. 4, the source base station may configure a "low threshold" through measurement control, so that the terminal can find a candidate target base station as soon as possible. After finding a candidate target base station that meets the "low threshold", the terminal may send a measurement report to a network (that is, S401), so that the source base station and the candidate target base station perform handover preparation in advance (that is, S403 to 408), and the terminal receives a handover command of the candidate target base station in advance (that is, S409). Then, the terminal performs a measurement to determine whether a trigger condition of the candidate target base station is met (that is, S410), and when the trigger condition of the candidate target base station is met, the terminal is handed over to the candidate target base station (that is, S411). Through the conditional handover, a case in which a conventional handover fails due to poor link quality, a measurement report cannot reach a source base station, or a handover command cannot reach a terminal can be avoided, to improve robustness of the handover and ensure service continuity of the terminal.

The foregoing describes the conditional handover in a non-relay scenario with reference to FIG. 4, and the foregoing conditional handover solution may also be applied to a relay scenario. In the relay scenario (for example, an IAB network), an IAB node may be handed over from one parent node to another due to signal quality between the IAB node and the parent node, a load change in a network, or the like. In a handover process of the IAB node, the IAB node and one or more subordinate nodes served by the IAB node may be handed over as a group. A node whose parent node changes in the group may be referred to as a head node, a root node, or a migration node. Other nodes in the group are subordinate nodes or descendant nodes of the root node. The group handover may be understood as that the root node in the group is handed over from a source parent node to a target parent node, and other nodes in the group are handed over along with the head node. In other words, the group is handed over as a whole, and a connection relationship between nodes in the group remains unchanged.

The conditional handover solution may be used in the relay scenario. Similar to the terminal in FIG. 4, the root node may receive a handover command for conditional handover and a trigger condition corresponding to the handover command, and the root node may determine whether the trigger condition is met. In addition, when the trigger condition is met, the handover is performed based on the handover command corresponding to the trigger condition. For example, if signal quality of the root node in a cell served by the source parent node is less than a first threshold, and signal quality of the root node in a cell served by the target parent node is greater than a second threshold, the root node may trigger a handover from the source parent node to the target parent node.

However, for a descendant node in the group, similar to the terminal in FIG. 4, the descendant node may receive the handover command for the conditional handover and the trigger condition corresponding to the handover command, but a parent node of the descendant node does not change. Signal quality of the descendant node in the serving cell of the parent node accessed by the descendant node may still be sufficient. Therefore, the descendant node cannot trigger the handover when the trigger condition is met. As a result, the descendant node may not perform the handover in time along with the root node, and the descendant node is disconnected from the parent node. As a result, a service transmission of the terminal is interrupted.

To resolve the foregoing problem, embodiments of this application provide a solution. After determining to perform handover by using a set of handover commands, a parent node in a group sends indication information to a child node, and the child node determines, based on the indication information, to perform the handover by using a set of handover commands. Therefore, it can be ensured that a descendant node in the group is handed over along with a root node, and service transmission interruption of a terminal caused by interruption of a connection between the descendant node and the parent node is avoided, thereby improving service transmission continuity of the terminal.

Figure 5:
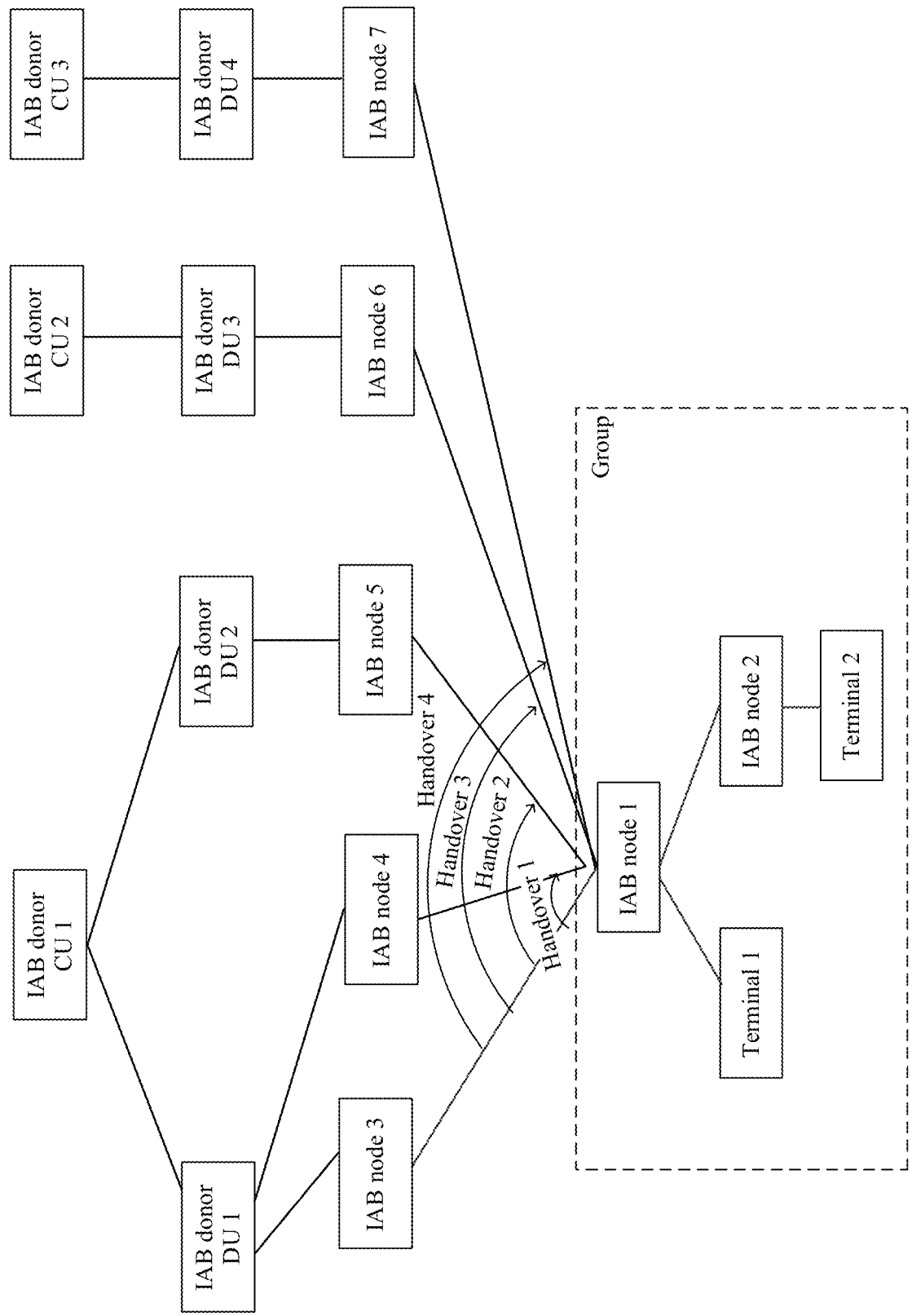
FIG. 5 is a schematic diagram of a group handover according to an embodiment of this application.

The following first describes a group handover in embodiments of this application. FIG. 5 is a schematic diagram of a group handover according to an embodiment of this application. The following describes the group handover with reference to FIG. 5.

As shown in FIG. 5, a node that needs to be handed over is an IAB node 1, and the IAB node 1 may be one or more terminals and/or child nodes, and provide access and/or backhaul services. FIG. 5 shows a terminal 1 and a sub-node IAB node 2 that accesses a cell served by the IAB node 1, and a terminal 2 that accesses a cell served by the IAB node 2. In actual network deployment scenarios, the IAB node 1 may have one or more grandchild nodes (i.e., the one or more grandchild nodes are connected to the IAB node 1 over at least two-hop wireless backhaul links), and the IAB node 2 may further serve more terminals, child nodes, or grandchild nodes, which are not shown one by one in the foregoing figure. However, it may be understood that these possible scenarios are not limited by the examples in the foregoing figure.

The IAB node 1 is a root node, and an IAB node and/or a terminal connected to an IAB donor DU 1 through the IAB node 1 is a subordinate node or a descendant node of the IAB node 1. It may be understood that the IAB node 1 provides access and/or backhaul services for the one or more descendant nodes. In FIG. 5, descendant nodes of the IAB node 1 include the terminal 1, the IAB node 2, and the terminal 2.

The IAB node 1 can be handed over from a source parent node (that is, a parent node connected to IAB node 1 before the handover) to a target parent node (that is, a parent node connected to IAB node 1 after the handover). The one or more descendant nodes of the IAB node 1 (that is, the IAB node 1, the terminal 1, the IAB node 2, and the terminal 2 in FIG. 5) can be handed over along with the IAB node 1, so that the IAB node 1 and the one or more descendant nodes of the IAB node 1 are considered as one group, and the group is handed over.

Based on whether the source parent node and the target parent node of the root node of the group are connected to a same donor node or are connected to different donor nodes, a group handover may be classified into an intra-donor node group handover and a cross-donor node group handover. The following uses the scenario in FIG. 5 as an example for description with reference to a handover 1, a handover 2, a handover 3, and a handover 4.

The intra-donor node group handover may be understood as that the group is connected to a same donor node before and after the handover. During the intra-donor node handover, although the parent node of the one or more descendant nodes in the group does not change, a path between each of the one or more descendant nodes and the donor node changes, and a configuration of the one or more descendant nodes may need to be changed. The one or more descendant nodes may be handed over along with the donor node, to obtain a new configuration. For example, the one or more descendant nodes include an IAB node, and a configuration of the IAB node includes a resource configuration of a cell served by the IAB node.

Optionally, the donor node may use a CU-DU separation architecture. In this case, the intra-donor node group handover may be referred to as an intra-donor CU handover, and the intra-donor node group handover may include an intra-donor and intra-donor DU group handover (for example, the handover 1 shown in FIG. 5), and an intra-donor CU and cross-donor DU group handover (for example, the handover 2 shown in FIG. 5). The intra-donor CU and intra-donor DU group handover may be understood as a group handover in which neither the donor CU nor the donor DU changes (e.g., not handover). The intra-donor CU and cross-donor DU group handover may be understood as a group handover in which the donor CU does not change and the donor DU changes.

In the handover 1, a source parent node of the root node (that is, the IAB node 1) is the IAB node 3, and a target parent node is the IAB node 4. Both the IAB node 3 and the IAB node 4 are connected to the IAB donor DU 1. The IAB donor DU 1 is connected to an IAB donor CU 1. That is, the IAB node 1 is connected to the IAB donor DU 1 and the IAB donor CU 1 both before and after the handover.

In the handover 2, a source parent node of the root node (that is, the IAB node 1) is the IAB node 3, and a target parent node is the IAB node 5. The IAB node 3 is connected to the IAB donor DU 1, and the IAB donor DU 1 is connected to the IAB donor CU 1. The IAB node 5 is connected to an IAB donor DU 2, and the IAB donor DU 2 is connected to the IAB donor CU 1. That is, the IAB node 1 is connected to the IAB donor DU 1 before the handover, and is connected to the IAB donor DU 2 after the handover. Both the IAB donor DU 1 and the IAB donor DU 2 are connected to the IAB donor CU 1. In embodiments of this application, an IAB donor DU connected to the IAB node 1 before the handover is referred to as a source IAB donor DU, and an IAB donor DU connected to the IAB node 1 after the handover is referred to as a target IAB donor DU. That is, in the handover 2, the source IAB donor DU is the IAB donor DU 1, and the target IAB donor DU is the IAB donor DU 2.

The cross-donor node group handover may be understood as that the group is connected to different donor nodes before and after the handover. For example, the group is connected to a source donor node before the handover, and the group is connected to a target donor node after the handover. It may be understood that, in the cross-donor node group handover, although the parent node of the one or more descendant nodes in the group does not change, the donor node connected to the one or more descendant nodes changes, and the one or more descendant nodes may be handed over along with the root node, to connect to the new donor node. The cross-donor node group handover may be referred to as a group handover across donor nodes.

The cross-donor node handover in embodiments of this application may be performed based on an interface between the source donor node and the target donor node. In other words, interaction between the source donor node and the target donor node may be performed through the interface between the source donor node and the target donor node, or may be performed based on an interface between the source donor node and a core network and an interface between the core network and the target donor node. In other words, interaction between the source donor node and the target donor node may be performed through the interface between the source donor node and the core network and the interface between the core network and the target donor node, that is, the source donor node and the target donor node may perform information interaction (the interaction includes sending and receiving) through a core network element.

Optionally, the donor node may use a CU-DU separation architecture. In this case, the cross-donor node group handover may include a cross-donor DU and cross-donor CU group handover (for example, the handover 3 and the handover 4). The cross-donor DU and cross-donor CU group handover may be understood as a group handover in which both the donor DU and the donor CU change. The cross-donor DU and cross-donor CU group handover may be referred to as a group handover between donor CUs or cross-donor CU group handover.

In the handover 3, a source parent node of the root node (that is, the IAB node 1) is the IAB node 3, and a target parent node is an IAB node 6. The IAB node 3 is connected to the IAB donor DU 1, and the IAB donor DU 1 is connected to the IAB donor CU 1. The IAB node 6 is connected to an IAB donor DU 3, and the IAB donor DU 3 is connected to an IAB donor CU 2. That is, the IAB node 1 is connected to the IAB donor DU 1 before the handover, and the IAB donor DU 1 is connected to the IAB donor CU 1. The IAB node 1 is connected to the IAB donor DU 3 after the handover, and the IAB donor DU 3 is connected to the IAB donor CU 2.

In the handover 4, a source parent node of the root node (that is, the IAB node 1) is the IAB node 3, and a target parent node is an IAB node 7. The IAB node 3 is connected to the IAB donor DU 1, and the IAB donor DU 1 is connected to the IAB donor CU 1. The IAB node 7 is connected to an IAB donor DU 4, and the IAB donor DU 4 is connected to an IAB donor CU 3. That is, the IAB node 1 is connected to the IAB donor DU 1 before the handover, and the IAB donor DU 1 is connected to the IAB donor CU 1. The IAB node 1 is connected to the IAB donor DU 4 after the handover, and the IAB donor DU 4 is connected to the IAB donor CU 3.

For the cross-donor node group handover, in embodiments of this application, an IAB donor DU connected to the IAB node 1 before the handover is referred to as a source IAB donor DU, and an IAB donor DU connected to the IAB node 1 after the handover is referred to as a target IAB donor DU. An IAB donor CU connected to the IAB node 1 before the handover is referred to as a source IAB donor CU, and an IAB donor CU connected to the IAB node 1 after the handover is referred to as a target IAB donor CU. In the handover 3, the source IAB donor DU is the IAB donor DU 1, the target IAB donor DU is the IAB donor DU 3, the source IAB donor CU is the IAB donor CU 1, and the target IAB donor CU is the IAB donor CU 2.

It should be noted that, the foregoing description is made with reference to the handover 1, the handover 2, the handover 3, and the handover 4. It may be understood that the donor node may not use a CU-DU separation architecture. In this case, the group handover may include an intra-donor node group handover and a cross-donor node group handover.

The handover 1, the handover 2, the handover 3, and the handover 4 are merely examples. A node (including an IAB node and/or a terminal) in the IAB network may configure one or more types of group handover in two types: an intra-donor node group handover and a cross-donor node group handover. In addition, for each type, the node may configure one or more group handovers of the type. For example, for the intra-donor node group handover, the node may configure one or more group handovers of the type of intra-donor node group handover. For example, the node in the group may configure the handover 1 and the handover 2. For another example, for the cross-donor node group handover, the node may configure one or more group handovers of the type of cross-donor node group handover. For example, the node in the group may configure the handover 3 and the handover 4.

Figure 6:
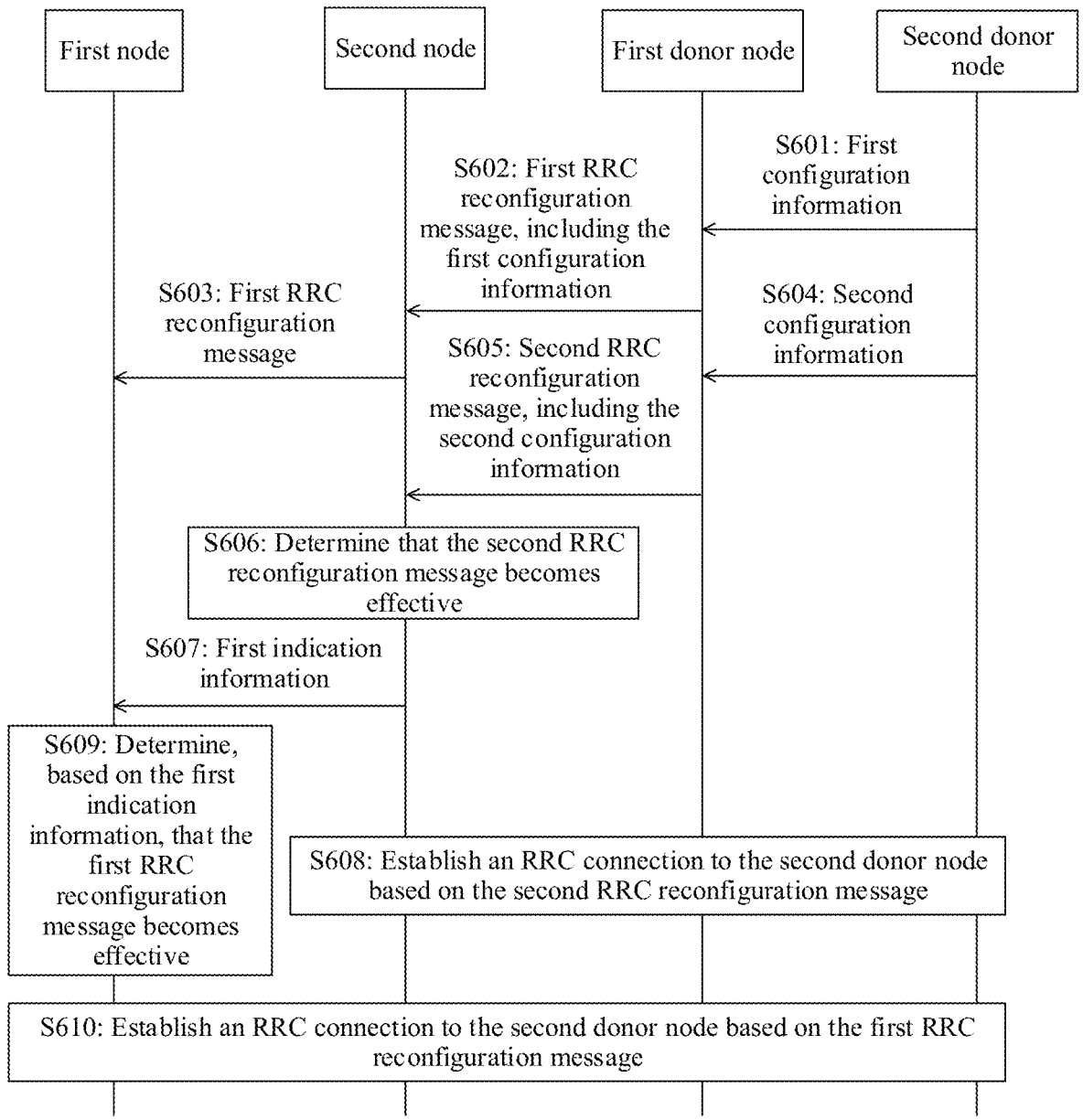
FIG. 6 is a flowchart of a communication method in an IAB system according to an embodiment of this application.

FIG. 6 is a flowchart of a communication method in an IAB system according to an embodiment of this application. The communication method in FIG. 6 may be applied to a cross-donor node group handover scenario in FIG. 5.

In FIG. 6, a first node and a second node are nodes in a group that performs group handover, the second node is a parent node of the first node, the second node may be an IAB node, and the first node may be an IAB node or a terminal.

The second node may be a head node in the group, that is, the first node is handed over with the second node, or the second node is connected to the head node, that is, the second node and the first node are handed over with the head node. A connection manner between the head node and the second node is not limited in this application. For example, the head node may be directly connected to the second node. It may be understood that the head node is a parent node of the second node. The head node is indirectly connected to the second node through one or more nodes.

For example, as shown in FIG. 5, the head node is the IAB node 1, the second node is the IAB node 1, and the first node is the terminal 1 or the IAB node 2. Alternatively, the head node is the IAB node 1, the second node is the IAB node 2, and the first node is the terminal 2.

In the method in FIG. 6, the group handover is cross-donor node group handover. Before the group handover, the group is connected to a first donor node, and after the group handover, the group is connected to a second donor node. In this case, the first donor node may be referred to as a source donor node, and the second donor node may be referred to as a target donor node. For the cross-donor node group handover, refer to content in FIG. 5. Details are not described herein again.

For example, the cross-donor node group handover may be the handover 3 in FIG. 5. The first donor node includes an IAB donor CU 1. Optionally, the first donor node may further include an IAB donor DU 1, and the second donor node includes an IAB donor CU 2. Optionally, the second donor node may further include an IAB donor DU 2. Similarly, the cross-donor node group handover may be the handover 4 in FIG. 5, and details are not described herein again.

As shown in FIG. 6, the method in FIG. 6 includes the following steps.

S601: The second donor node sends first configuration information to the first donor node.

S602: The first donor node sends a first RRC reconfiguration message to the second node, where the first RRC reconfiguration message includes the first configuration information.

Optionally, the first RRC reconfiguration message may be included in an F1AP message sent by the first donor node to the second node. For example, the F1AP message includes an RRC container, and the RRC container includes the first RRC reconfiguration message.

S603: The second node sends the first RRC reconfiguration message to the first node.

Optionally, after receiving the F1AP message, the second node obtains the first RRC reconfiguration message carried in the RRC container in the F1AP message, and sends the first RRC reconfiguration message to the first node.

S604: The second donor node sends second configuration information to the first donor node.

S605: The first donor node sends a second RRC reconfiguration message to the second node, where the second RRC reconfiguration message includes the second configuration information.

Optionally, the second RRC reconfiguration message may be carried in an F1AP message sent by the first donor node to the parent node of the second node. For example, the F1AP message includes an RRC container. The RRC container includes the second RRC reconfiguration message, and the parent node of the second node obtains the second RRC reconfiguration message from the F1AP message, and sends the second RRC reconfiguration message to the second node.

S606: The second node determines that the second RRC reconfiguration message becomes effective.

S607: The second node sends first indication information to the first node.

S606 and S607 may be understood as that the second node sends the first indication information to the first node when determining that the second RRC reconfiguration message becomes effective.

That the first indication information is used to determine that the first RRC reconfiguration message becomes effective may be understood as that the first indication information is used to trigger RRC reconfiguration based on the first RRC reconfiguration message. That is, after receiving the first RRC reconfiguration message, the first node does not directly perform RRC reconfiguration based on the first RRC reconfiguration message, but waits for the first indication information. When the first node receives the first indication information, it indicates that the first RRC reconfiguration may be used for RRC reconfiguration, and the first node performs RRC reconfiguration based on the first RRC reconfiguration message.

The first indication information is used to determine that the first RRC reconfiguration message becomes effective, and may include one or two of the following two meanings:

(1) The first indication information may be used to determine when the first RRC reconfiguration message becomes effective. For example, after the first node receives the first indication information, the first RRC reconfiguration information becomes effective immediately. For another example, after receiving the first indication information, the first node waits for a time duration, and then the first RRC reconfiguration message becomes effective. For another example, after the first indication information is received and a specific condition is met, the first RRC reconfiguration message becomes effective, where the condition may be that a radio link failure (RLF) occurs on a link between the first node and the second node, or signal quality of the first node in the cell served by the second node is lower than a (predetermined) threshold, or the like. A form of the condition is not limited in this application. For an effective time, the first indication information may indicate the effective time, or the first node and the second node may preconfigure the effective time.

(2) The first indication information may be used to determine which RRC reconfiguration message (that is, the first RRC reconfiguration message) becomes effective. It may be understood that a plurality of group handovers may occur in the IAB network. For each group handover, each node in the group corresponding to the group handover may receive one RRC reconfiguration message. The first node may receive a plurality of RRC reconfiguration messages, including the first RRC reconfiguration message. The first indication information is used to determine that the first RRC reconfiguration message in the plurality of RRC reconfiguration messages becomes effective.

Optionally, the first indication information in S607 may be carried in an existing message, or a new message may be defined to carry the first indication information.

The first node may receive the plurality of RRC reconfiguration messages from the second node. The plurality of RRC reconfiguration messages correspond to different group handovers. The plurality of RRC reconfiguration messages includes the first RRC reconfiguration message.

Optionally, the plurality of RRC reconfiguration messages may be encapsulated in a same message and may be sent by the second node to the first node, or the plurality of RRC reconfiguration messages are separately sent by the second node to the first node by using a plurality of messages.

FIG. 5 is used as an example. The handover 1, the handover 3, and the handover 4 are configured for the group in FIG. 5, and each node in the group receives an RRC reconfiguration message respectively corresponding to the handover 1, the handover 3, and the handover 4 of the node. Each node may receive, by using one message, the RRC reconfiguration message of the node respectively corresponding to the handover 1, the handover 3, and the handover 4. For example, the RRC reconfiguration message of the node respectively corresponding to the handover 1, the handover 3, and the handover 4 is encapsulated in a same RRC reconfiguration message and sent to the node. Alternatively, the node may receive, by using a plurality of messages, the RRC reconfiguration message of the node respectively corresponding to the handover 1, the handover 3, and the handover 4. For example, the node receives three RRC reconfiguration messages, which include RRC reconfiguration messages respectively of the node corresponding to the handover 1, the handover 3, and the handover 4.

It may be understood that for each group handover, each node in the group corresponding to the group handover may receive one RRC reconfiguration message, and the RRC reconfiguration message received by each node corresponds to the group handover.

Both the first RRC reconfiguration message and the second RRC reconfiguration message correspond to the cross-donor node group handover.

It may be understood that, because the second node determines that the second RRC reconfiguration message becomes effective, the second node may determine that the first node may perform RRC reconfiguration based on the first RRC reconfiguration message corresponding to the same group handover as the second RRC reconfiguration message.

For example, the first node is the IAB node 2, the second node is the IAB node 1. The first RRC reconfiguration message is an RRC reconfiguration message of the IAB node 2 corresponding to the handover 3 and that is received by the IAB node 2. The second RRC reconfiguration message is an RRC reconfiguration message that is of the IAB node 1 corresponding to the handover 3 and that is received by the IAB node 1. It may be understood that both the first RRC reconfiguration message and the second RRC reconfiguration message correspond to the handover 3.

For another example, the first node is the terminal 2, the second node is the IAB node 2. The first RRC reconfiguration message is an RRC reconfiguration message that is of the terminal 2 corresponding to the handover 3 and that is received by the terminal 2. The second RRC reconfiguration message is an RRC reconfiguration message that is of the IAB node 2 corresponding to the handover 3 and that is received by the IAB node 2. It may be understood that both the first RRC reconfiguration message and the second RRC reconfiguration message correspond to the handover 3.

In an implementation of S606 and S607, the second node is the head node, and the method further includes that the second node receives an effective condition of the second RRC reconfiguration message, the second node determines whether the effective condition is met, and determines that the second RRC reconfiguration message becomes effective when the effective condition is met, and the second node sends the first indication information to the first node. The effective condition may be an A5 event or an A3 event.

For example, the first node is the IAB node 2, the second node is the IAB node 1. The second RRC reconfiguration message is an RRC reconfiguration message that is of the IAB node 1 corresponding to the handover 3 and that is received by the IAB node 1. The effective condition may be an A5 event or an A3 time. The A5 event may be that signal quality that is of a cell (that is, a source cell) served by the IAB node 3 and that is measured by the IAB node 1 is lower than a (predetermined) threshold, and signal quality that is of a cell (the cell may be understood as a candidate target cell of the IAB node 1) served by the IAB node 6 and that is measured by the IAB node 1 is greater than a (predetermined) threshold. The A3 event may be that signal quality that is of the candidate target cell and that is measured by the IAB node 1 is higher than signal quality of the source cell by a certain (predetermined) threshold. When the effective condition is met, the IAB node 1 determines that the RRC reconfiguration message of the IAB node 1 corresponding to the handover 3 becomes effective, and the IAB node 1 sends the first indication information to the IAB node 2. The first indication information is used to determine that the RRC reconfiguration message of the IAB node 2 corresponding to the handover 3 becomes effective.

In another implementation of S606 and S607, the second node is connected to the head node, and the method further includes that the second node receives, from a parent node of the second node (for ease of description, the parent node of the second node is referred to as a third node in the following), indication information used to determine that the second RRC reconfiguration message becomes effective. The second node determines, based on the indication information, that the second RRC reconfiguration message becomes effective, and sends the first indication information to the first node. It may be understood that the group includes the third node, and the third node is the head node, or the third node is connected to the head node, that is, the third node is a descendant node of the head node. The indication information that is used to determine that the second RRC reconfiguration message becomes effective and that is received by the second node from the third node is similar to the first indication information. For details, refer to content of the first indication information.

For example, the first node is the terminal 2, the second node is the IAB node 2. The second RRC reconfiguration message is an RRC reconfiguration message that is of the IAB node 2 corresponding to the handover 3 and that is received by the IAB node 2. The effective condition is that the IAB node 2 receives the indication information from the IAB node 1, the IAB node 2 determines, based on the indication information, that the RRC reconfiguration message of the IAB node 2 corresponding to the handover 3 becomes effective, and the IAB node 2 sends the first indication information to the terminal 2. The first indication information is used to determine that the RRC reconfiguration message of the terminal 2 corresponding to the handover 3 becomes effective.

Optionally, FIG. 6 is described by using an example in which the second node sends the first indication information to the first node. It may be understood that, because the second node may further have a child node that does not belong to the group, the second node may determine which child node belongs to the group and send the first indication information to the child nodes that belong to the group. The following describes the first indication information with reference to three implementations.

In an implementation, the second RRC reconfiguration message includes an identifier of one or more child nodes of the second node in the group, and the one or more child nodes include the first node. The second node sends the first indication information to the first node based on identification information of the first node.

Optionally, the identifier of one or more child nodes of the second node in the group may be carried in the second configuration information, that is, the identifier of the one or more child nodes of the second node in the group is determined by the second donor node. Alternatively, the identifier of the one or more child nodes of the second node in the group may not be carried in the second configuration information, but are carried in the second RRC reconfiguration message, that is, the identifier of the one or more child nodes of the second node in the group is determined by the first donor node.

In another implementation, the second node is the head node. The second RRC reconfiguration message includes identification information of one or more descendant nodes of the second node in the group, and the one or more descendant nodes of the second node include the first node. If the first node in the group further has one or more descendant nodes, the one or more descendant nodes of the second node further include the one or more descendant nodes of the first node.

In the foregoing other implementation, optionally, the identifier of one or more descendant nodes of the second node in the group may be carried in the second configuration information, that is, the identifier of one or more descendant nodes of the second node in the group is determined by the second donor node. Alternatively, the identifier of the one or more descendant nodes of the second node in the group may not be carried in the second configuration information, but are carried in the second RRC reconfiguration message, that is, the identifier of the one or more descendant nodes of the second node in the group is determined by the first donor node.

In still another implementation, the second node is connected to the head node. The indication information that is used to determine that the second RRC reconfiguration message becomes effective and that is received by the second node from the parent node (that is, the third node) of the second node includes identification information of the one or more descendant nodes of the second node in the group. The one or more descendant nodes of the second node include the first node. If the first node in the group further has one or more descendant nodes, the one or more descendant nodes of the second node further include the one or more descendant nodes of the first node.

In the foregoing other implementation and the still another implementation, the second node selects a child node of the second node from the one or more descendant nodes of the second node, for example, the first node, and the second node sends, based on the identification information of the first node, the first indication information to the first node. If the first node in the group further has one or more descendant nodes, the first indication information includes identification information of the one or more descendant nodes of the first node in the group. This facilitates the first node to send, to a child node of the first node, indication information used to determine that an RRC reconfiguration message of the child node becomes effective.

In this application, an identifier of a node may include one or more of the following: a BAP address of the node, an identifier of a cell accessed by the node, and a cell radio network temporary identifier (C-RNTI) of the cell accessed by the node, or an identifier (for example, a gNB-CU UE F1AP ID, or a gNB-DU UE F1AP ID) allocated by the node on an F1 interface between the node and an IAB donor CU.

In the foregoing three implementations, the second node may determine that the first node and the second node are nodes that belong to the group, and send the first indication information to the first node to avoid signaling overheads caused by sending, by the second node, the first indication information to a child node that does not belong to the group, thereby saving signaling resources on an air interface.

Optionally, in addition to the foregoing three implementations, the second node may send the first indication information to all child nodes of the second node. In other words, the second node may not determine whether a child node belongs to the group. This is not limited in embodiments of this application.

S608: The second node establishes an RRC connection to the second donor node based on the second RRC reconfiguration message.

That the second node establishes the RRC connection to the second donor node may be understood as that the second node performs RRC reconfiguration. It may be understood that the second node does not have a RRC connection to the second donor node before performing RRC reconfiguration, and the second node establishes the RRC connection to the second donor node based on the first RRC reconfiguration message. Optionally, after establishing the RRC connection to the second donor node, the second node sends a second RRC reconfiguration complete message to the second donor node.

A sequence between S607 and S608 is not limited in this application. S607 may occur after S608. In other words, the second node may send the first indication information to the first node after performing RRC reconfiguration based on the second RRC reconfiguration message. Alternatively, S607 may be performed before S608, or S607 and S608 may be performed simultaneously.

S609: The first node determines, based on the first indication information, that the first RRC reconfiguration message becomes effective.

S610: The first node establishes an RRC connection to the second donor node based on the first RRC reconfiguration message.

S609 and S610 may be understood as that when the first node determines, based on the first indication information, that the first RRC reconfiguration message becomes effective, the first node performs RRC reconfiguration based on the first RRC reconfiguration message.

That the first node establishes the RRC connection to the second donor node may be referred to as that the first node performs RRC reconfiguration. It may be understood that the first node does not have a RRC connection to the second donor node before performing RRC reconfiguration, and the first node establishes the RRC connection to the second donor node based on the first RRC reconfiguration message. Optionally, after establishing the RRC connection to the second donor node, the first node may send a first RRC reconfiguration complete message to the second donor node.

Optionally, in embodiments of this application, the RRC reconfiguration message (for example, the first RRC reconfiguration message or the second RRC reconfiguration message) may include a handover command configuration, a handover command, a conditional handover configuration, or the like. The RRC reconfiguration may be referred to as a handover or the like. The effective condition may be referred to as a trigger condition or the like. This is not limited in embodiments of this application.

Optionally, in the method in FIG. 6, the first node and/or the second node may receive indication information of cross-donor node group handover. Then, the first node and/or the second node establishes an F1 connection to the second donor node based on the indication information of the cross-donor node group handover. For example, after S608, the second node (which may be a DU of the second node) establishes an F1 connection to the second donor node based on the indication information of the cross-donor node group handover. After S610, the first node (which may be a DU of the first node) establishes an F1 connection to the second donor node based on the indication information of the cross-donor node group handover.

Optionally, the first RRC reconfiguration message may include the indication information of the cross-donor node group handover. For example, the indication information of the cross-donor node group handover may be carried in the first configuration information in the first RRC reconfiguration message. Alternatively, optionally, the first RRC reconfiguration message does not include the indication information of the cross-donor node group handover, and the first node may receive the indication information of the cross-donor node group handover from the second node.

For ease of description, the indication information of the cross-donor node group handover received by the first node is referred to as second indication information. The second indication information may be included in the first indication information. In other words, the first node determines, based on the first indication information, that the first RRC reconfiguration message becomes effective and that the first RRC reconfiguration message corresponds to the cross-donor node group handover, to establish an RRC connection to the second donor node based on the first RRC reconfiguration message, and establish an F1 connection to the second host node.

Optionally, the second RRC reconfiguration message may include the indication information of the cross-donor node group handover. For example, the indication information of the cross-donor node group handover may be carried in the second configuration information in the second RRC reconfiguration message. Alternatively, optionally, the second node may receive, from a parent node of the second node, the indication information of the cross-donor node group handover. The second node may be the head node or may not be the head node. When the second node is the head node, the parent node of the second node includes a source parent node or a target parent node of the second node. This is not limited in embodiments of this application.

According to the method in FIG. 6, the first node may receive the first indication information from the second node, and then determine, based on the first indication information, to perform RRC reconfiguration based on the first RRC reconfiguration message, so as to ensure that the first node is handed over along with the second node. This approach avoids interruption of a service transmission of the terminal caused by the failure of handover of the first node in time, and improve continuity of service transmission of the terminal.

In addition, the first node first receives the first RRC reconfiguration message, and then receives the first indication information used to determine that the first RRC reconfiguration message becomes effective. In one aspect, this can avoid service transmission interruption of the terminal caused by a handover failure when the first RRC reconfiguration message fails to be sent when channel quality is poor. In another aspect, due to complexity of the IAB network architecture, the first RRC reconfiguration message needs to be sent from the first donor node to the first node through a plurality of hops. Delivering the first RRC reconfiguration message in advance can reduce a delay of receiving the first RRC reconfiguration message by the first node, and can further avoid a long delay caused when group handover can be only performed after RRC reconfiguration messages of all nodes in the group are sent. Therefore, service transmission interruption of the terminal caused by the handover process is reduced, and a group handover failure is avoided.

FIG. 6 describes a process in which the second node sends the first indication information to the first node. Optionally, if the group to be handed over further includes a child node of the first node, after the first node determines, based on the first indication information, that the first RRC reconfiguration message becomes effective, the first node may further send the indication information to the child node of the first node, so that the child node determines that the RRC reconfiguration message received by the child node becomes effective. In this case, the first node may perform the action of the second node in FIG. 6, and the child node of the first node may perform the action of the first node in FIG. 6. For a specific process, refer to content in FIG. 6, and details are not described herein again.

Figure 7:
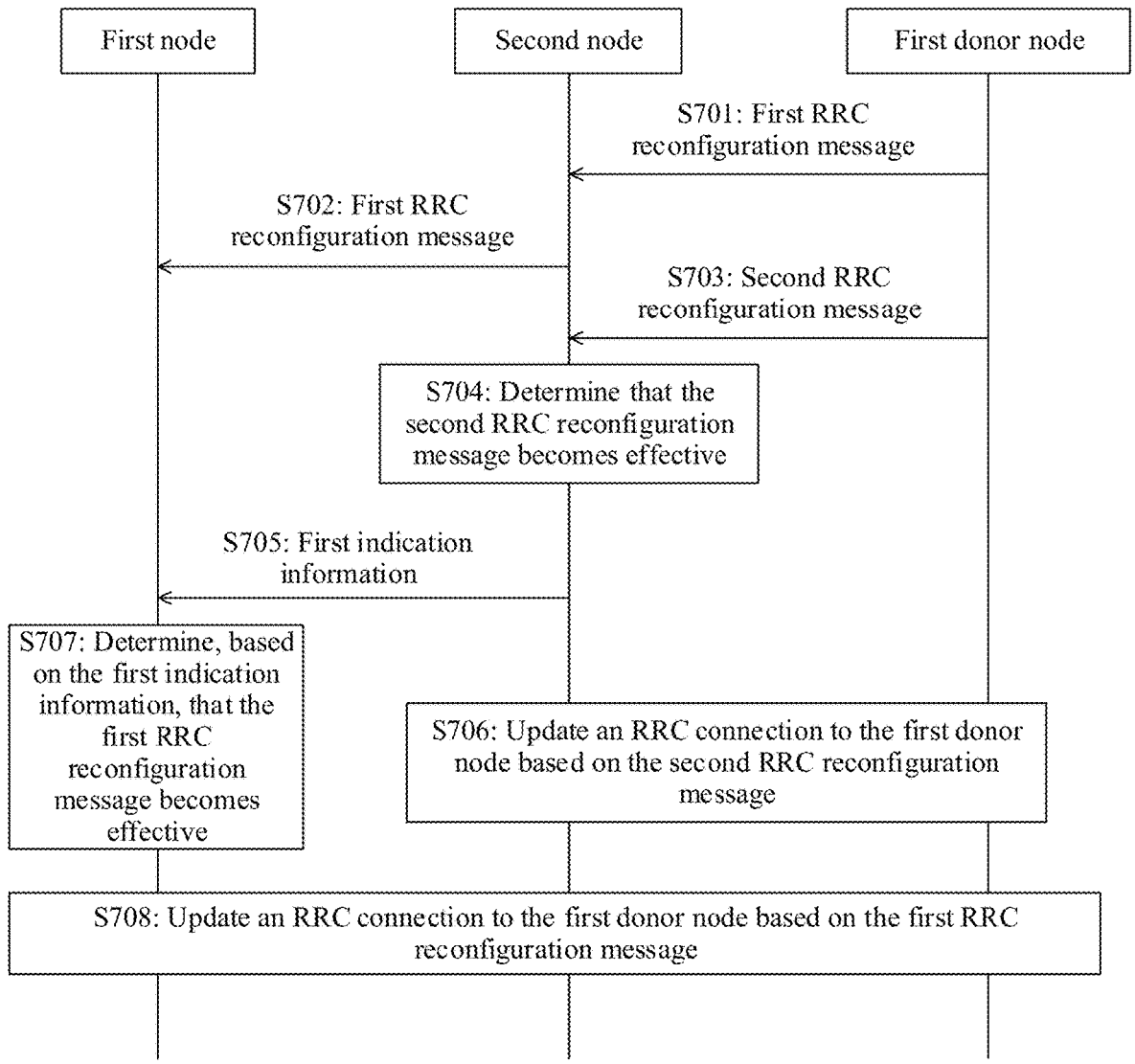
FIG. 7 is a flowchart of a communication method in an IAB system according to an embodiment of this application.
Figure 8A:
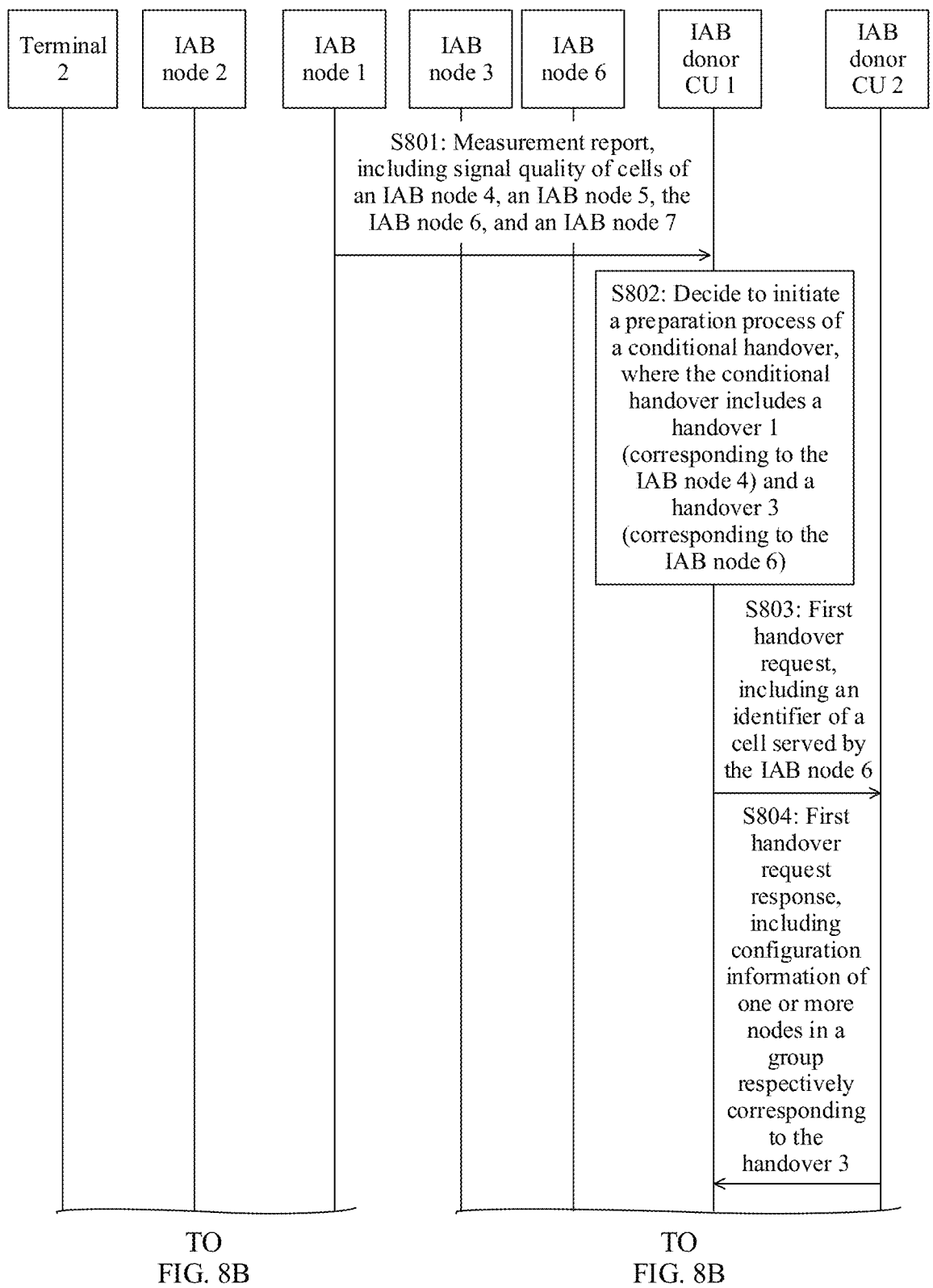
FIG. 8A to FIG. 8D are flowcharts of a communication method in an IAB system according to this application.
Figure 8B:
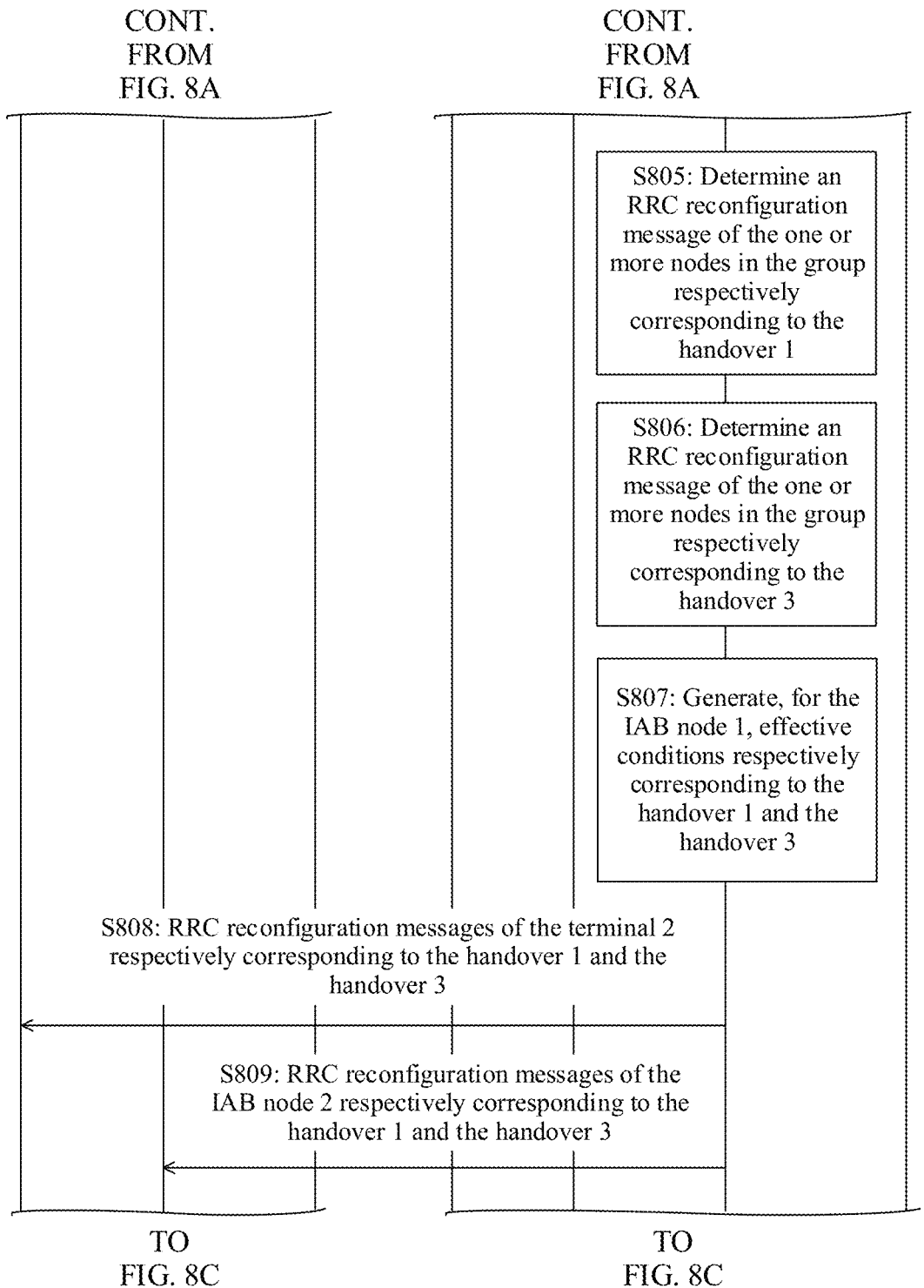
Figure 8C:
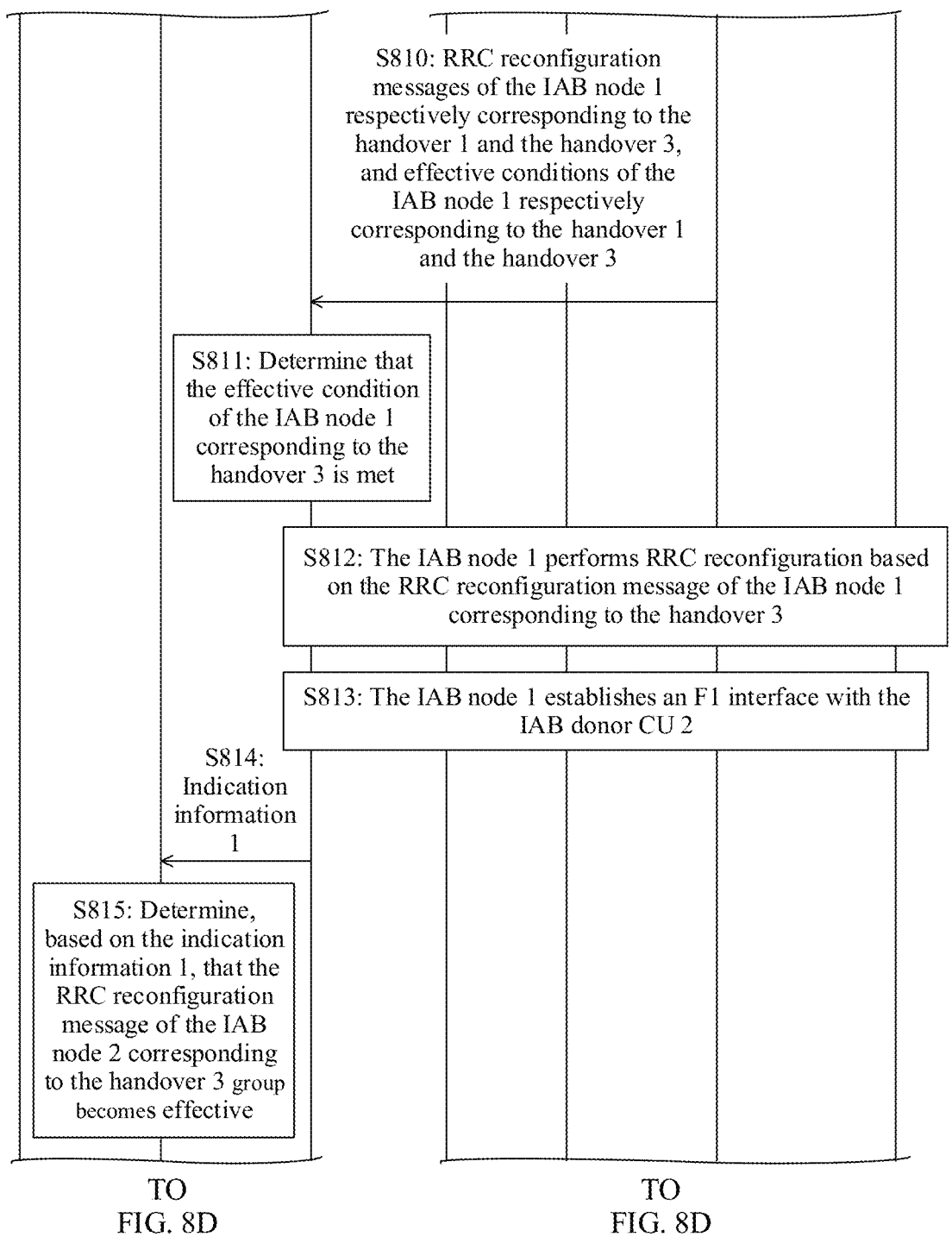
Figure 8D:
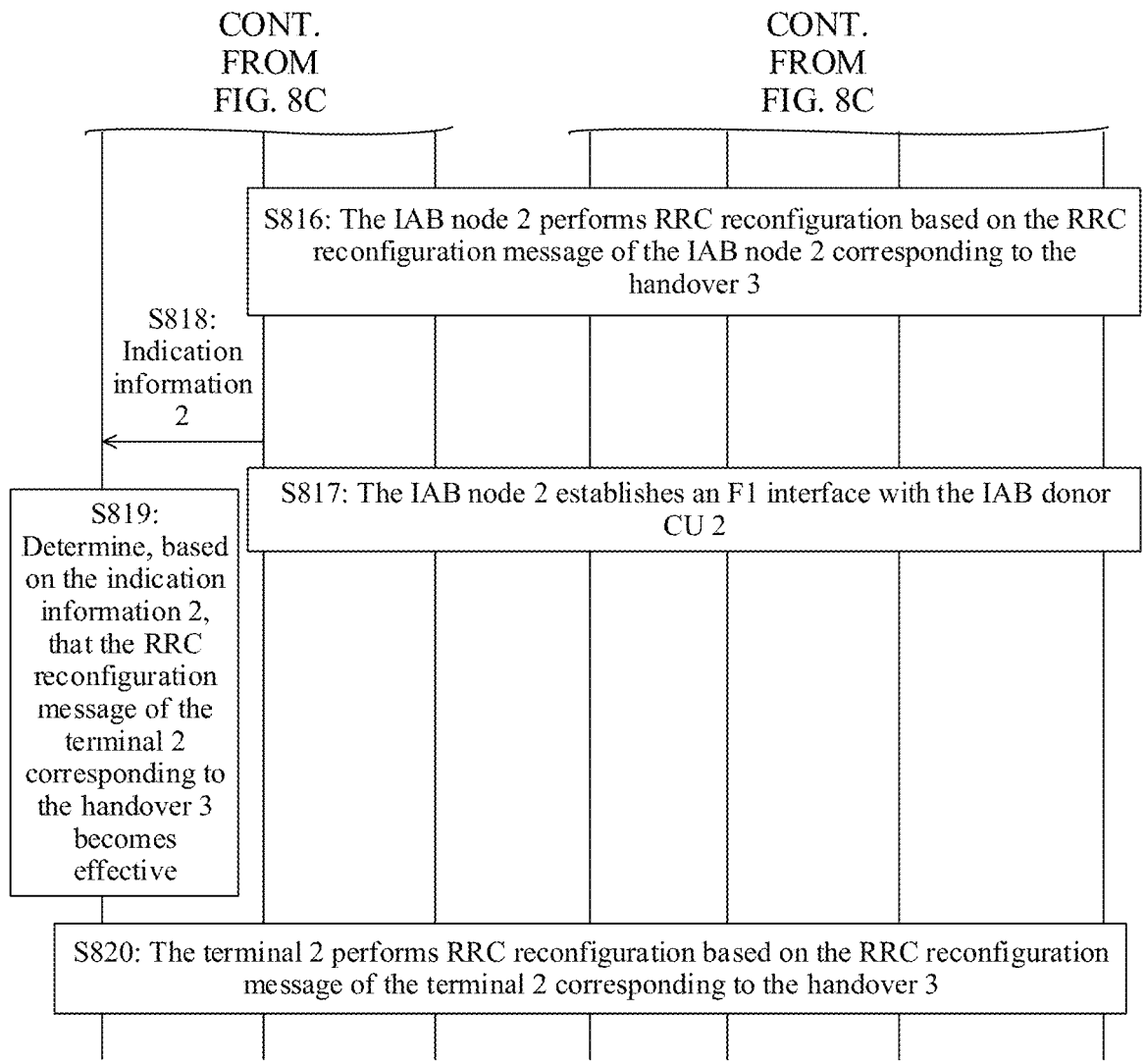

FIG. 7 is a flowchart of a communication method in an IAB system according to an embodiment of this application. FIG. 7 may be applied to an intra-donor node group handover scenario in FIG. 5.

In FIG. 7, a first node and a second node are nodes in a group that performs group handover, the second node is a parent node of the first node, the second node may be an IAB node, and the first node may be an IAB node or a terminal. The second node may be a head node in the group or the second node is connected to the head node. For details, refer to the description of the first node and the second node in FIG. 6.

In the method in FIG. 7, the group handover may be an intra-donor node group handover, and the group is connected to a first donor node before and after the handover.

The intra-donor node group handover may be the handover 1 in FIG. 5, the first donor node includes the IAB donor CU 1, and the first donor node may further include the IAB donor DU 1. The intra-donor node group handover is the handover 2 in FIG. 7, and the first donor node includes the IAB donor CU 1.

It may be understood that content in FIG. 7 and FIG. 6 may be mutually referenced. A difference between FIG. 7 and FIG. 6 lies in that, FIG. 6 shows cross-donor node group handover, FIG. 7 shows intra-donor node handover, and interaction between the first donor node and the second donor node in FIG. 6 does not exist in FIG. 7. The first donor node in FIG. 7 may perform actions of the first donor node and the second donor node in FIG. 6. For example, in FIG. 7, the first donor node directly generates the first RRC reconfiguration message and the second RRC reconfiguration message, which respectively include the first configuration information and the second configuration information in FIG. 6.

Content of the first RRC reconfiguration message and the second RRC reconfiguration message in FIG. 6 and FIG. 7 may be mutually referenced. A difference lies in that information included in the first RRC reconfiguration message and the second RRC reconfiguration message in FIG. 6 may be generated by the second donor node or the first donor node. However, in FIG. 7, information included in both the first RRC reconfiguration message and the second RRC reconfiguration message is generated by the first donor node.

As shown in FIG. 7, the method in FIG. 7 includes the following steps.

S701: The first donor node sends a first RRC reconfiguration message to the second node.

For S701, refer to content of S602.

S702: The second node sends the first RRC reconfiguration message to the first node.

For S702, refer to content of S603.

S703: The first donor node sends a second RRC reconfiguration message to the second node.

For S703, refer to content of S605.

S704: The second node determines that the second RRC reconfiguration message becomes effective.

S705: The second node sends first indication information to the first node.

S704 and S705 may be understood as that the second node sends the first indication information to the first node when determining that the second RRC reconfiguration message becomes effective.

Both the first RRC reconfiguration message and the second RRC reconfiguration message correspond to the intra-donor node group handover.

For example, the first node is the IAB node 2, the second node is the IAB node 1. The first RRC reconfiguration message is an RRC reconfiguration message that is of the IAB node 2 corresponding to the handover and that is received by the IAB node 2. The second RRC reconfiguration message is an RRC reconfiguration message of the IAB node 1 corresponding to the handover 1 and that is received by the IAB node 1. It may be understood that both the first RRC reconfiguration message and the second RRC reconfiguration message correspond to the handover 1.

For a manner in which the second node determines that the second RRC reconfiguration message becomes effective, refer to content in FIG. 6. For example, the second node is the head node, receives an effective condition of the second RRC reconfiguration message, and the second node determines whether the effective condition is met. When the effective condition is met, the second node determines that the second RRC reconfiguration message becomes effective. For another example, the second node is not the head node, and receives, from a parent node of the second node, indication information used to determine that the second RRC reconfiguration message becomes effective.

Optionally, the second RRC reconfiguration message includes an identifier of one or more child nodes of the second node in the group, and the one or more child nodes include the first node. Alternatively, optionally, the second node is the head node, the second RRC reconfiguration message includes identification information of one or more descendant nodes of the second node in the group, and the one or more descendant nodes of the second node include the first node. Alternatively, optionally, the second node is connected to the head node, and indication information that is used to determine that the second RRC reconfiguration message becomes effective and that is received by the second node from the parent node (that is, a third node) of the second node includes an identifier of one or more descendant nodes of the second node in the group, where the one or more descendant nodes of the second node include the first node. For details, refer to content of S607.

For other content of S704 and S705, refer to content of S606 and S607.

S706: The second node updates an RRC connection to the first donor node based on the second RRC reconfiguration message.

That the second node updates the RRC connection to the first donor node may be understood as that the second node performs RRC reconfiguration. In other words, the second node has an RRC connection to the first donor node before performing RRC reconfiguration, and the second node updates the RRC connection to the first donor node based on the second RRC reconfiguration message. Optionally, after updating the RRC connection to the first donor node, the second node may send a second RRC reconfiguration complete message to the first donor node.

S707: The first node determines, based on the first indication information, that the first RRC reconfiguration message becomes effective.

S708: The first node updates an RRC connection to the first donor node based on the first RRC reconfiguration message.

That the first node updates the RRC connection to the first donor node may be understood as that the first node performs RRC reconfiguration. In other words, the first node has an RRC connection to the first donor node before performing RRC reconfiguration, and the first node updates the RRC connection based on the first RRC reconfiguration message. Optionally, after updating the RRC connection to the first donor node, the first node may send a first RRC reconfiguration complete message to the first donor node.

Optionally, the method in FIG. 7 may further include that the first node and/or the second node receives indication information of the intra-donor node group handover.

For example, the first RRC reconfiguration message may include the indication information (which is referred to as second indication information for ease of description) of the intra-donor node group handover. Alternatively, optionally, the first node may receive the second indication information from the second node, and the second indication information may be carried in the first indication information.

For example, the second RRC reconfiguration message may include the indication information of the intra-donor node group handover. Alternatively, optionally, the second node may receive, from the parent node of the second node, the intra-donor node group handover. The second node may be the head node or may not be the head node. When the second node is the head node, the second node is the third node. When the second node is the head node, the parent node of the second node includes a source parent node or a target parent node of the second node. This is not limited in embodiments of this application.

According to the method in FIG. 7, the first node may receive the first indication information from the second node, and then determine, based on the first indication information, to perform RRC reconfiguration based on the first RRC reconfiguration message, so as to ensure that the first node is handed over along with the second node. This approach avoids interruption of service transmission of the terminal caused by the failure of handover of the first node in time, and improves continuity of service transmission of the terminal.

In addition, the first node first receives the first RRC reconfiguration message, and then receives the first indication information used to determine that the first RRC reconfiguration message becomes effective. In one aspect, this can avoid service transmission interruption of the terminal caused by a handover failure when the first RRC reconfiguration message fails to be sent when channel quality is poor. In another aspect, due to a complexity of the IAB network architecture, the first RRC reconfiguration message needs to be sent from the first donor node to the first node through a plurality of hops. Delivering the first RRC reconfiguration message in advance can reduce a delay of receiving the first RRC reconfiguration message by the first node, and can further avoid a long delay caused when group handover can be only performed after RRC reconfiguration messages of all nodes in the group are sent. Therefore, service transmission interruption of the terminal caused by handover is reduced, and a group handover failure is avoided.

The following embodiment provides a plurality of implementations of the foregoing first indication information. The first indication information is used to determine that the first RRC reconfiguration message becomes effective. Mutual reference may be made to FIG. 5, FIG. 6, and/or FIG. 7. The following describes the first indication information.

Implementations of the First Indication Information

In an implementation, the first indication information is backhaul (BH) radio link failure (RLF) indication information.

In the foregoing implementation, after the first node receives the BH RLF indication information, and when the first node determines that the first node receives the first RRC reconfiguration message, the first node determines that the first RRC reconfiguration message becomes effective.

Optionally, in the foregoing implementation, the second node may be preconfigured to send the BH RLF indication information to the first node when determining that the second RRC reconfiguration message becomes effective. Further, the second node may be preconfigured to send the BH RLF indication information to the first node when the second node determines that the second RRC reconfiguration message becomes effective and the second node determines that the group handover is a cross-donor node group handover.

Optionally, in the foregoing implementation, it may be preconfigured that the first node determines that the first RRC reconfiguration message becomes effective when receiving the BH RLF indication information and the first RRC reconfiguration message. If the first node receives the BH RLF indication information but does not receive the first RRC reconfiguration message, the first node may perform RLF recovery based on the BH RLF indication information.

Optionally, the foregoing implementation may be applied to a scenario in which there is only one group handover.

Optionally, the foregoing implementation may be applied to a scenario in which the first node is an IAB node and the second node is an IAB node.

In the foregoing implementation, the existing BH RLF indication information may be reused, so that the first node determines that the first RRC reconfiguration message becomes effective, to reduce impact on the existing 3GPP protocol and improve compatibility.

In another implementation, the first RRC reconfiguration message and/or the second RRC reconfiguration message include the first indication information.

Optionally, the another implementation may be classified into three cases: (1) The first RRC reconfiguration message includes the first indication information, the second RRC reconfiguration message does not include the first indication information, and the second node is configured with a correspondence between the second RRC reconfiguration message and the first indication information. (2) The second RRC reconfiguration message may include the first indication information, the first RRC reconfiguration message does not include the first indication information, and the first node is configured with a correspondence between the first RRC reconfiguration message and the first indication information. (3) Both the first RRC reconfiguration message and the second RRC reconfiguration message include the first indication information.

It may be understood that, in addition to the foregoing group handover, the first node may be further configured with one or more other group handovers. In addition to receiving the first RRC reconfiguration message, the first node may further receive one or more other RRC reconfiguration messages corresponding to one or more other group handovers.

In the another implementation, the first RRC reconfiguration message and the second RRC reconfiguration message may be associated with a same group handover. After determining that the second RRC reconfiguration message becomes effective, the second node sends the first indication information to the first node. The first node can determine that the first RRC reconfiguration message becomes effective, to ensure that the first node performs the foregoing group handover along with the second node.

Optionally, for a cross-donor node group handover scenario (FIG. 6), there may be the following two cases in which the first RRC reconfiguration message includes the first indication information: (1) The first indication information is added by the second donor node, and the first configuration information of the first RRC reconfiguration message includes the first indication information. (2) The first indication information is added by the first donor node, and the first RRC reconfiguration message includes the first configuration information and the first indication information.

Similarly, for a cross-donor node group handover scenario (FIG. 6), there may be the following two cases in which the second RRC reconfiguration message includes the second configuration information: (1) The first indication information is determined by the second donor node, and the second configuration information of the second RRC reconfiguration message includes the first indication information. (2) The first indication information is determined by the first donor node, and the first RRC reconfiguration message includes the second configuration information and the first indication information.

Optionally, in an intra-donor node group handover scenario (FIG. 7), the first indication information may be added by the first donor node to the first RRC reconfiguration message and/or the second RRC reconfiguration message.

In the another implementation, for example, for a cross-donor node group handover scenario, the first indication information may include one or more of an identifier of the group handover, an identifier of a candidate target cell of the first node, an identifier of a candidate target cell of the second node, a group identifier, an identifier of a candidate target cell of the head node, and an identifier of the second donor node.

In the another implementation, for example, for an intra-donor node group handover scenario, the first indication information may include one or more of an identifier of the group handover, an identifier of a candidate target cell of the first node, an identifier of a candidate target cell of the second node, a group identifier, an identifier of a candidate target cell of the head node, or an identifier of the first donor node.

(1) Identifier of the Group Handover

The identifier of the group handover is used to identify the group handover. Different group handovers may have different identifiers, and the identifier may be an index or other information.

It may be understood that two different group handovers may mean that nodes in the two groups are not completely consistent, or that although nodes in the two groups are completely consistent, candidate target cells of head nodes in the two groups may be different.

For example, in FIG. 5, an identifier of the handover 1 of the group is a handover identifier 1, an identifier of the handover 2 of the group is a handover identifier 2, an identifier of the handover 3 of the group is a handover identifier 3, and an identifier of the handover 4 of the group is a handover identifier 4.

(2) Group Identifier

The group identifier may uniquely identify the group, and one or more nodes in the group have a determined topological connection relationship. For example, the group is a group including the IAB node 1, the IAB node 2, the terminal 1, and the terminal 2 in FIG. 5. A group identifier of the group may be a group identifier 1.

(3) Identifier of the Candidate Target Cell of the First Node, Identifier of the Candidate Target Cell of the Second Node, and Identifier of the Candidate Target Cell of the Head Node In this application, an identifier of a candidate target cell of a node is an identifier of a cell to be accessed by the node after the group handover, and may be understood as an identifier of a candidate target cell of the node corresponding to the group handover. For example, the identifier of the candidate target cell of the first node may be understood as an identifier of a cell to be accessed by the first node after the group handover, and may be referred to as an identifier of a candidate target cell of the first node corresponding to the group handover. The identifier of the candidate target cell of the second node is an identifier of a target cell to be accessed by the second node after the group handover, and may be referred to as an identifier of a candidate target cell of the second node corresponding to the group handover. The identifier of the candidate target cell of the head node is an identifier of a target cell to be accessed by the head node after the handover, and may be referred to as an identifier of a candidate target cell of the head node corresponding to the group handover.

FIG. 5 is used as an example. For example, the second node is the IAB node 1, and the first node is the IAB node 2. In the handover 1 in FIG. 5, an identifier of a candidate target cell of the second node may be an identifier of a cell served by the IAB node 4, and an identifier of a candidate target cell of the first node may be an identifier of a cell served by the IAB node 1.

Optionally, a type of the identifier of the candidate target cell in this application may include one or more of a physical cell identity (PCI), an NR cell identity (NCI), an NR cell global identity (NCGI), an evolved universal terrestrial radio access network (E-UTRAN) cell identifier (ECI), and an E-UTRAN cell global identifier (ECGI).

(4) Identifier of the Second Donor Node or the First Donor Node

The identifier of the first donor node is used to identify the first donor node, and the identifier of the second donor node is used to identify the second donor node. It may be understood that different donor nodes may have different identifiers.

Optionally, when the first donor node uses a CU-DU separation architecture, the identifier of the first donor node may be an identifier of a CU of the first donor node, for example, an identifier of the IAB donor CU 1 in FIG. 5.

Optionally, when the second donor node uses a CU-DU separation architecture, the identifier of the second donor node may be an identifier of a CU of the second donor node, for example, an identifier of the IAB donor CU 2 in FIG. 5.

The following provides description with reference to Manner 1 to Manner 5. One or more of the following Manner 1 to Manner 5 may be combined with each other.

Manner 1

The first RRC reconfiguration message includes the identifier of the group handover. The second RRC reconfiguration message includes the identifier of the group handover. The first indication information includes the identifier of the group handover.

Different identifiers of group handovers may be generated for different group handovers. For example, the first donor node may generate the handover identifier 1 for the handover 1 of the group in FIG. 5, generate the handover identifier 2 for the handover 2 of the group, generate the handover identifier 3 for the handover 3 of the group, and generate the handover identifier 4 for the handover 4 of the group.

For a cross-donor node group handover scenario, the identifier of the group handover may be determined by the first donor node or the second donor node. For an intra-donor node handover scenario, the identifier of the group handover may be determined by the first donor node.

After determining that the second RRC reconfiguration message becomes effective, the second node may obtain the identifier of the group handover from the second RRC reconfiguration message, and send the first indication information to the first node by adding the identifier of the group handover to the second RRC reconfiguration message. The first node determines that an RRC reconfiguration message (that is, the first RRC reconfiguration message) that includes the identifier of the group handover becomes effective.

Manner 2

In an implementation of Manner 2, the first RRC reconfiguration message includes the identifier of the candidate target cell of the first node. The second RRC reconfiguration message includes the identifier of the candidate target cell of the second node and an identifier of a candidate target cell of a child node (that is, the first child node) of the second node. The first indication information includes the identifier of the candidate target cell of the first node.

In the foregoing implementation, after determining that the second RRC reconfiguration message becomes effective, the second node may obtain the identifier of the candidate target cell of the first node from the second RRC reconfiguration message, carry the identifier of the candidate target cell of the first node by using the first indication information, and send the first indication information to the first node. The first node determines that an RRC reconfiguration message (that is, the first RRC reconfiguration message) that includes the identifier of the candidate target cell of the first node becomes effective.

In another implementation of Manner 2, the first RRC reconfiguration message includes the identifier of the candidate target cell of the first node. The second RRC reconfiguration message may include the identifier of the candidate target cell of the second node, and does not include the identifier of the candidate target cell of the first node. In addition, the second node is configured with a mapping relationship between the identifier of the candidate target cell of the second node and the identifier of the candidate target cell of the first node in the group handover, and the mapping relationship may be sent to the second node by the first donor node or the second donor node. The first indication information may include the identifier of the candidate target cell of the first node.

In the foregoing implementation, after determining that the second RRC reconfiguration message becomes effective, the second node may determine the identifier of the candidate target cell of the first node based on the identifier of the candidate target cell of the second node in the second RRC reconfiguration message and the foregoing mapping relationship configured by the second node, carry the identifier of the candidate target cell of the first node by using the first indication information, and then send the first indication information to the first node. The first node determines that an RRC reconfiguration message (that is, the first RRC reconfiguration message) that includes the identifier of the candidate target cell of the first node becomes effective.

Manner 3

In an implementation of Manner 3, the first RRC reconfiguration message includes the identifier of the candidate target cell of the first node and the identifier of the candidate target cell of the parent node (that is, the second node) of the first node. The second RRC reconfiguration message includes the identifier of the candidate target cell of the second node. The first indication information may include the identifier of the candidate target cell of the second node.

After determining that the second RRC reconfiguration message becomes effective, the second node may obtain the identifier of the candidate target cell of the second node from the second RRC reconfiguration message, and send the identifier of the candidate target cell of the second node to the first node by using the first indication information. The first node determines that an RRC reconfiguration message (that is, the first RRC reconfiguration message) that includes the identifier of the candidate target cell of the second node becomes effective.

In another implementation of Manner 3, the first RRC reconfiguration message may include only the identifier of the candidate target cell of the first node, and does not include the identifier of the candidate target cell of the second node. In addition, the first node is configured with a mapping relationship between the identifier of the candidate target cell of the first node and the identifier of the candidate target cell of the second node in the group handover, and the mapping relationship may be sent to the second node by the first donor node or the second donor node. The second RRC reconfiguration message includes the identifier of the candidate target cell of the second node. The first indication information may include the identifier of the candidate target cell of the second node.

In the foregoing implementation, after determining that the second RRC reconfiguration message becomes effective, the second node may obtain the identifier of the candidate target cell of the second node based on the second RRC reconfiguration message, and send the identifier of the candidate target cell of the second node to the first node by using the first indication information. The first node determines, based on the foregoing mapping relationship configured by the first node, the identifier of the candidate target cell of the first node, and determines that an RRC reconfiguration message (that is, the first RRC reconfiguration message) that includes the identifier of the candidate target cell of the first node becomes effective.

Manner 4

Manner 4 may be applied to a scenario in which only one handover exists in the group. For example, in the scenario shown in FIG. 5, only the handover 3 exists in the group.

In an implementation of Manner 4, the first RRC reconfiguration message includes the group identifier. The first indication information may include the group identifier.

For the cross-donor node group handover, the group identifier may be generated by the second donor node, or may be generated by the first donor node and sent to the second donor node. The group identifier may be added by the first donor node, or may be added by the second donor node.

In the foregoing implementation, after determining that the second RRC reconfiguration message becomes effective, the second node may obtain the group identifier from the second RRC reconfiguration message, add the group identifier to the first indication information, and send the first indication information to the first node. After receiving the first indication information, the first node may determine that an RRC reconfiguration message (that is, the second RRC reconfiguration message) that includes the group identifier becomes effective.

Manner 5

The first RRC reconfiguration message includes the identifier of the candidate target cell of the head node. The second RRC reconfiguration message includes the identifier of the candidate target cell of the head node. The first indication information may include the identifier of the candidate target cell of the head node.

It may be understood that the head node may be the second node or may not be the second node.

After determining that the second RRC reconfiguration message becomes effective, the second node may obtain the identifier of the candidate target cell of the head node from the second RRC reconfiguration message, and send the identifier of the candidate target cell of the head node to the first node by using the first indication information. The first node determines that an RRC reconfiguration message (that is, the first RRC reconfiguration message) that includes the identifier of the candidate target cell of the head node becomes effective.

The following embodiment provides a plurality of implementations of the second indication information. The second indication information is used to indicate the cross-donor node group handover or the intra-donor node group handover. Mutual reference may be made to FIG. 6 or FIG. 7. The following describes the second indication information.

Implementations of the Second Indication Information

In an example in a first implementation, the second indication information may be newly added indication information, and the newly added indication information may be used to explicitly indicate the cross-donor node group handover. For example, when the second indication information exists, it indicates that the first RRC reconfiguration message corresponds to the cross-donor node group handover. When the second indication information does not exist, it indicates that the first RRC reconfiguration message corresponds to the intra-donor node group handover. For another example, when a value of the second indication information is a first value, it indicates that the first RRC reconfiguration message corresponds to the cross-donor node group handover. When a value of the second indication information is a second value, it indicates that the first RRC reconfiguration message corresponds to the intra-donor node group handover.

In another example in the first implementation, the second indication information may be existing indication information, and the existing indication information may be used to implicitly indicate the cross-donor node handover. For example, the second indication information may include one or more of the identifier of the candidate target cell of the first node, a BAP address of the first node, or the identifier of the second donor node. The following description separately describes the identifier of the candidate target cell, the BAP address, and the identifier of the second donor node.

(1) Identifier of the Candidate Target Cell of the First Node

Optionally, the identifier of the candidate target cell of the first node may include one or more of a PCI, an NCI, an NCGI, an ECI, or an ECGI. Optionally, the NCI, the NCGI, the ECI, and the ECGI include the identifier (for example, a gNB ID of the donor node) of the donor node to which the candidate target cell belongs, and the PCI does not include the identifier of the donor node to which the candidate target cell belongs.

If the second indication information includes one or more of the NCI, the NCGI, the ECI, or the ECGI, the first node may obtain the identifier that is of the donor node to which the candidate target cell belongs and that is included in the NCI, the NCGI, the ECI, or the ECGI, determine whether the identifier is the same as an identifier of a donor node to which the cell accessed before the first node is handed over belongs. When the identifiers are different, it indicates that the first RRC reconfiguration message corresponds to the cross-donor node handover. When the identifiers are the same, it indicates that the first RRC reconfiguration message corresponds to the intra-donor node handover.

If the second indication information includes only the PCI, and does not include the NCI or the NCGI, the first node may read, based on the PCI, a system information block (SIB) of a cell indicated by the PCI, and obtain the NCI or the NCGI from the SIB. Then, the first node obtains the identifier that is of the donor node to which the candidate target cell belongs and that is included in the NCI or the NCGI, and determines whether the identifier is the same as an identifier of a donor node to which the cell accessed by the node before the node is handed over belongs. When the identifiers are different, it indicates that the first RRC reconfiguration message corresponds to the cross-donor node handover. When the identifiers are the same, it indicates that the first RRC reconfiguration message corresponds to the intra-donor node handover.

(2) BAP Address of the First Node

It may be understood that, in the IAB network, the IAB donor may separately configure a BAP address for one or more IAB nodes served by the IAB donor, and the BAP address of each IAB node is unique in the one or more IAB nodes served by the IAB donor. In the intra-donor node group handover, because the donor node does not change, the BAP address of the IAB node may remain unchanged, and the RRC reconfiguration message may not carry a new BAP address or may carry the original BAP address, to implicitly indicate that the BAP address does not change. In the cross-donor node group handover, because the donor node changes, the BAP address of the IAB node changes, and the RRC reconfiguration message may carry a new BAP address.

In an example, for the intra-donor node group handover, the first RRC reconfiguration message does not carry the BAP address. For the cross-donor node group handover, the first RRC reconfiguration message carries a new BAP address. Therefore, the first node may determine whether the first RRC reconfiguration message includes the BAP address. When the first RRC reconfiguration message does not include the BAP address, the first RRC reconfiguration message corresponds to the intra-donor node group handover. When the first RRC reconfiguration message includes the BAP address, the first RRC reconfiguration message corresponds to the cross-donor node group handover.

In another example, for the intra-donor node group handover or the cross-donor node group handover, the first RRC reconfiguration message includes the BAP address. The first node determines whether the BAP address included in the first RRC reconfiguration message is the same as a BAP address before the handover of the first node. When the BAP addresses are the same, the first RRC reconfiguration message corresponds to the intra-donor node group handover. When the BAP addresses are different, the first RRC reconfiguration message corresponds to the cross-donor node group handover.

(3) Identifier of the Second Donor Node

When the second donor node uses a CU-DU separation architecture, the identifier of the second donor node may be an identifier of a CU of the second donor node, for example, an identifier of the IAB donor CU 2 in the handover 3 in FIG. 5.

For the cross-donor node group handover, the first RRC reconfiguration includes the identifier of the second donor node. The first node determines whether the first RRC reconfiguration message includes the identifier of the second donor node. When the first RRC reconfiguration message includes the identifier of the second donor node, it indicates that the first RRC reconfiguration message corresponds to the cross-donor node group handover. When the first RRC reconfiguration message does not include the identifier of the second donor node, it indicates that the first RRC reconfiguration message corresponds to the intra-donor node group handover. Alternatively, the first node determines whether the identifier of the second donor node included in the first RRC reconfiguration message is the same as an identifier of the donor node connected to the first node before the handover. When the identifiers are different, it indicates that the first RRC reconfiguration message corresponds to the cross-donor node group handover. When the identifiers are the same, it indicates that the first RRC reconfiguration message corresponds to the intra-donor node group handover.

FIG. 8A to FIG. 8D are a flowchart of a communication method in an IAB system according to this application. FIG. 8A to FIG. 8D further describe the solution in FIG. 6 or FIG. 7 with reference to a specific example.

FIG. 8A to FIG. 8D use the scenario illustrated in FIG. 5 as an example. It is assumed that the handover 1 and the handover 3 are configured for the group in FIG. 5. It should be noted that only one or two of the handover 1 and the handover 3 may be configured for the group. For example, only the handover 1 may be configured for the group. For another example, only the handover 3 is configured for the group. In addition, one or more other handovers may be configured for the group, for example, the handover 4 and a handover 5 may be configured for the group. This is not limited in embodiments of this application. The teachings of FIG. 8A to FIG. 8D, FIG. 6, and FIG. 7 may be mutually combined and referenced. The following describes the content with reference to FIG. 8A to FIG. 8D.

S801: An IAB node 1 reports a measurement report to an IAB donor CU 1, where the measurement report may include signal quality (for example, received signal strength) of cells served by an IAB node 4, an IAB node 5, an IAB node 6, and an IAB node 7 that are measured by the IAB node 1.

With reference to FIG. 5, the IAB node 1 sends the measurement report to the IAB donor CU 1 over a transmission path that includes an IAB node 3 and an IAB donor DU 1.

Cells served by the IAB node 4, the IAB node 5, the IAB node 6, and the IAB node 7 may be understood as cells provided by the IAB node 4, the IAB node 5, the IAB node 6, and the IAB node 7 for access by child nodes of the IAB node 4, the IAB node 5, the IAB node 6, and the IAB node 7. The cells may be cells served by DU parts of the IAB node 4, the IAB node 5, the IAB node 6, and the IAB node 7.

S802: The IAB donor CU 1 decides to initiate a preparation process of a conditional handover, where the conditional handover includes the handover 1 and the handover 3.

The IAB donor CU 1 may decide whether to initiate a corresponding conditional handover preparation process according to the signal quality of the cells served by the IAB node 4, the IAB node 5, the IAB node 6, and the IAB node 7 included in the measurement report. In addition, it is determined whether to allow one or more descendant nodes of the IAB node 1 to perform handover with the IAB node 1, that is, group handover.

For example, the IAB donor CU 1 may decide to initiate the preparation process of the handover 1 and the handover 3, so that descendant nodes of the IAB node 1, including the IAB node 2, the terminal 1, and the terminal 2, are handed over along with the IAB node 1. It may be understood that the IAB node 1 may further have one or more other descendant nodes. For example, the IAB donor CU 1 may determine that the IAB node 2, the terminal 1, and the terminal 2 are handed over along with the IAB node 1, and the one or more other descendant nodes are not handed over along with the IAB node 1. This is not limited in embodiments of this application.

With reference to FIG. 5, in the handover 1, a target parent node of the IAB node 1 is the IAB node 4, and a candidate target cell of the IAB node 1 is a cell served by the IAB node 4. In the handover 3, a target parent node of the IAB node 1 is the IAB node 6, and a candidate target cell of the IAB node 1 is a cell served by the IAB node 6.

S803: The IAB donor CU 1 sends a first handover request to the IAB donor CU 2, where the first handover request may include an identifier of the cell served by the IAB node 6.

Because the handover 3 is a cross-donor node handover, the IAB donor CU 1 sends the first handover request to the IAB donor CU 2.

The first handover request includes an identifier of the IAB node 1 and the identifier of the cell served by the IAB node 6. Optionally, the first handover request may include one or more of a group identifier, an identifier of a node other than the IAB node 1 in the group, topology information of the group, and service information in the group. The following provides descriptions by using examples.

(1) Group Identifier

After the IAB donor CU 1 decides to perform the handover 3, the IAB donor CU 1 may generate a group identifier for the group on which the handover 3 is performed. The group identifier is used to uniquely identify the group. Group identifiers of different groups may be different. For details, refer to the foregoing content, and details are not described herein again.

For example, the group identifier of the group including the IAB node 1, the IAB node 2, the terminal 1, and the terminal 2 is a group identifier 1.

(2) Identifier of a Node Other than the IAB Node 1 in the Group

For example, in addition to the identifier of the IAB node 1, the first handover request may further include respective identifiers of the IAB node 2, the terminal 1, and the terminal 2.

(3) Topology Information of the Group

The topology information may indicate a parent-child relationship between nodes in the group. For example, the IAB node 1 is a parent node of the terminal 1 and the IAB node 2, and the IAB node 2 is a parent node of the terminal 2. Alternatively, the topology information may indicate a hierarchy of one or more nodes in the group relative to a node in a topology relationship. For example, it is assumed that a hierarchy of the IAB node 1 is 0, a hierarchy of the IAB node 2 and the terminal 1 is 1, and a hierarchy of the terminal 2 is 2.

(4) Service Information of the Group

The service information of the group may include: information about data radio bearers (DRBs) of one or more terminals in the group, and one or more types of information about a BH RLC channel on a wireless backhaul link of one or more IAB nodes in the group. The information about the BH RLC channel of the IAB node on the wireless backhaul link may include an identifier of a BH RLC channel established on the backhaul link between the IAB node and a parent node or a child node and/or a QoS parameter corresponding to each BH RLC channel.

After receiving the handover request, the IAB donor CU 2 may determine whether to accept the group to perform the handover 3. When determining to accept the group to perform the handover 3, S804 is performed.

S804: The IAB donor CU 2 sends a first handover request response to the IAB donor CU 1, where the first handover request response includes configuration information of one or more nodes in a group respectively corresponding to the handover 3.

Optionally, the IAB donor CU 2 may decide whether to accept the handover 3 of each node of the group. For example, the IAB donor CU 2 may accept the handover 3 of all nodes of the group, or accept the handover 3 of some nodes of the group, and reject the handover 3 of other nodes. Then, the IAB donor CU 2 may separately generate configuration information of the one or more nodes corresponding to the handover 3 that are accepted. The one or more nodes include a head node of the group. Optionally, the one or more nodes may further include one or more descendant nodes of the head node. In this application, an example in which the one or more nodes include the IAB node 1, the IAB node 2, the terminal 1, and the terminal 2 is used for description. In other words, the IAB donor CU 2 accepts handover of the IAB node 1, the IAB node 2, the terminal 1, and the terminal 2. For steps of the terminal 1, refer to steps of the IAB node 2. In this application, the IAB node 1, the IAB node 2, and the terminal 1 are used as examples for description.

Optionally, when the IAB donor CU 2 decides to accept handover of some nodes in the group, in a possible implementation, the IAB donor CU 2 may generate a new group identifier for the one or more nodes that are accepted, and carry the new group identifier in the configuration information of the one or more nodes respectively corresponding to the handover 3. In another possible implementation, the IAB donor CU 2 may not generate a new group identifier for the one or more nodes that are accepted. After the IAB donor CU 1 receives the message in S804, the IAB donor CU 1 may determine which nodes are accepted and which nodes are rejected by the IAB donor CU 2, and the IAB donor CU 1 may generate a new group identifier for the one or more nodes that are accepted. In still another possible implementation, after the IAB donor CU 1 receives the message in S804, the IAB donor CU 1 does not generate a new group identifier, but still uses the group identifier in S803. After receiving the message in S804, the IAB donor CU 1 may adjust a node in the group corresponding to the group identifier. For example, the IAB donor CU 1 may delete a node rejected by the IAB donor CU 2 from the group.

S804 is described by using an example in which the first handover request response message includes configuration information of the one or more nodes in the group respectively corresponding to the handover 3. It should be noted that the configuration information of the one or more nodes respectively corresponding to the handover 3 may be carried in different handover request response messages. For example, the configuration information of the IAB node 1 corresponding to the handover 3 may be carried in a handover request response message 1. The configuration information of the IAB node 2 corresponding to the handover 3 may be carried in a handover request response message 2. The configuration information of the terminal 2 corresponding to the handover 3 may be carried in a handover request response message 3. This is not limited in embodiments of this application.

The configuration information that is of each of the one or more nodes corresponding to the handover 3 and that is accepted by the IAB donor CU 2 may include an identifier of a candidate target cell of the node corresponding to the handover 3. In this application, an identifier of a candidate target cell of a node corresponding to a handover may be understood as an identifier of a cell to be accessed by the node after the handover. For example, the configuration information of the IAB node 1 corresponding to the handover 3 may include an identifier (that is, an identifier of a cell served by the IAB node 6) of a candidate target cell of the IAB node 1 corresponding to the handover 3. For another example, the configuration information of the IAB node 2 corresponding to the handover 3 may include an identifier (that is, an identifier of a cell served by the IAB node 1) of a candidate target cell of the IAB node 2 corresponding to the handover 3. For another example, the configuration information of the terminal 2 corresponding to the handover 3 may include an identifier (that is, an identifier of a cell served by the IAB node 2) of a candidate target cell of the terminal 2 corresponding to the handover 3.

Optionally, because the parent nodes of the terminal 2 and the IAB node 2 do not change before and after the handover 3, the identifier of the candidate target cell of the terminal 2 may be the same as the identifier of the cell accessed by the terminal 2 before the handover 3. That is, after the parent node IAB node 2 of the terminal 2 performs the handover 3 and connects to the IAB donor CU 2, an identifier of a cell served by a DU part of the parent node IAB node 2 of the terminal 2 remains unchanged, and the identifier of the candidate target cell of the terminal 2 may be determined by the IAB donor CU 2 or an OAM server. Alternatively, the identifier of the candidate target cell of the terminal 2 may be different from the identifier of the cell accessed by the terminal 2 before the handover 3. That is, after the IAB node 2 is connected to the IAB donor CU 2, the identifier of the cell served by the DU part of the IAB node 2 changes. A new identifier of the cell is determined by the IAB donor CU 2 or the OAM server. This is not limited in embodiments of this application. Similarly, the identifier of the candidate target cell of the IAB node 2 may be the same as or different from the identifier of the cell accessed by the IAB node 2 before the handover 3.

Optionally, in addition to the identifier of the candidate target cell of the head node corresponding to the handover 3, the configuration information of the head node corresponding to the handover 3 may further include one or more of a group identifier, an identifier of a candidate target cell of the child node of the head node corresponding to the handover 3, and an identifier of the IAB donor CU 2. The group identifier may be a new group identifier generated by the IAB donor CU 2, or may be a group identifier carried in the message in S803.

For example, the configuration information of the IAB node 1 corresponding to the handover 3 may further include one or more of a group identifier 1, an identifier of a candidate target cell of the IAB node 2 corresponding to the handover 3, or an identifier of the IAB donor CU 2.

Optionally, in addition to an identifier of a candidate target cell of the descendant node corresponding to the handover 3, the configuration information of the descendant node corresponding to the handover 3 may further include one or more of a group identifier, an identifier of a candidate target cell of a parent node of the descendant node corresponding to the handover 3, an identifier of a candidate target cell of a child node (when the descendant node has a child node) of the descendant node corresponding to the handover 3, an identifier of a candidate target cell of the head node corresponding to the handover 3, and an identifier of the IAB donor CU 2. In this application, an identifier of a candidate target cell of a parent node of a descendant node corresponding to a handover may be understood as an identifier of a cell to be accessed by the parent node of the descendant node after the handover. The group identifier may be a new group identifier generated by the IAB donor CU 2, or may be a group identifier carried in the message in S803.

For example, the configuration information of the IAB node 2 corresponding to the handover 3 may further include one or more of a group identifier 1, an identifier of a candidate target cell of the IAB node 1 corresponding to the handover 3, an identifier of a candidate target cell of the terminal 2 corresponding to the handover 3, and an identifier of the IAB donor CU 2. The configuration information of the terminal 2 corresponding to the handover 3 may further include one or more of a group identifier 1, an identifier of a candidate target cell of the IAB node 2 corresponding to the handover 3, an identifier of a candidate target cell of the IAB node 1 corresponding to the handover 3, and an identifier of the IAB donor CU 2.

Optionally, the configuration information of each of the one or more nodes corresponding to the handover 3 may include information indicating cross-donor node handover. For example, the information may be explicit indication information, or the information may be implicit indication information. The information may include one or more of the identifier of the candidate target cell of the node, the BAP address, and the identifier of the IAB donor CU 2. For details, refer to the foregoing related content of the second indication information.

Optionally, the configuration information of each of the one or more nodes corresponding to the handover 3 may include one or more of the following: a PDCP layer ciphering key, an encryption algorithm, an integrity protection key, an integrity protection algorithm, a resource configuration of a candidate target cell, a configuration of an RLC layer and/or a logical channel, an uplink default BAP routing identifier (ID), an uplink default BH RLC channel, one or more IP addresses of the node, and a BAP address of the corresponding IAB donor DU 2.

S805: The IAB donor CU 1 determines an RRC reconfiguration message of the one or more nodes in the group respectively corresponding to the handover 1.

Since the handover 1 is an intra-donor node handover, the IAB donor CU 1 may decide whether to accept each node in the group and generate an RRC reconfiguration message for each of the accepted nodes corresponding to the handover 1. Optionally, the IAB donor CU 1 may generate a group identifier for the one or more accepted nodes. For example, the one or more nodes include the IAB node 1, the IAB node 2, the terminal 2, and the terminal 1, and a group identifier of the group including the IAB node 1, the IAB node 2, the terminal 1, and the terminal 2 is a group identifier 1.

The RRC reconfiguration message of each of the one or more nodes corresponding to the handover 1 includes an identifier of a candidate target cell of the node corresponding to the handover 1.

Optionally, the RRC reconfiguration message of the head node corresponding to the handover 1 may further include one or more of a group identifier, an identifier of a candidate target cell of a child node of the head node corresponding to the handover 1, and an identifier of the IAB donor CU 1. Optionally, the RRC reconfiguration message of the descendant node corresponding to the handover 1 may further include one or more of a group identifier, an identifier of a candidate target cell of a parent node of the descendant node corresponding to the handover 3, an identifier of a candidate target cell of a child node (when the descendant node has a child node) of the descendant node corresponding to the handover 3, an identifier of the candidate target cell of the head node corresponding to the handover 3, and an identifier of the IAB donor CU 1. It may be understood that, except for that the handover process being different from that in S804, reference may be made between this implementation and the implementation described in S804.

Optionally, the RRC reconfiguration message of each of the one or more nodes corresponding to the handover 1 may include one or more of the following: a PDCP layer ciphering key, an encryption algorithm, an integrity protection key, an integrity protection algorithm, a resource configuration of a candidate target cell, a configuration of an RLC layer and/or a logical channel, an uplink default BAP routing ID, an uplink default BH RLC channel, one or more IP addresses of the node, and a BAP address of the corresponding IAB donor DU 1.

S806: The IAB donor CU 1 determines an RRC reconfiguration message of the one or more nodes in the group respectively corresponding to the handover 3.

In S804, the IAB donor CU 1 obtains configuration information of one or more nodes in the group respectively corresponding to the handover 3. Then, the IAB donor CU 1 determines, based on the configuration information of the one or more nodes in the group corresponding to the handover 3 in S804, the RRC reconfiguration message of the one or more nodes in the group corresponding to the handover 3. An RRC reconfiguration message of a node corresponding to the handover 3 includes configuration information of the node corresponding to the handover 3 in S804. For example, the RRC reconfiguration message of the IAB node 1 corresponding to the handover 3 includes configuration information of the IAB node 1 corresponding to the handover 3 in S804.

Through S804, the IAB donor CU 1 may determine which nodes are accepted and which nodes are rejected by the IAB donor CU 2. When the IAB donor CU 2 accepts handover of some nodes in the group, in a possible implementation, the configuration information of one or more nodes respectively corresponding to the handover 3 in S804 includes a new group identifier. The IAB donor CU 1 may store the new group identifier, and may determine that the group corresponding to the new group identifier includes the nodes accepted by the IAB donor CU 2. In another possible implementation, the configuration information of the one or more nodes corresponding to the handover 3 in S804 does not include the group identifier carried in S803, and the IAB donor CU 1 may generate a new group identifier for the one or more accepted nodes, and carry the new group identifier in the RRC reconfiguration message of the one or more nodes corresponding to the handover 3. In still another possible implementation, the configuration information of the one or more nodes corresponding to the handover 3 in S804 includes the group identifier carried in S803, and the IAB donor CU 1 may not generate a new group identifier for the one or more accepted nodes. The IAB donor CU 1 still uses the group identifier in S803, and adjusts a node in a group corresponding to the group identifier. For example, the IAB donor CU 1 deletes a node rejected by the IAB donor CU 2 from the group.

Optionally, in S805 and S806, the IAB donor CU 1 may generate group an identifier of a group handover for the handover 1 and the handover 3 respectively. An RRC reconfiguration message of the one or more nodes in the group corresponding to a same handover may include a same identifier (namely, an identifier of the group handover). It may be understood that the identifier is in a one-to-one correspondence with the handover, where different handovers correspond to different identifiers.

For example, the IAB donor CU 1 may generate identifiers for the handover 1 and the handover 3 respectively. For ease of description, identification information corresponding to the handover 1 is referred to as a handover identifier 1, and identification information corresponding to the handover 3 is referred to as a handover identifier 3. An RRC reconfiguration message of the one or more nodes in the group (that is, the IAB node 1, the IAB node 2, and the terminal 2) corresponding to the handover 1 includes a handover identifier 1, and an RRC reconfiguration message of the one or more nodes in the group corresponding to the handover 3 includes a handover identifier 3.

For example, identifiers of the handover 1 and the handover 3 may be indexes, or may be other information. This is not limited in embodiments of this application.

One or more nodes in the group may receive a plurality of RRC reconfiguration messages, for example, the IAB node 2 may receive RRC reconfiguration messages respectively corresponding to the handover 1 and the handover 3. Due to this arrangement, the RRC reconfiguration messages corresponding to the handover of the IAB node 2 1 and the handover 3 respectively carry the identifier 1 and the identifier 3, and the IAB node 2 may distinguish the RRC reconfiguration messages corresponding to the different handovers.

S807: The IAB donor CU 1 generates, for the IAB node 1, effective conditions respectively corresponding to the handover 1 and the handover 3.

The IAB donor CU 1 may generate, for the IAB node 1, effective conditions respectively corresponding to the handover 1 and the handover 3.

It may be understood that, when the effective condition of the IAB node 1 corresponding to one handover is met, the RRC reconfiguration message of the IAB node 1 corresponding to the handover becomes effective. For example, when the effective condition of the IAB node 1 corresponding to the handover 3 is met, the RRC reconfiguration message of the IAB node 1 corresponding to the handover 3 becomes effective.

For example, an effective condition of the IAB node 1 corresponding to a handover may be an A5 event, that is, signal quality of a source cell measured by the IAB node 1 is lower than a threshold, and signal quality of a candidate target cell corresponding to the handover measured by the IAB node 1 exceeds a (predetermined) threshold. For example, the effective condition of the IAB node 1 corresponding to the handover 3 may be that signal quality of a cell (that is, a source cell) served by the IAB node 3 measured by the IAB node 1 is lower than a (predetermined) threshold, and signal quality of a candidate target cell (that is, a cell served by the IAB node 6) measured by the IAB node 1 exceeds a (predetermined) threshold. Alternatively, an effective condition of the IAB node 1 corresponding to a handover may be an A3 event, that is, signal quality of a source cell measured by the IAB node 1 is lower than a threshold, and signal quality of a candidate target cell corresponding to the handover measured by the IAB node 1 exceeds the signal quality of the source cell by a threshold.

Optionally, in another alternative implementation of S808, the IAB donor CU 1 may generate only one effective condition, and the effective condition may be applicable to the handover 1 and to the handover 3. When the signal quality of the source cell measured by the IAB node 1 and the signal quality that is of the candidate target cell corresponding to a handover and that is measured by the IAB node 1 meet the effective condition, the RRC reconfiguration message corresponding to the handover becomes effective.

For example, when the signal quality of the cell (namely, the source cell) served by the IAB node 3 and the signal quality that is of the candidate target cell (namely, the cell served by the IAB node 6) corresponding to the handover 3 and that is measured by the IAB node 1 meet the effective condition, the RRC reconfiguration message of the IAB node 1 corresponding to the handover 3 becomes effective.

Optionally, the IAB donor CU 1 may generate, for the IAB node 2, effective conditions respectively corresponding to the handover 1 and the handover 3.

Optionally, an effective condition of the IAB node 2 corresponding to a handover may be an identifier of a candidate target cell of the IAB node 2 corresponding to the handover. When the IAB node 2 detects (which may be understood as finding or measuring) a cell corresponding to the identifier of the candidate target cell of the IAB node 2 corresponding to the handover, the RRC reconfiguration message of the IAB node 2 corresponding to the handover becomes effective. For example, the effective condition of the IAB node 2 corresponding to the handover 3 may be the identifier of the candidate target cell of the IAB node 2 corresponding to the handover 3. When the IAB node 2 detects the identifier of the candidate target cell of the IAB node 2 corresponding to the handover, the RRC reconfiguration message of the IAB node 2 corresponding to the handover 3 becomes effective.

Optionally, the IAB donor CU 1 may generate, for the terminal 2, effective conditions that respectively correspond to the handover 1 and the handover 3. An effective condition of the terminal 2 corresponding to a handover may be an identifier of a candidate target cell of the terminal 2 corresponding to the handover. For details, refer to the foregoing content that the IAB donor CU 1 generates for the IAB node 2 the effective conditions respectively corresponding to the handover 1 and the handover 3. Details are not described herein again.

With reference to S808 to S811, the following disclosure describes that the IAB donor CU 1 separately sends, to one or more nodes in the group, RRC reconfiguration messages of the nodes respectively corresponding to the handover 1 and the handover 3.

S808: The IAB donor CU 1 sends, to the terminal 2, RRC reconfiguration messages of the terminal 2 respectively corresponding to the handover 1 and the handover 3.

For example, S808 may include that the IAB donor CU 1 sends an F1AP message (for example, a downlink RRC message transfer message or a UE context modification request message) to the IAB node 2 that includes RRC reconfiguration messages of the terminal 2 respectively corresponding to the handover 1 and the handover 3, or the IAB donor CU 1 sends a plurality of F1AP messages to the IAB node 2, where each F1AP message includes an RRC reconfiguration message of the terminal 2 corresponding to a handover. S808 may also include that the IAB node 2 sends, in a message, RRC reconfiguration messages of the terminal 2 respectively corresponding to the handover 1 and the handover 3 to the terminal 2, or the IAB node 2 sends a plurality of messages to the terminal 2, where each message includes an RRC reconfiguration message of the terminal 2 corresponding to a handover.

Optionally, in S808, when the IAB donor CU 1 generates, for the terminal 2, effective conditions of the terminal 2 respectively corresponding to the handover 1 and the handover 3, the IAB donor CU 1 may further send, to the terminal 2, the effective conditions of the terminal 2 respectively corresponding to the handover 1 and the handover 3. The effective conditions may be sent to the terminal 2 together with the RRC reconfiguration messages respectively of the terminal 2 corresponding to the handover 1 and the handover 3, or may be sent to the terminal 2 separately.

In an example, the F1AP message sent by the IAB donor CU 1 to the IAB node 2 includes the RRC reconfiguration messages of the terminal 2 respectively corresponding to the handover 1 and the handover 3, and the effective conditions of the terminal 2 respectively corresponding to the handover 1 and the handover 3. Then, a message sent by the IAB node 2 to the terminal 2 includes the RRC reconfiguration messages of the terminal 2 respectively corresponding to the handover 1 and the handover 3, and the effective conditions of the terminal 2 respectively corresponding to the handover 1 and the handover 3.

In another example, the IAB donor CU 1 sends a plurality of F1AP messages to the IAB node 2, where each F1AP message includes an RRC reconfiguration message of the terminal 2 corresponding to a handover and an effective condition of the terminal 2 corresponding to the handover. The IAB node 2 separately sends a plurality of messages to the terminal 2, where each message includes an RRC reconfiguration message of the terminal 2 corresponding to a handover and an effective condition of the terminal 2 corresponding to the handover.

S809: The IAB donor CU 1 sends, to the IAB node 2, RRC reconfiguration messages of the IAB node 2 respectively corresponding to the handover 1 and the handover 3.

S809 may include that the IAB donor CU 1 sends an F1AP message (for example, a downlink RRC message transfer message or a UE context modification request message) to the IAB node 1 that includes RRC reconfiguration messages of the IAB node 2 respectively corresponding to the handover 1 and the handover 3, or the IAB donor CU 1 sends a plurality of F1AP messages to the IAB node 1, where each F1AP message includes an RRC reconfiguration message of the IAB node 2 corresponding to a handover. S809 may also include that the IAB node 1 sends, in a message, RRC reconfiguration messages of the IAB node 2 respectively corresponding to the handover 1 and the handover 3 to the IAB node 2, or the IAB node 1 sends a plurality of messages to the IAB node 2, where each message includes an RRC reconfiguration message of the IAB node 2 corresponding to a handover.

Optionally, in S808, if the IAB donor CU 1 generates, for the IAB node 2, effective conditions of the IAB node 2 respectively corresponding to the handover 1, the handover 3, and the handover 4, the IAB donor CU 1 may further send the effective conditions of the IAB node 2 respectively corresponding to the handover 1, the handover 3, and the handover 4. The effective conditions may be sent to the IAB node 2 together with the RRC reconfiguration messages of the IAB node 2 respectively corresponding to the handover 1 and the handover 3, or may be sent to the IAB node 2 separately.

In an example, the F1AP message sent by the IAB donor CU 1 to the IAB node 1 includes the RRC reconfiguration messages respectively corresponds to the handover 1 and the handover 3 of the IAB node 2, and the effective conditions of the IAB node 2 respectively corresponding to the handover 1 and the handover 3. Then, the IAB node 1 sends, to the IAB node 2, the RRC reconfiguration messages respectively corresponds to the handover 1 and the handover 3 of the IAB node 2, and the effective conditions of the IAB node 2 respectively corresponding to the handover 1 and the handover 3.

In another example, the IAB donor CU 1 sends a plurality of F1AP messages to the IAB node 1, where each F1AP message includes an RRC reconfiguration message of the IAB node 2 corresponding to one handover and an effective condition of the IAB node 2 corresponding to the handover. The IAB node 1 separately sends a plurality of messages to the IAB node 2, where each message includes an RRC reconfiguration message of the IAB node 2 corresponding to one handover and an effective condition of the IAB node 2 corresponding to the handover.

S810: The IAB donor CU 1 sends, to the IAB node 1, RRC reconfiguration messages of the IAB node 1 respectively corresponding to the handover 1 and the handover 3, and effective conditions of the IAB node 1 respectively corresponding to the handover 1 and the handover 3.

Optionally, the effective conditions of the IAB node 1 respectively corresponding to the handover 1, the handover 3, and the handover 4 and the RRC reconfiguration messages of the IAB node 1 respectively corresponding to the handover 1, the handover 3, and the handover 4 are sent to the IAB node 1 together, or are sent to the IAB node 1 separately.

In an example, S810 may include that the IAB donor CU 1 sends an F1AP message (for example, a downlink RRC message transfer message or a UE context modification request message) to the IAB node 3, including RRC reconfiguration messages of the IAB node 1 respectively corresponding to the handover 1 and the handover 3, and effective conditions of the IAB node 1 respectively corresponding to the handover 1 and the handover 3. Also in S810, the IAB node 3 may send a message to the IAB node 1, where the message includes the RRC reconfiguration messages of the IAB node 1 respectively corresponding to the handover 1 and the handover 3 and the effective conditions of the IAB node 1 respectively corresponding to the handover 1 and the handover 3.

In another example, S810 may include that the IAB donor CU 1 sends a plurality of F1AP messages to the IAB node 3, where each F1AP message includes an RRC reconfiguration message of the IAB node 1 corresponding to a handover and an effective condition of the IAB node 1 corresponding to the handover. Also in S810, the IAB node 3 may send a plurality of messages to the IAB node 1, where each message includes an RRC reconfiguration message of the IAB node 1 corresponding to a handover and an effective condition of the IAB node 1 corresponding to the handover.

The IAB node 1 may determine whether the effective condition of the IAB node 1 corresponding to the handover 1 and the effective condition of the IAB node 1 corresponding to the handover 3 are met. An example in which the IAB node 1 determines that the effective condition corresponding to the handover 3 is met is used in the following for description. It should be noted that this is not limited in embodiments of this application.

S811: Determine that the effective condition of the IAB node 1 corresponding to the handover 3 is met.

For example, the IAB node 1 measures signal quality that is of a candidate target cell corresponding to the handover 3 and that is received by the IAB node 1. When the signal quality exceeds a (predetermined) threshold A and signal quality of the IAB node 1 in the source cell is lower than a (predetermined) threshold B, the IAB node 1 determines that the effective condition of the IAB node 1 corresponding to the handover 3 is met.

Optionally, if the RRC reconfiguration message of the IAB node 1 corresponding to the handover 3 includes information indicating cross-donor node handover, the IAB node 1 may determine, based on the information indicating cross-donor node handover, that the handover 3 is a cross-donor node handover.

The IAB node 1 may perform RRC reconfiguration based on the RRC reconfiguration message of the IAB node 1 corresponding to the handover 3, and may further establish an F1 interface with the IAB donor CU 2, which is described below with reference to S814 and S815.

S812: The IAB node 1 performs RRC reconfiguration based on the RRC reconfiguration message of the IAB node 1 corresponding to the handover 3.

The RRC reconfiguration performed by the IAB node 1 may be understood as establishing an RRC connection to the IAB donor CU 2.

The RRC reconfiguration performed by the IAB node 1 may include that the IAB node 1 initiates random access in a candidate target cell (that is, a cell served by the IAB node 6) corresponding to the handover 3.

After the RRC reconfiguration is performed, the IAB node 1 may send an RRC reconfiguration complete message to the IAB donor CU 2, which may mean that the IAB node 1 completes the RRC reconfiguration. The RRC connection of the IAB node 1 is migrated to the IAB donor CU 2, or the IAB node 1 completes the handover based on the RRC reconfiguration message corresponding to the handover 3.

S813: The IAB node 1 establishes an F1 interface with the IAB donor CU 2.

Specifically, the DU of the IAB node 1 may send an F1 connection setup request (e.g., F1 SETUP REQUEST) to the IAB donor CU 2. Then, the IAB donor CU 2 may return an F1 connection setup response (e.g., F1 SETUP RESPONSE) message to the DU of the IAB node 1, to complete an F1 interface setup process between the IAB node 1 and the IAB donor CU 2.

In a possible alternative manner, the establishment of the F1 interface between the IAB node 1 and the IAB donor CU 2 may also be completed in advance. Then, in S815, the IAB node 1 may migrate the established F1 interface to a new transmission path (the new transmission path includes the IAB node 1, the IAB node 6, the IAB donor DU 3, and the IAB donor CU 3).

For example, before the target IAB donor CU 2 determines the configuration information of the descendant node (for example, the terminal 1 and the IAB node 2) of the IAB node 1 corresponding to the handover 3 (that is, S804), the IAB node 1 establishes an F1 interface with the IAB donor CU 2 in advance. An F1 connection establishment request message and an F1 connection establishment response message are involved in a process of pre-establishing the F1 interface need to pass through the source parent node (e.g., the IAB node 3) of the IAB node 1 and the IAB donor DU 1 and an IP network (if any) between the IAB donor DU 1 and the IAB donor CU 2, to be transmitted between the IAB node 1 and the IAB donor CU 2. After S814, the IAB node 1 may establish a new transport layer association (for example, an SCTP association) with the IAB donor CU 2 through the new IP address of the IAB node 1, and use the updated BAP layer routing configuration provided by the IAB donor CU 2 to carry the new transport layer association on a new transmission path. Then, the IAB node 1 may initiate a gNB-DU configuration update process to the IAB donor CU 2, and bind a control plane of the F1 interface to the new transport layer association. In this way, the control plane of the F1 interface between the IAB node 1 and the IAB donor CU 2 is migrated to the new transmission path. Subsequently, the IAB donor CU 2 and the IAB node 1 may perform a tunnel update procedure (for example, a UE context update procedure, or an IAB user plane configuration update procedure) for a user plane to migrate the user plane of the F1 interface to a new transmission path.

After determining to be handed over to the target parent node IAB node 6 (that is, the handover 3), the IAB node 1 may indicate a child node of the IAB node 1 to perform RRC reconfiguration based on the RRC reconfiguration message corresponding to the handover 3, which is described in the following with reference to S814 and S815.

It should be noted that a sequence of steps S812 to S814 in this application is not limited. For example, S812 and S813 may be performed before S814, or S812 and S813 may be performed after S814. Alternatively, S812 and S813 may be performed synchronously with S814.

S814: The IAB node 1 sends indication information 1 to the IAB node 2.

For the indication information 1, refer to content of the first indication information.

Optionally, if the RRC reconfiguration message of the IAB node 1 corresponding to the handover 3 includes indication information indicating cross-donor node handover, the IAB node 1 may determine, based on the indication information indicating cross-donor node handover, that the handover 3 is a cross-donor node handover. The IAB node 1 may further send, to the IAB node 2, indication information indicating that the handover 3 is a cross-donor node handover, where the indication information may be included in the indication information 1. Alternatively, the indication information may be separated from the indication information 1, and is sent by the IAB node 1 to the IAB node 2 separately. For the indication information indicating cross-donor node handover, refer to content of the second implementation of the second indication information.

S815: The IAB node 2 determines, based on the indication information 1, that the RRC reconfiguration message of the IAB node 2 corresponding to the handover 3 becomes effective.

Optionally, if the RRC reconfiguration message of the IAB node 2 corresponding to the handover 3 includes information indicating cross-donor node handover, the IAB node 2 may determine, based on the information indicating cross-donor node handover, that the handover 3 is a cross-donor node handover. Alternatively, if the IAB node 2 receives, from the IAB node 1, the information (which may be included in the indication information 1 or not included in the indication information 1) indicating that the handover 3 is a cross-donor node handover, the IAB node 2 may determine, based on the information, that the handover 3 is a cross-donor node handover.

The IAB node 2 may perform RRC reconfiguration and establish an F1 interface, which is described below with reference to S816 and S817.

S816: The IAB node 2 performs RRC reconfiguration based on the RRC reconfiguration message of the IAB node 2 corresponding to the handover 3.

After the RRC reconfiguration is performed, the IAB node 2 may send an RRC reconfiguration complete message to the IAB donor CU 2.

S817: The IAB node 2 establishes an F1 interface with the IAB donor CU 2.

For S817, refer to content of S813.

S818: The IAB node 2 sends indication information 2 to the terminal 2.

For the indication information 2, refer to content of the first indication information.

Optionally, after the IAB node 2 determines that the handover 3 is a cross-donor node handover, the IAB node 2 may further send, to the terminal 2, the indication information indicating that the handover 3 is a cross-donor node handover, where the indication information may be included in the indication information 2. Alternatively, the indication information may be separated from the indication information 2, and is sent by the IAB node 2 to the terminal 2 separately. For the indication information indicating cross-donor node handover, refer to content of the second implementation of the second indication information.

A sequence of steps S816 to S818 to some embodiments. For example, S816 and S817 may be performed before S818, or S816 and S817 may be performed synchronously with S818. Alternatively, S816 and S817 may be performed after S818.

S819: The terminal 2 determines, based on the indication information 2, that the RRC reconfiguration message of the terminal 2 corresponding to the handover 3 becomes effective.

If the RRC reconfiguration message of the terminal 2 corresponding to the handover 3 includes information indicating cross-donor node handover, the terminal 2 may determine, based on the information indicating cross-donor node handover, that the handover 3 is a cross-donor node handover. Alternatively, if the terminal 2 receives, from the IAB node 2, the information indicating that the handover 3 is a cross-host node, the terminal 2 may determine, based on the information, that the handover 3 is a cross-donor node handover.

The terminal 2 may perform RRC reconfiguration with the IAB donor CU 2, which is described below with reference to S820.

S820: The terminal 2 performs RRC reconfiguration based on the RRC reconfiguration message of the terminal 2 corresponding to the handover 3.

After the RRC reconfiguration is performed, the terminal 2 may send an RRC reconfiguration complete message to the IAB donor CU 2

The content of FIG. 8A to FIG. 8D and the content of FIG. 6 and FIG. 7 may be mutually referenced.

For example, the IAB node 1 and the IAB node 2 in FIG. 8A to FIG. 8D are the second node and the first node in FIG. 6 and FIG. 7 respectively, S804 and S601 and S604 may be mutually referenced, S809 and S602 and S603 may be mutually referenced, S810 and S605 may be mutually referenced, S811 and S606 may be mutually referenced, S812 and S608 may be mutually referenced, S814 and S607 may be mutually referenced, S815 and S609 may be mutually referenced, and S816 and S610 may be mutually referenced.

For another example, the IAB node 2 and the terminal 2 in FIG. 8A to FIG. 8D are the second node and the first node in FIG. 6 and FIG. 7 respectively, S804 and S601 and S604 may be mutually referenced, S808 and S602 and S603 may be mutually referenced, S809 and S605 may be mutually referenced, S815 and S606 may be mutually referenced, S816 and S608 may be mutually referenced, S818 and S607 may be mutually referenced, S819 and S609 may be mutually referenced, and S820 and S610 may be mutually referenced.

For the indication information 1 and the indication information 2, refer to content of the first indication information. The following describes a plurality of implementations of the foregoing first indication information with reference to examples. Manners 1 to 5 of the indication information 1 and the indication information 2 may be mutually referenced with content of the foregoing manners 1 to 5 of the first indication information.

Manner 1

The indication information 1 and the indication information 2 include an identifier of a group handover, that is, the identifier 3.

In S806, each RRC reconfiguration message of one or more nodes (for example, the IAB node 1, the IAB node 2, and the terminal 2) in the group corresponding to the handover 3 includes the identifier 3.

After determining that the effective condition of the IAB node 1 corresponding to the handover 3 is met (S811), the IAB node 1 may obtain the identifier 3 from the RRC reconfiguration message of the IAB node 1 corresponding to the handover 3, carry the identifier 3 by using the indication information 1 (S814), and then send the indication information 1 to the IAB node 2. Then, after the IAB node 2 receives the identifier 3, the IAB node 2 determines the RRC reconfiguration message including the identifier 3 based on the plurality of received RRC reconfiguration messages, which are the RRC reconfiguration messages of the IAB node 2 respectively corresponding to the handover 1 and the handover 3. That is, the RRC reconfiguration message of the IAB node 2 corresponding to the handover 3 becomes effective (S815). Then, the IAB node 2 sends the indication information 2 to the terminal 2 (S818), where the indication information 2 may include the identifier 3. After the terminal 2 receives the indication information 2, the terminal 2 determines the RRC reconfiguration message including the identifier 3 based on the plurality of received RRC reconfiguration messages, which are the RRC reconfiguration messages of the terminal 2 respectively corresponding to the handover 1, the handover 3, and the handover 4. That is, the RRC reconfiguration message of the terminal 2 corresponding to the handover 3 becomes effective (S819).

Manner 2

The indication information 1 includes an identifier of a candidate target cell of the IAB node 2 corresponding to the handover 3, and the indication information 2 includes an identifier of a candidate target cell of the terminal 2 corresponding to the handover 3.

In a possible implementation of Manner 2, in S804, configuration information of each of the one or more nodes in the group corresponding to the handover 3 includes an identifier of a candidate target cell of the node corresponding to the handover 3. In addition, each node in the one or more nodes is configured with a correspondence between an identifier of the candidate target cell of the node corresponding to the handover 3 and an identifier of a candidate target cell of a child node of the node corresponding to the handover 3.

The IAB node 1 is configured with a correspondence between the identifier of the target cell of the IAB node 2 corresponding to the handover 3 and the identifier of the target cell of the IAB node 1 corresponding to the handover 3. The correspondence may be sent by the IAB donor CU 2 to the IAB node 1 through the IAB donor CU 1. The correspondence may be carried in the message in S810, or the correspondence may be sent to the IAB node 1 by using another message other than that in S810.

The IAB node 2 is configured with a correspondence between the identifier of the target cell of the terminal 2 corresponding to the handover 3 and the identifier of the target cell the IAB node 2 corresponding to the handover 3. The correspondence may be sent by the IAB donor CU 2 to the IAB node 1 through the IAB donor CU 1. The correspondence may be carried in the message in S809, or the correspondence may be sent to the IAB node 2 by using another message other than that in S809.

After determining that the effective condition of the IAB node 1 corresponding to the handover 3 is met (S811), the IAB node 1 may determine, from the RRC reconfiguration message of the IAB node 1 corresponding to the handover 3, the identifier of the candidate target cell of the IAB node 1 corresponding to the handover 3, obtain the identifier of the candidate target cell of the IAB node 2 corresponding to the handover 3 based on the correspondence configured by the IAB node 1, and then carry the identifier of the candidate target cell of the IAB node 2 corresponding to the handover 3 by using the indication information 1 (S814). The IAB node 2 determines, from the plurality of received RRC reconfiguration messages, an RRC reconfiguration message that includes the identifier of the candidate target cell of the IAB node 2 corresponding to the handover 3. That is, the RRC reconfiguration message of the IAB node 2 corresponding to the handover 3 becomes effective (S815). Then, the IAB node 2 obtains, based on the identifier of the candidate target cell of the IAB node 2 corresponding to the handover 3, and the correspondence configured by the IAB node 2, the identifier of the candidate target cell of the terminal 2 corresponding to the handover 3, and then sends, to the terminal 2, the identifier of the candidate target cell of the terminal 2 corresponding to the handover 3 by using the indication information 2 (S818). The terminal 2 determines, based on the plurality of received RRC reconfiguration messages, an RRC reconfiguration message that includes the identifier of the candidate target cell of terminal 2 corresponding to the handover 3. That is, the RRC reconfiguration message of the terminal 2 corresponding to the handover 3 becomes effective (S819).

In another possible implementation of Manner 2, in S804, the configuration information of each node in the group corresponding to the handover 3 includes an identifier of a candidate target cell of the node corresponding to the handover 3, and an identifier of a candidate target cell of a child node of the node corresponding to the handover 3.

After determining that the effective condition of the IAB node 1 corresponding to the handover 3 is met (S811), the IAB node 1 may determine, from the RRC reconfiguration message of the IAB node 1 corresponding to the handover 3, the identifier of the candidate target cell of the IAB node 1 corresponding to the handover 3 and the identifier of the candidate target cell of the IAB node 2 corresponding to the handover 3, and then carry the identifier of the candidate target cell of the IAB node 2 corresponding to the handover 3 by using the indication information 1 (S814). The IAB node 2 determines, from the plurality of received RRC reconfiguration messages, an RRC reconfiguration message that includes the identifier of the candidate target cell of the IAB node 2 corresponding to the handover 3. That is, the RRC reconfiguration message of the IAB node 2 corresponding to the handover 3 becomes effective (S815). Then, the IAB node 2 may determine, from the RRC reconfiguration message of the IAB node 2 corresponding to the handover 3, the identifier of the candidate target cell of the IAB node 2 corresponding to the handover 3, and the identifier of the candidate target cell of the terminal 2 corresponding to the handover 3, and carry the identifier of the candidate target cell of the terminal 2 corresponding to the handover 3 by using the indication information 2 (S818). Then, the terminal 2 determines, based on the plurality of received RRC reconfiguration messages, an RRC reconfiguration message that includes the identifier of the candidate target cell of terminal 2 corresponding to the handover 3. That is, the RRC reconfiguration message of the terminal 2 corresponding to the handover 3 becomes effective (S819).

Manner 3

The indication information 1 includes an identifier of a candidate target cell of a parent node (that is, the IAB node 1) of the IAB node 2 corresponding to the handover 3, and the indication information 2 includes an identifier of a candidate target cell of a parent node (that is, the IAB node 2) of the terminal 2 corresponding to the handover 3.

In a possible implementation of Manner 3, in S804, configuration information of each of the one or more nodes in the group corresponding to the handover 3 includes an identifier of a candidate target cell of the node corresponding to the handover 3. In addition, each descendant node (that is, other nodes of the one or more nodes except the head node) of the one or more nodes is configured with a correspondence between an identifier of a candidate target cell of the descendant node corresponding to the handover 3 and an identifier of a candidate target cell of a parent node of the descendant node corresponding to the handover 3.

The IAB node 2 is configured with a correspondence between the identifier of the candidate target cell of the IAB node 2 corresponding to the handover 3 and the identifier of the candidate target cell of the IAB node 1 corresponding to the handover 3. The correspondence may be sent by the IAB donor CU 2 to the IAB node 2 through the IAB donor CU 1. The correspondence may be carried in the message in S809, or the correspondence may be sent to the IAB node 2 by using another message other than that in S809.

The terminal 2 is configured with a correspondence between the identifier of the candidate target cell of the terminal 2 corresponding to the handover 3 and the identifier of the candidate target cell the IAB node 2 corresponding to the handover 3. The correspondence may be sent by the IAB donor CU 2 to the terminal 2 through the IAB donor CU 1. The correspondence may be carried in the message in S808, or the correspondence may be sent to the terminal 2 by using another message other than that in S808.

After determining that the effective condition of the IAB node 1 corresponding to the handover 3 is met (S811), the IAB node 1 may determine, from the RRC reconfiguration message of the IAB node 1 corresponding to the handover 3, the identifier of the candidate target cell of the IAB node 1 corresponding to the handover 3, and then carry the identifier of the candidate target cell of the IAB node 1 corresponding to the handover 3 by using the indication information 1 (S814). The IAB node 2 obtains, based on the correspondence, the identifier of the candidate target cell of the IAB node 2 corresponding to the handover 3. The IAB node 2 determines, from the plurality of received RRC reconfiguration messages, an RRC reconfiguration message that includes the identifier of the candidate target cell of the IAB node 2 corresponding to the handover 3. That is, the RRC reconfiguration message of the IAB node 2 corresponding to the handover 3 becomes effective (S815). Then, the IAB node 2 carries the identifier of the candidate target cell of the IAB node 2 corresponding to the handover 3 by using the indication information 2, and sends the identifier to the terminal 2 (S818). The terminal 2 may determine, based on the identifier of the candidate target cell of the IAB node 2 corresponding to the handover 3 and the foregoing correspondence configured by the terminal 2, the identifier of the candidate target cell of the terminal 2 corresponding to the handover 3. Then, the terminal 2 determines, based on the plurality of received RRC reconfiguration messages, an RRC reconfiguration message that includes the identifier of the candidate target cell of the terminal 2 corresponding to the handover 3. That is, the RRC reconfiguration message of the terminal 2 corresponding to the handover 3 becomes effective (S819).

In another possibility of Manner 3, in S804, configuration information of the head node in the one or more nodes in the group corresponding to the handover 3 includes an identifier of a candidate target cell of the head node corresponding to the handover 3, and configuration information of the descendant node (that is, another node in the one or more nodes except the head node) in the one or more nodes corresponding to the handover 3 includes an identifier of a candidate target cell of the node corresponding to the handover 3, and an identifier of a candidate target cell of a parent node of the node corresponding to the handover 3.

After determining that the effective condition of the IAB node 1 corresponding to the handover 3 is met (S811), the IAB node 1 may determine, from the RRC reconfiguration message of the IAB node 1 corresponding to the handover 3, the identifier of the candidate target cell of the IAB node 1 corresponding to the handover 3, and then carry the identifier of the candidate target cell of the IAB node 1 corresponding to the handover 3 by using the indication information 1 (S814). The IAB node 2 determines, from the plurality of received RRC reconfiguration messages, an RRC reconfiguration message that includes the identifier of the candidate target cell of the IAB node 1 corresponding to the handover 3. That is, the RRC reconfiguration message of the IAB node 2 corresponding to the handover 3 becomes effective (S815). Then, the IAB node 2 carries the identifier of the candidate target cell of the IAB node 2 corresponding to the handover 3 by using the indication information 2, and sends the identifier to the terminal 2 (S818). The terminal 2 determines, based on the plurality of received RRC reconfiguration messages, an RRC reconfiguration message that includes the identifier of the candidate target cell of the IAB node 2 corresponding to the handover 3. That is, the RRC reconfiguration message of the terminal 2 corresponding to the handover 3 becomes effective (S819).

Manner 4

The indication information 1 and the indication information 2 include the group identifier of the group.

Manner 4 may be applicable to a scenario where there is only one handover in the group. For example, the group only has the handover 3, and does not have handover 1 or handover 2. It may be understood that in this case, handovers of one or more other groups may exist in the IAB network. Nodes in the other groups may be completely different from the nodes in the group of the handover 3, or the nodes in the other groups may be partially the same and partially different from the nodes in the group.

The group identifier may be added by the IAB donor CU 2 in S804 to the configuration information of the one or more nodes corresponding to the handover 3, or may be added by the IAB donor CU 1 in S806 to the RRC reconfiguration message of the one or more nodes corresponding to the handover 3.

In this case, after determining that the effective condition of the IAB node 1 corresponding to the handover 3 is met (S811), the IAB node 1 may determine the group identifier from the RRC reconfiguration message of the IAB node 1 corresponding to the handover 3, and send the indication information 1 carrying the group identifier to the IAB node 2 (S814). The IAB node 2 determines, based on the group identifier, an RRC reconfiguration message that includes the group identifier. That is, the RRC reconfiguration message of the IAB node 2 corresponding to the handover 3 becomes effective (S815). Then, the IAB node 2 sends the indication information 2 carrying the group identifier to the terminal 2 (S818). The terminal 2 determines, based on the group identifier, an RRC reconfiguration message that includes the group identifier. That is, the RRC reconfiguration message of the terminal 2 corresponding to the handover 3 becomes effective (S819).

Manner 5

The indication information 1 and the indication information 2 include an identifier of a candidate target cell of the IAB node 1 corresponding to the handover 3.

In this case, after determining that the effective condition of the IAB node 1 corresponding to the handover 3 is met (S811), the IAB node 1 may determine, from the RRC reconfiguration message of the IAB node 1 corresponding to the handover 3, the identifier of the candidate target cell of the IAB node 1 corresponding to the handover 3, carry the identifier of the candidate target cell of the IAB node 1 corresponding to the handover 3 in the indication information 1, and send the identifier to the IAB node 2 (S814). The IAB node 2 determines, based on the identifier of the candidate target cell of the IAB node 1 corresponding to the handover 3, an RRC reconfiguration message that includes the identifier of the candidate target cell of the IAB node 1 corresponding to the handover 3. That is, the RRC reconfiguration message of the IAB node 2 corresponding to the handover 3 becomes effective (S815). Then, the IAB node 2 carries the identifier of the candidate target cell of the IAB node 1 corresponding to the handover 3 by using the indication information 2, and sends the identifier to the terminal 2 (S818). The terminal 2 determines, based on the identifier of the candidate target cell of the IAB node 1 corresponding to the handover 3, an RRC reconfiguration message that includes the identifier of the candidate target cell of the IAB node 1 corresponding to the handover 3. That is, the RRC reconfiguration message of the terminal 2 corresponding to the handover 3 becomes effective (S819).

Optionally, for the disclosure relating to Manner 1 to Manner 5, refer to disclosure relating to Manner 1 to Manner 5 for the first indication information. Manner 1 to Manner 5 may be implemented separately, or one or more of Manner 1 to Manner 5 may be implemented together. For example, the indication information sent by the parent node in the group of the handover 3 to the child node may include one or more of the group identifier, the identifier 3, the identifier of the candidate target cell of the head node corresponding to the handover 3, the identifier of the candidate target cell of the parent node corresponding to the handover 3, and the identifier of the candidate target cell of the child node corresponding to the handover 3. In other words, the indication information 1 may include one or more of the identifier 3, the identifier of the candidate target cell of the IAB node 2 corresponding to the handover 3, the identifier of the candidate target cell of the parent node (that is, the IAB node 1) of the IAB node 2, and the group identifier. The indication information 2 may include the identification information 3, the identifier of the candidate target cell of the terminal 2 corresponding to the handover 3, the identifier of the candidate target cell of the head node (that is, the IAB node 1) in the group corresponding to the handover 3, the identifier of the candidate target cell of the parent node (that is, the IAB node 2) of the terminal 2 corresponding to the handover 3, and the group identifier.

In addition to Manner 1 to Manner 5, this application further provides a Manner 6 and a Manner 7.

Manner 6

In S809, the IAB node 2 receives the effective condition corresponding to the handover 3, where the effective condition includes the identifier of the candidate target cell of the IAB node 2 corresponding to the handover 3. After receiving the effective condition, the IAB node 2 may detect a cell corresponding to the identifier. When the cell corresponding to the identifier is detected, the RRC reconfiguration information of the IAB node 2 corresponding to the handover 3 becomes effective.

In S808, the terminal 2 receives the effective condition corresponding to the handover 3, where the effective condition includes the identifier of the candidate target cell corresponding to the handover 3 of the terminal 2. After receiving the effective condition, the terminal 2 may detect a cell corresponding to the identifier. When the cell corresponding to the identifier is detected, the RRC reconfiguration information of the terminal 2 corresponding to the handover 3 becomes effective.

Manner 7

Manner 4 may be applicable to the scenario where the group only has one handover, for example, the group only has the handover 3.

The indication information 1 and the indication information 2 are BH RLF indication information.

After determining that the effective condition of the IAB node 1 corresponding to the handover 3 is met (S811), the IAB node 1 may send BH RLF indication information to the IAB node 2 (S814). The IAB node 2 determines, based on the BH RLF indication information, that the RRC reconfiguration message of the IAB node 2 corresponding to the handover 3 is received (S809), and determines that the RRC reconfiguration message of the IAB node 2 corresponding to the handover 3 becomes effective (S815).

Optionally, the IAB node 1 may send the BH RLF indication information to the IAB node 2 after determining that the effective condition of the IAB node 1 corresponding to the handover 3 is met (S811), and determining that the group handover is a cross-donor node group handover.

In the foregoing disclosure of Manner 1 to Manner 7, the IAB network may flexibly determine the content of the indication information 1 and the indication information 2 based on a requirement, so that the IAB node 2 may determine, based on the indication information 1, that the RRC reconfiguration message of the IAB node 2 corresponding to the handover 3 becomes effective, and the terminal 2 may determine, based on the indication information 2, that the RRC reconfiguration message of the terminal 2 corresponding to the handover 3 becomes effective, to ensure that the IAB node 2 and the terminal 2 perform the handover within the predetermined time duration as well as for parent nodes of the IAB node 2 and the terminal 2, so as to avoid service transmission interruption of the terminal.

Optionally, in FIG. 8A to FIG. 8D, to ensure that all nodes in the group can receive indication information used to determine that the RRC reconfiguration message of the node corresponding to the handover 3 becomes effective, three options are provided in some embodiments. The following separately describes the three options. Cross-reference may be made to the content of FIG. 6 and FIG. 7.

Option 1

The RRC reconfiguration message of each of the one or more nodes in the group respectively corresponding to the handover 1 and the handover 3 includes the identifier of the child node of the node in the group. For example, the IAB node 1 determines that the effective condition of the IAB node 1 corresponding to the handover 3 is met. The identifier of the child node of the IAB node 1. For example, the identifier of the IAB node 2, may be determined from the RRC reconfiguration message of the IAB node 1 corresponding to the handover 3, and then the IAB node 1 may send the indication information 1 to the IAB node 2. Then, after receiving the indication information 1, the IAB node 2 may determine that the RRC reconfiguration message of the IAB node 2 corresponding to the handover 3 becomes effective, and determine the identifier of the child node of the IAB node 2 from the RRC reconfiguration message of the IAB node 2 corresponding to the handover 3, for example, the identifier of the terminal 2. Then, the IAB node 2 sends the indication information 1 to the terminal 2.

For an intra-donor node group handover, for example, the handover 1, the IAB donor CU 1 may obtain topology information in the group. Therefore, the IAB donor CU 1 may carry the information about the child node of the node in the RRC reconfiguration message of each of the one or more nodes corresponding to the handover 1.

For a cross-donor node group handover, for example, the handover 3, the IAB donor CU 1 may be responsible for adding information about a child node of each node, or the IAB donor CU 2 may be responsible for adding information about a child node of each node. The following describes the two possible manners.

In a possibility, the configuration information of each of the one or more nodes corresponding to the handover 3 includes an identifier of a child node of the node.

It may be understood that, when the first handover request in S804 includes the topology information of the group, the IAB donor CU 2 may determine to accept handover 3 of which nodes in the group, and may determine, based on the topology information of the group, a topology relationship between these accepted nodes. Therefore, the IAB donor CU 1 may carry the information about the child node of the node in the configuration information of each of the one or more nodes corresponding to the handover 3.

In another possibility, the configuration information of each of the one or more nodes corresponding to the handover 3 does not include identification information of a child node of the node, and the RRC reconfiguration message of the node corresponding to the handover 3 includes an identifier of the child node of the node.

It may be understood that, after the IAB donor CU 1 receives the configuration information of the one or more nodes corresponding to the handover 3 in S804, the IAB donor CU 1 may determine which nodes in the group are accepted by the IAB node CU 2. In addition, the IAB donor CU 1 may add, based on the topology information in the group and on the basis of the configuration information corresponding to each node, the identifier of the child node of the node, so as to obtain the RRC reconfiguration message of the one or more nodes corresponding to the handover 3.

Option 2

The RRC reconfiguration message of the head node respectively corresponding to the handover 1 and the handover 3 in the group includes identifiers of one or more descendant nodes of the head node in the group. In S811, after determining that the effective condition of the IAB node 1 corresponding to the handover 3 is met, the IAB node 1 may determine an identifier of one or more descendant nodes of the IAB node 1 from the RRC reconfiguration message of the IAB node 1 corresponding to the handover 3. Then, the IAB node 1 may determine a child node of the IAB node 1 from the one or more descendant nodes, and then the IAB node 1 sends, to the child node, indication information used to determine that an RRC reconfiguration message of the child node corresponding to the handover 3 becomes effective. In addition, for anode other than the child node of the IAB node 1 in the one or more descendant nodes, the IAB node 1 may determine that the node other than the child node is reachable through which child node of the IAB node 1 (reachable may be understood as that the node other than the child node is a descendant node of the child node), so that the IAB node 1 sends, to the child node, indication information carrying identifiers of the one or more descendant nodes of the child node. After receiving the indication information, the child node may send, based on the identifiers of the one or more descendant nodes carried in the indication information, indication information used to determine that the RRC reconfiguration message corresponding to the handover 3 becomes effective to a child node of the child node, and carry the identifiers of one or more descendant nodes of the child node of the child node. The rest may be deduced by analog until each node in the group receives the indication information used to determine that the RRC reconfiguration message of the node corresponding to the handover 3 becomes effective.

For example, after determining that the effective condition of the IAB node 1 corresponding to the handover 3 is met, the IAB node 1 may determine respective identifiers of the IAB node 2, the terminal 1, and the terminal 2 from the RRC reconfiguration messages of the IAB node 1 corresponding to the handover 3. Then, the IAB node 1 may determine child nodes the IAB node 2 and the terminal 1 of the IAB node 1 from the IAB node 2, the terminal 1, and the terminal 2, and determine that the terminal 2 is reachable through the IAB node 2 (that is, the terminal 2 is a descendant node of the IAB node 2). For example, the IAB node 2 sends the indication information 1. The indication information 1 carries the identifier of the terminal 2. After receiving the indication information 1, the IAB node 2 may determine, based on the identifier of the terminal 2 carried in the indication information 1, that the terminal 2 is a child node of the IAB node 2, and then send the indication information 2 to the terminal 2.

According to the foregoing option 1 and option 2, after determining that the RRC reconfiguration message of the node corresponding to the handover 3 becomes effective, the node in the group may learn which child node was used by the indication information to determine that the RRC reconfiguration message of the child node corresponding to the handover 3 becomes effective is sent, to reduce signaling overheads.

Option 3

After the IAB node 1 determines that the effective condition of the IAB node 1 corresponding to the handover 3 is met, the IAB node 1 may send the first indication information to all child nodes of the IAB node 1. After all child nodes of the IAB node 1 receive the first indication information, all child nodes of the IAB node 1 determine, based on the first indication information, that the RRC reconfiguration message of the child node corresponding to the handover 3 becomes effective, and continue to send the first indication information to a child node of the child node. The rest may be deduced by analog until each node in the group receives the indication information used to determine that the RRC reconfiguration message of the node corresponding to the handover 3 becomes effective.

For the foregoing options 1 to 3, refer to content in FIG. 6 and FIG. 7.

Optionally, in the method shown in FIG. 8A to FIG. 8D, some nodes receive indication information used to determine that an RRC reconfiguration message of the node corresponding to a handover (for example, the handover 3) becomes effective, and may not be able to determine that the RRC reconfiguration message of the node corresponding to the handover becomes effective. For example, due to link quality, the node does not receive the RRC reconfiguration message of the node corresponding to the handover, or the node is not a node in the group corresponding to the handover, and a parent node of the node sends the indication information to the node by mistake. To resolve this problem, some embodiments provide the following methods.

Method 1

The node may perform RRC re-establishment.

For example, the node may send an RRC re-establishment request message to the parent node of the node. If the handover is an intra-donor node handover, the parent node may send the RRC re-establishment request message to the donor node. Then, the donor node may send an RRC re-establishment message or an RRC establishment message to the parent node. If the handover is a cross-donor node handover, the parent node may send an RRC re-establishment message to a target donor node, and the target host node may initiate a context obtaining procedure of the node to a source donor node. Then, the target donor node sends an RRC re-establishment message or an RRC establishment message to the node through a parent node of the target donor node.

Method 2

When the node considers that an RLF occurs on a link between the node and the parent node, the node performs an operation when the RLF occurs on the link.

For example, when the node is in a single connection, an operation (such as cell selection, random access, and RRC connection re-establishment) similar to that of performing RLF recovery after the node detects a radio link failure may be implemented.

Alternatively, for another example, the node is in a dual connection. For example, when the node receives indication information from a secondary cell group (SCG) and cannot determine that a set of corresponding RRC reconfiguration messages becomes effective, the child node may consider that this is an SCG failure. Then, the node reports the SCG failure over a master cell group (MCG) path. Alternatively, if the node receives indication information from the MCG and cannot determine that a set of corresponding RRC reconfiguration messages becomes effective, the child node may consider that this is an MCG failure. Then, the node may perform an RRC re-establishment recovery procedure, or report the MCG failure over an SCG path.

Figure 9:
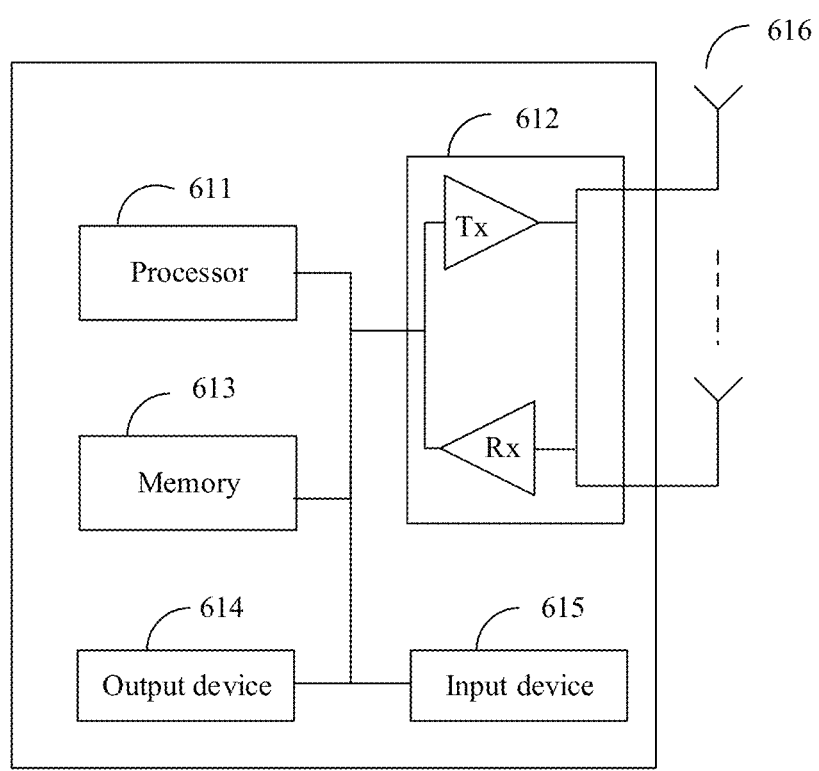
FIG. 9 is a schematic diagram of a structure of a terminal according to an embodiment of this application.
Figure 10:
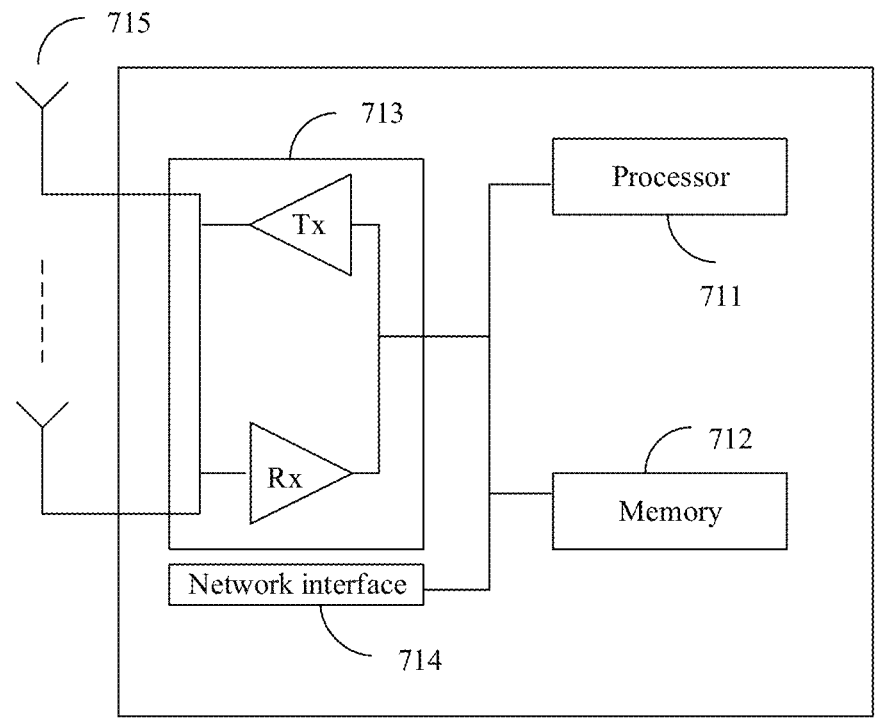
FIG. 10 is a schematic diagram of a structure of a communication apparatus according to an embodiment of this application.
Figure 11:
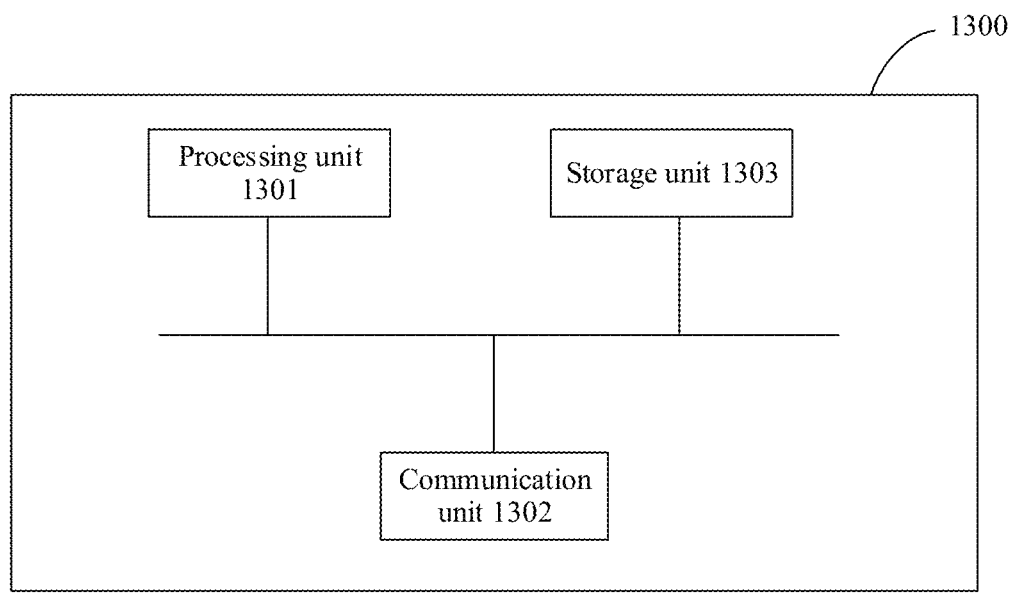
FIG. 11 is a schematic diagram of a structure of a communication apparatus according to an embodiment of this application.

With reference to FIG. 9 to FIG. 11, the following describes apparatuses provided in embodiments of this application. The apparatuses in FIG. 9 to FIG. 11 may complete the methods in FIG. 6 to FIG. 8D. Mutual reference may be made to content of the apparatuses and content of the methods.

FIG. 9 is a schematic diagram of a structure of a terminal according to an embodiment of this application. The terminal may implement a function of the terminal in the foregoing method embodiments. For ease of description, FIG. 9 shows main components of the terminal. As shown in FIG. 9:

The terminal includes at least one processor 611, at least one transceiver 612, and at least one memory 613. The processor 611, the memory 613, and the transceiver 612 are connected to each other. Optionally, the terminal may further include an output device 614, an input device 615, and one or more antennas 616. The antenna 616 is connected to the transceiver 612, and the output device 614 and the input device 615 are connected to the processor 611.

The processor 611 is configured to process a communication protocol and communication data, control the entire terminal, execute a software program, and process data of the software program.

In an optional implementation, the terminal device may include a baseband processor and a central processing unit. The baseband processor is configured to process the communication protocol and the communication data. The central processing unit is configured to control the entire terminal device, execute the software program, and process the data of the software program.

The memory 613 is configured to store the software program and data. The memory 613 may exist independently of the processor, and may be connected to the processor 611. Optionally, the memory 613 and the processor 611 may be integrated together, for example, integrated on a single chip, namely, an on-chip memory, or the memory 613 is an independent storage element. This is not limited in embodiments of this application. The memory 613 can store program code for executing the technical solutions in embodiments of this application, and the processor 611 controls execution of the program code. Various types of executed computer program code may also be considered as drivers of the processor 611.

The transceiver 612 may be configured to perform conversion between a baseband signal and a radio frequency signal and process the radio frequency signal. The transceiver 612 may be connected to the antenna 616. The transceiver 612 includes a transmitter (Tx) and a receiver (Rx). Optionally, the transmitter Tx and the receiver Rx may be implemented by different physical structures/circuits, or may be implemented by a same physical structure/circuit, namely, the transmitter Tx and the receiver Rx may be inherited together.

The transceiver may also be referred to as a transceiver unit (e.g., transceiver circuit), a transceiver apparatus, or the like. Optionally, a component that is configured to implement a receiving function and that is in the transceiver unit may be considered as a receiving unit (e.g., receiving circuit), and a component that is configured to implement a sending function and that is in the transceiver unit may be considered as a sending unit (e.g., sending sub-circuit). In other words, the transceiver unit includes the receiving unit and the sending unit. The receiving unit may also be referred to as a receiver, an input port, a receiving circuit, or the like. The sending unit may be referred to as a transmitter, a transmitting circuit, or the like. Alternatively, the Tx, the Rx, and the antenna may be combined into a transceiver.

The output device 614 displays information in a plurality of manners. For example, the output device 614 may be a liquid crystal display (LCD), a light emitting diode (LED) display device, a cathode ray tube (CRT) display device, a projector, or the like. The input device 615 may receive an input of a user in a plurality of manners. For example, the input device 615 may be a mouse, a keyboard, a touchscreen device, or a sensing device.

The processor of the terminal may invoke a program stored in the memory to implement the method of the terminal in the foregoing embodiment. For example, the processor 611 of the terminal may receive a first RRC reconfiguration message from a second node through the antenna 616 and the transceiver 612, and the processor 611 may receive first indication information from the second node through the antenna 616 and the transceiver 612. When determining that the first RRC reconfiguration message becomes effective, the processor 611 may establish an RRC connection to the second donor node.

FIG. 10 is a schematic diagram of a structure of a communication apparatus according to an embodiment of this application. The communication apparatus may be a relay node, and may implement a function of the relay node in the foregoing method embodiment (for example, the first node or the second node, or another IAB node). Alternatively, the communication apparatus may be a donor node, and may implement a function of the first donor node or the second donor node in the foregoing method embodiments. For ease of description, FIG. 10 shows main components of the communication apparatus. As shown in FIG. 10:

The communication apparatus includes at least one processor 711, at least one memory 712, at least one transceiver 713, at least one network interface 714, and one or more antennas 715. The processor 711, the memory 712, the transceiver 713, and the network interface 714 are connected to each other, for example, through a bus. In embodiments of this application, the connection may include various types of interfaces, transmission lines, buses, or the like. This is not limited in embodiments. The antenna 715 is connected to the transceiver 713. The network interface 714 is configured to enable the communication apparatus to be connected to another network device through a communication link. For the transceiver 713, the memory 712, and the antennas 716, refer to related descriptions in FIG. 10, to implement similar functions.

FIG. 11 is a schematic diagram of a structure of a communication apparatus according to an embodiment of this application. The communication apparatus may perform the method described in the foregoing method embodiments. For details, refer to descriptions in the foregoing method embodiments. The communication apparatus may be used in a communication device, a circuit, a hardware component, or a chip. For example, the communication apparatus may be a terminal, a first node, a second node, a donor node (including a source donor node or a target donor node), a CU of a donor node, or a DU of a donor node. The communication apparatus may be a terminal, a first node, a second node, a donor node (including a source donor node or a target donor node), a CU of a donor node, or a chip in a DU of a donor node.

The communication apparatus 1300 includes a processing unit 1301 and a communication unit 1302 (e.g., communication circuit). Optionally, the communication apparatus 1300 further includes a storage unit 1303 (e.g., storage circuit).

The processing unit 1301 may be an apparatus having a processing function, and may include one or more processors. The processor may be a general-purpose processor, a dedicated processor, or the like. The processor may be a baseband processor or a central processing unit. The baseband processor may be configured to process a communication protocol and communication data. The central processing unit may be configured to: control the apparatus (for example, a donor node, a terminal, or a chip), execute a software program, and process data of the software program.

The communication unit 1302 may be an apparatus for inputting (e.g., receiving) or outputting (e.g., sending) a signal, and is configured to perform signal transmission with another network device or another component in a device.

The storage unit 1303 may be an apparatus having a storage function, and may include one or more memories.

Optionally, the processing unit 1301, the communication unit 1302, and the storage unit 1303 are connected through a communication bus.

Optionally, the storage unit 1303 may exist independently, and is connected to the processing unit 1301 through the communication bus. The storage unit 1303 may alternatively be integrated into the processing unit 1301.

Optionally, the communication apparatus 1300 may be a chip. The communication unit 1302 may be an input/output interface, a pin, a circuit, or the like. The storage unit 1303 may be a register, a cache, a random access memory (RAM), or the like, and the storage unit 1303 may be integrated into the processing unit 1301. The storage unit 1303 may be a read-only memory (ROM) or another type of static storage device that can store static information and instructions. The storage unit 1303 may be independent of the processing unit 1301. Optionally, with development of wireless communication technologies, the transceiver may be integrated into the communication apparatus 1300. For example, the transceiver 612 shown in FIG. 9 is integrated into the communication unit 1302.

In a possible design, the processing unit 1301 may include instructions, and the instructions may be run on the processor, so that the communication apparatus 1300 is enabled to perform the method of the terminal, the first node, the second node, and the donor node (including the source donor node or the target donor node) in the foregoing embodiments.

In still another possible design, the storage unit 1303 stores instructions, and the instructions may be run on the processing unit 1301, so that the communication apparatus 1300 is enabled to perform the method of the terminal, the first node, the second node, and the donor node (including the source donor node or the target donor node) in the foregoing embodiments. Optionally, the storage unit 1303 may further store data. Optionally, the processing unit 1301 may also store instructions and/or data.

The communication apparatus 1300 may be the terminal in embodiments of this application. A schematic diagram of the terminal may be shown in FIG. 9. Optionally, the communication unit 1302 of the apparatus 1300 may include an antenna and a transceiver of the terminal, for example, the antenna and the transceiver in FIG. 9. Optionally, the communication unit 1302 may further include an output device and an input device, for example, the output device and the input device in FIG. 9.

The communication apparatus 1300 may be the first node, the second node, or the donor node in embodiments of this application. A schematic diagram of the first node, the second node, or the donor node may be shown in FIG. 10. Optionally, the communication unit 1302 of the apparatus 1300 may include an antenna and a transceiver of the terminal, for example, the antenna and the transceiver in FIG. 10. Optionally, the communication unit 1302 may further include the network interface in FIG. 10.

When the communication apparatus 1300 may be the terminal in embodiments of this application or the chip of the terminal, the communication apparatus 1300 may implement a function implemented by the terminal in the foregoing method embodiments.

When the communication apparatus 1300 may be the relay node in embodiments of this application or a chip of the relay node, the communication apparatus 1300 may implement a function implemented by the relay node in the foregoing method embodiments.

When the communication apparatus 1300 may be the donor node, the CU of the donor node, the chip of the donor node, or the chip of the CU of the donor node in embodiments of this application, the communication apparatus 1300 may implement a function of the donor node in the foregoing method embodiments.

The processor in this application may include but is not limited to at least one of the following various computing devices that run software: a central processing unit (CPU), a microprocessor, a digital signal processor (DSP), a microcontroller unit (MCU), an artificial intelligence processor, or the like. Each computing device may include one or more cores used to execute software instructions to perform operations or processing. The processor may be a separate semiconductor chip; may be integrated with another circuit into a semiconductor chip, for example, may form a system on a chip (SoC) with another circuit (for example, a codec circuit, a hardware acceleration circuit, or various bus and interface circuits); or may be integrated into an application-specific integrated circuit (ASIC) as a built-in processor of the ASIC. The ASIC integrated with the processor may be packaged separately or may be packaged together with another circuit. The processor includes a core for executing software instructions to perform operation or processing, and may further include a necessary hardware accelerator, for example, a field programmable gate array (FPGA), a programmable logic device (PLD), or a logic circuit that implements a special-purpose logic operation.

The memory in embodiments of this application may include at least one of the following types: a ROM or another type of static storage device that can store static information and instructions, or a RAM or another type of dynamic storage device that can store information and instructions, or may be an electrically erasable programmable read-only memory (EEPROM). In some scenarios, the memory may alternatively be a compact disc read-only memory (CD-ROM) or another compact disc storage, an optical disc storage (including a compact optical disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer. However, the memory is not limited thereto.

In addition to a data bus, the bus may further include a power bus, a control bus, a status signal bus, and the like. However, for clear description, various types of buses in the figures are marked as the bus.

It should be further understood that first, second, third, fourth, and various numbers in this specification are merely used for differentiation for ease of description, and are not intended to limit the scope of embodiments of this application. These numbers may be replaced with other numbers.

It should be understood that the term "and/or" in this specification describes only an association relationship between associated objects and represents that three relationships may exist. For example, A and/or B may represent the following three cases: Only A exists, both A and B exist, and only B exists. In addition, the character "I" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

All or some of the foregoing embodiments may be implemented through software, hardware, firmware, or any combination thereof. When software is used to implement the embodiments, the embodiments may be implemented entirely or partially in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive), or the like.

The foregoing descriptions are merely embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication apparatus, which is a first node or is included in the first node, wherein the communication apparatus comprises a processor coupled to a memory; and wherein the memory is configured to store a computer program, wherein the processor is configured to execute the computer program stored in the memory, to cause the communication apparatus to perform:

receiving a first radio resource control (RRC) reconfiguration message from a first donor node through a second node;

receiving first indication information from the second node, wherein the first indication information is used to determine that the first RRC reconfiguration message has become effective, wherein that the first RRC reconfiguration message has become effective comprises that the first RRC reconfiguration message is to be utilized in RRC connection establishment; and in response to determining, based on the first indication information, that the first RRC reconfiguration message has become effective, establishing an RRC connection from the first node to a second donor node based on the first RRC reconfiguration message, wherein:

the first node and the second node are nodes in a group that performs a group handover, the group handover comprises a handover of a head node in the group from a source parent node to a target parent node, the source parent node is connected to the first donor node, the target parent node is connected to the second donor node, the second node is the head node or the second node is connected to the head node, the second node is a parent node of the first node, the second node is an integrated access and backhaul (IAB) node, and the first node is an IAB node or a terminal.

2. The apparatus according to claim 1, wherein the first RRC reconfiguration message comprises the first indication information.

3. The apparatus according to claim 2, wherein the second node is the head node, and the first indication information comprises one or more of the following: a group identifier of the group, an identifier of the group handover, an identifier of a candidate target cell of the second node, an identifier of a candidate target cell of the first node, or an identifier of the second donor node.

4. The apparatus according to claim 2, wherein the second node is connected to the head node, and the first indication information comprises one or more of the following: a group identifier of the group, an identifier of the group handover, an identifier of a candidate target cell of the second node, an identifier of a candidate target cell of the first node, an identifier of a candidate target cell of the head node, or an identifier of the second donor node.

5. The apparatus according to claim 1, wherein the apparatus is caused to further perform:

receiving second indication information from the second node, wherein the second indication information indicates that the group handover is a cross-donor node group handover.

6. The apparatus according to claim 1, wherein the first RRC reconfiguration message comprises second indication information, and the second indication information indicates that the group handover is a cross-donor node group handover.

7. The apparatus according to claim 5, wherein the second indication information comprises one or more of the following:

the identifier of the candidate target cell of the first node, a backhaul adaptation protocol (BAP) address of the first node, or the identifier of the second donor node.

8. The apparatus according to claim 5, wherein the apparatus is further caused to perform:

establishing an F1 connection to the second donor node based on the second indication information.

9. The apparatus according to claim 1, wherein the group further comprises a third node, the third node is a child node of the first node, and the apparatus is further caused to perform:

receiving a second RRC reconfiguration message from the first donor node through the second node;

sending the second RRC reconfiguration message to the third node; and in response to determining, based on the first indication information, that the first RRC reconfiguration message has become effective, sending third indication information to the third node, wherein the third indication information indicates that the second RRC reconfiguration message has become effective.

10. The apparatus according to claim 9, wherein the second RRC reconfiguration message and the first RRC reconfiguration message comprise the third indication information.

11. The apparatus according to claim 10, wherein the third indication information comprises one or more of the following: the group identifier of the group, the identifier of the group handover, an identifier of a candidate target cell of the third node, the identifier of the candidate target cell of the first node, the identifier of the candidate target cell of the head node, or the identifier of the second donor node.

12. The apparatus according to claim 9, wherein the first RRC reconfiguration message comprises an identifier of one or more child nodes of the first node in the group, the one or more child nodes comprise the third node, and the apparatus is further caused to perform:

sending the third indication information to the third node based on an identifier of the third node.

13. The apparatus according to claim 9, wherein the first indication information comprises identification information of one or more descendant nodes of the first node in the group, the one or more descendant nodes comprise the third node, and the apparatus is further caused to perform:

sending the third indication information to the third node based on identification information of the third node.

14. A communication apparatus, which is a first node or is included in the first node, wherein the communication apparatus comprises a processor coupled to a memory; and wherein the memory is configured to store a computer program, wherein the processor is configured to execute the computer program stored in the memory to cause the communication apparatus to perform:

forwarding, to a second node, a first radio resource control (RRC) reconfiguration message received from a first donor node;

receiving a second RRC reconfiguration message from the first donor node;

determining that the second RCE reconfiguration message has become effective; and in response to determining that the second RRC reconfiguration message has become effective, sending first indication information to the second node, wherein the first indication information is used to determine that the first RRC reconfiguration message becomes effective, wherein that the first RRC reconfiguration message becomes effective comprises that the first RRC reconfiguration message is to be utilized in RRC connection establishment, wherein:

the first node and the second node are nodes in a group that performs a group handover, the group handover comprises a handover of a head node in the group from a source parent node to a target parent node, the source parent node is connected to the first donor node, the target parent node is connected to a second donor node, the first node is the head node or the first node is connected to the head node, the first node is a parent node of the second node, the first node is an integrated access and backhaul (IAB) node, and the second node is an IAB node or a terminal.

15. The apparatus according to claim 14, wherein the apparatus is further caused to perform:

when the first node determines that the second RRC reconfiguration message becomes effective, establishing, by the first node, an RRC connection to the second donor node based on the second RRC reconfiguration message.

16. The apparatus according to claim 14, wherein the first RRC reconfiguration message and the second RRC reconfiguration message comprise the first indication information.

17. The apparatus according to claim 16, wherein the first node is the head node, and the first indication information comprises one or more of the following: a group identifier of the group, an identifier of the group handover, an identifier of a candidate target cell of the first node, an identifier of a candidate target cell of the second node, or an identifier of the second donor node.

18. The apparatus according to claim 16, wherein the first node is connected to the head node, and the first indication information comprises one or more of the following: a group identifier of the group, an identifier of the group handover, an identifier of a candidate target cell of the first node, an identifier of a candidate target cell of the second node, an identifier of a candidate target cell of the head node, or an identifier of the second donor node.

19. The apparatus according to claim 14, wherein the apparatus is further caused to perform:
sending, by the first node, second indication information to the second node, wherein the second indication information indicates that the group handover is a cross-donor node group handover.

20. A communication system, wherein the communication system comprises a first node and a second node;
wherein the first node is configured to:
receive a first radio resource control (RRC) reconfiguration message from a first donor node through the second node;
receive first indication information from the second node, wherein the first indication information is used to determine that the first RRC reconfiguration message has become effective, wherein that the first RRC reconfiguration message has become effective comprises that the first RRC reconfiguration message is to be utilized in RRC connection establishment; and
in response to determining, based on the first indication information, that the first RRC reconfiguration message has become effective, establish an RRC connection to a second donor node based on the first RRC reconfiguration message;
wherein the second node is configured to:
forward, to the first node, the first RRC reconfiguration message received from the first donor node;
receive a second RRC reconfiguration message from the first donor node; and
in response to determining that the second RRC reconfiguration message has become effective, sending the first indication information to the first node, wherein the first indication information is used to determine that the first RRC reconfiguration message has become effective;
wherein:
the first node and the second node are nodes in a group that performs a group handover,
the group handover comprises a handover of a head node in the group from a source parent node to a target parent node,
the source parent node is connected to the first donor node,
the target parent node is connected to the second donor node,
the second node is the head node or the second node is connected to the head node,
the second node is a parent node of the first node,
the second node is an integrated access and backhaul (IAB) node, and
the first node is an IAB node or a terminal.

\* \* \* \* \*